US011999562B2

(12) United States Patent
Rocholl et al.

(10) Patent No.: US 11,999,562 B2
(45) Date of Patent: Jun. 4, 2024

(54) FRONT AND SIDE LOADING PACKERS FOR ELECTRIC REFUSE VEHICLE

(71) Applicant: Oshkosh Corporation, Oshkosh, WI (US)

(72) Inventors: Joshua D. Rocholl, Rochester, MN (US); Derek A. Wente, Austin, MN (US); John T. Kellander, Oronoco, MN (US); Cody D. Clifton, Mapleton, MN (US); Vincent Hoover, Byron, MN (US); Zachary L. Klein, Rochester, MN (US); Clinton T. Weckwerth, Pine Island, MN (US); Skylar A. Wachter, Doge Center, MN (US); Andrew Kotloski, Oshkosh, WI (US); Wallace Buege, West Bend, WI (US); Caleb Binder, Oshkosh, WI (US); Martin J. Schimke, Red Granite, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 16/851,429

(22) Filed: Apr. 17, 2020

(65) Prior Publication Data

US 2020/0346861 A1 Nov. 5, 2020

Related U.S. Application Data

(60) Provisional application No. 62/843,293, filed on May 3, 2019.

(51) Int. Cl.
*B65F 3/14* (2006.01)
*B65F 3/20* (2006.01)
(Continued)

(52) U.S. Cl.
CPC ................ *B65F 3/201* (2013.01); *B65F 3/14* (2013.01); *B65F 3/207* (2013.01); *B65F 3/24* (2013.01); *B65F 3/28* (2013.01); *B65F 2003/006* (2013.01)

(58) Field of Classification Search
CPC .. B65F 3/18; B65F 3/201; B65F 3/207; B65F 3/28; B65F 3/14; B65F 3/20; B65F 3/24; B60P 1/38
(Continued)

(56) References Cited

U.S. PATENT DOCUMENTS 2,430,973 A * 11/1947 Boissonnault .......... B65F 3/205 414/501
2,788,927 A * 4/1957 Hoffstetter ................ B60P 1/38 222/415
(Continued)

FOREIGN PATENT DOCUMENTS

CN 105564874 A * 5/2016 .............. B65F 3/201
CN 109051461 A * 12/2018 .............. B65F 3/207
(Continued)

*Primary Examiner* — James Keenan
(74) *Attorney, Agent, or Firm* — Foley & Lardner LLP

(57) ABSTRACT

A refuse vehicle comprises a chassis, a body assembly, a power source, a tailgate, and a refuse interaction mechanism. The body assembly is coupled to the chassis and defines a refuse compartment configured to store refuse material. The refuse interaction mechanism comprises a refuse interaction element and an electric motor. The refuse interaction element is configured to selectively apply a force onto the refuse material within the refuse compartment. The refuse interaction element is moveable between a receiving position, in which the refuse compartment is configured to receive refuse material, and a force-exerting position, in which the refuse interaction element is configured to exert the force on the refuse material stored within the refuse compartment. The electric motor is powered by the power
(Continued)

source and configured to selectively move the refuse interaction element between the receiving position and the force-exerting position.

21 Claims, 38 Drawing Sheets

(51) Int. Cl.
*B65F 3/24* (2006.01)
*B65F 3/28* (2006.01)
*B65F 3/00* (2006.01)

(58) Field of Classification Search
USPC .......................... 414/510, 521, 528, 513, 517
See application file for complete search history.

(56) References Cited

U.S. PATENT DOCUMENTS 3,831,789 A * 8/1974 Brewer .................. B60P 1/006 414/509
3,874,529 A * 4/1975 Gollnick ................ B65F 3/207 414/525.51
3,889,828 A * 6/1975 Smith .................... B65F 3/207 414/525.54
4,099,636 A * 7/1978 Frenette .................. B65F 3/26 414/812
4,149,642 A * 4/1979 Schneider ................ B65F 3/24 414/523
4,162,735 A * 7/1979 Lewis .................... B60P 1/006 414/514
4,544,320 A * 10/1985 Haines ..................... B65F 3/28 414/517
4,877,366 A * 10/1989 De Filippi ............. B65F 3/201 414/511
4,892,456 A * 1/1990 Hodgetts .................. B60P 1/38 414/527
5,395,204 A * 3/1995 Balik ..................... B60P 1/006 198/697
5,857,822 A * 1/1999 Christenson ............. B65F 3/28 414/525.6
5,919,027 A 7/1999 Christenson
5,934,858 A 8/1999 Christenson
5,934,867 A 8/1999 Christenson
5,938,394 A 8/1999 Christenson
5,951,235 A 9/1999 Young et al.
5,967,731 A 10/1999 Brandt
5,971,694 A 10/1999 McNeilus et al.
5,984,609 A 11/1999 Bartlett
6,033,176 A 3/2000 Bartlett
6,062,803 A 5/2000 Christenson
6,089,813 A 7/2000 McNeilus et al.
6,120,235 A 9/2000 Humphries et al.
6,123,500 A 9/2000 McNeilus et al.
6,210,094 B1 4/2001 McNeilus et al.
6,213,706 B1 4/2001 Christenson
6,224,318 B1 5/2001 McNeilus et al.
6,315,515 B1 11/2001 Young et al.
6,336,783 B1 1/2002 Young et al.
6,350,098 B1 2/2002 Christenson et al.
6,390,758 B1 5/2002 McNeilus et al.
6,398,478 B2 * 6/2002 Smith ...................... B65F 3/20 414/525.51
6,447,239 B2 9/2002 Young et al.
6,474,928 B1 11/2002 Christenson
6,483,082 B1 * 11/2002 Liao ................. H01L 21/67757 414/936
6,565,305 B2 5/2003 Schrafel
6,837,668 B1 * 1/2005 Brown ................... B60P 1/365 414/521
7,070,382 B2 7/2006 Pruteanu et al.
7,073,620 B2 7/2006 Braun et al.
7,147,423 B2 * 12/2006 Golden .................. B60P 1/365 414/521
7,198,130 B2 4/2007 Schimke
7,258,194 B2 8/2007 Braun et al.
7,284,943 B2 10/2007 Pruteanu et al.
7,357,203 B2 4/2008 Morrow et al.
7,448,460 B2 11/2008 Morrow et al.
7,556,468 B2 7/2009 Grata
7,559,735 B2 7/2009 Pruteanu et al.
7,717,663 B1 * 5/2010 Stowers ................. B66C 23/36 414/921
7,824,293 B2 11/2010 Schimke
7,878,750 B2 2/2011 Zhou et al.
7,918,638 B1 * 4/2011 Loggins ................. B60P 1/283 414/469
7,931,103 B2 4/2011 Morrow et al.
8,123,645 B2 2/2012 Schimke
8,182,194 B2 5/2012 Pruteanu et al.
8,215,892 B2 7/2012 Calliari
8,337,352 B2 12/2012 Morrow et al.
8,360,706 B2 1/2013 Addleman et al.
8,540,475 B2 9/2013 Kuriakose et al.
8,561,735 B2 10/2013 Morrow et al.
8,807,613 B2 8/2014 Howell et al.
8,827,624 B2 * 9/2014 Hallstrom ................ B65F 3/24 414/517
8,864,613 B2 10/2014 Morrow et al.
9,174,686 B1 11/2015 Messina et al.
9,216,856 B2 12/2015 Howell et al.
9,387,985 B2 7/2016 Gillmore et al.
9,428,042 B2 8/2016 Morrow et al.
9,650,032 B2 5/2017 Kotloski et al.
9,651,120 B2 5/2017 Morrow et al.
9,656,659 B2 5/2017 Shukla et al.
9,707,869 B1 7/2017 Messina et al.
9,880,581 B2 1/2018 Kuriakose et al.
9,908,520 B2 3/2018 Shukla et al.
9,970,515 B2 5/2018 Morrow et al.
9,981,803 B2 5/2018 Davis et al.
10,029,555 B2 7/2018 Kotloski et al.
10,029,556 B2 7/2018 Morrow et al.
10,160,438 B2 12/2018 Shukla et al.
10,196,205 B2 2/2019 Betz et al.
10,267,390 B2 4/2019 Morrow et al.
10,357,995 B2 7/2019 Palmer et al.
10,414,067 B2 9/2019 Datema et al.
10,421,350 B2 9/2019 Morrow et al.
10,435,026 B2 10/2019 Shively et al.
10,457,134 B2 10/2019 Morrow et al.
10,457,533 B2 10/2019 Puszkiewicz et al.
10,558,234 B2 2/2020 Kuriakose et al.
10,578,195 B2 3/2020 Steinberger et al.
10,584,775 B2 3/2020 Steinberger et al.
2010/0119343 A1 * 5/2010 Groves ..................... B66F 7/14 414/590
2013/0170932 A1 * 7/2013 Neufeldt ................. B65F 3/207 414/493
2016/0318722 A1 * 11/2016 Cervelli .................... B60P 3/24
2018/0155124 A1 * 6/2018 Kay ........................ B65F 3/201
2018/0250847 A1 9/2018 Wurtz et al.
2018/0326832 A1 11/2018 Kotloski et al.
2019/0091890 A1 3/2019 Rocholl et al.
2019/0111910 A1 4/2019 Shukla et al.
2019/0121353 A1 4/2019 Datema et al.
2019/0161272 A1 5/2019 Betz et al.
2019/0193934 A1 6/2019 Rocholl et al.
2019/0242460 A1 8/2019 Morrow et al.
2019/0322321 A1 10/2019 Schwartz et al.
2019/0325220 A1 10/2019 Wildgrube et al.
2019/0344475 A1 11/2019 Datema et al.
2019/0360600 A1 11/2019 Jax et al.
2019/0366828 A1 12/2019 Morrow et al.
2020/0039341 A1 2/2020 Morrow et al.
2020/0078986 A1 3/2020 Clifton et al.
2020/0102145 A1 4/2020 Nelson et al.
2020/0200237 A1 6/2020 Steinberger et al.
2020/0200238 A1 6/2020 Steinberger et al.
2020/0230841 A1 7/2020 Datema et al.
2020/0230842 A1 7/2020 Datema et al.

(56) References Cited

U.S. PATENT DOCUMENTS

| | | | |
|---|---|---|---|
| 2020/0262328 | A1 | 8/2020 | Nelson et al. |
| 2020/0262366 | A1 | 8/2020 | Wildgrube et al. |
| 2020/0265656 | A1 | 8/2020 | Koga et al. |

FOREIGN PATENT DOCUMENTS

| | | | | | |
|---|---|---|---|---|---|
| DE | 102015004326 | B3 | * | 7/2016 | ................ B60P 1/38 |
| EP | 0636556 | A1 | * | 2/1995 | .............. B65F 3/205 |
| EP | 0637555 | A1 | * | 2/1995 | .............. B65F 3/207 |
| GB | 2242411 | A | * | 10/1991 | ........... B30B 9/3046 |
| WO | WO-2006017499 | A2 | * | 2/2006 | ................ B65F 3/28 |

* cited by examiner

FRONT AND SIDE LOADING PACKERS FOR ELECTRIC REFUSE VEHICLE

CROSS-REFERENCE TO RELATED APPLICATION

This application claims the benefit of U.S. Provisional Application No. 62/843,293, filed May 3, 2019, which is incorporated herein by reference in its entirety.

BACKGROUND

Refuse vehicles collect a wide variety of waste, trash, and other materials from residences and businesses. Operators of the refuse vehicles transport the materials from various waste receptacles within a municipality to a storage or processing facility (e.g., a landfill, an incineration facility, a recycling facility, etc.).

SUMMARY

One exemplary embodiment relates to a refuse vehicle. The refuse vehicle comprises a chassis, a body assembly, a power source, a tailgate, and a refuse interaction mechanism. The chassis is coupled to a plurality of wheels. The body assembly is coupled to the chassis and defines a refuse compartment configured to store refuse material. The tailgate is moveable between an opened position and a closed position. The refuse interaction mechanism comprises a refuse interaction element and an electric motor. The refuse interaction element is configured to selectively apply a force onto the refuse material within the refuse compartment. The refuse interaction element is moveable between a receiving position, in which the refuse compartment is configured to receive refuse material, and a force-exerting position, in which the refuse interaction element is configured to exert the force on the refuse material stored within the refuse compartment. The electric motor is powered by the power source and configured to selectively move the refuse interaction element between the receiving position and the force-exerting position.

Another exemplary embodiment relates to a refuse vehicle. The refuse vehicle comprises a chassis, a body assembly, a power source, a tailgate, and a refuse interaction mechanism. The chassis is coupled to a plurality of wheels. The body assembly is coupled to the chassis and defines a refuse compartment configured to store refuse material. The tailgate is moveable between an opened position and a closed position. The refuse interaction mechanism comprises a refuse interaction element and an electric motor. The refuse interaction element is configured to selectively apply a force onto the refuse material within the refuse compartment. The refuse interaction element is moveable between a receiving position, in which the refuse compartment is configured to receive refuse material, and a force-exerting position, in which the refuse interaction element is configured to exert the force on the refuse material stored within the refuse compartment. The electric motor is powered by the power source and configured to selectively move the refuse interaction element between the receiving position and the force-exerting position. When the tailgate is in the opened position and the refuse interaction element is in the force-exerting position, the force exerted by the refuse interaction element is configured to eject the refuse material from the refuse compartment. When the tailgate is in the closed position and the refuse interaction element is in the force-exerting position, the force exerted by the refuse interaction element is configured to compact the refuse material within the refuse compartment.

One exemplary embodiment relates to a refuse vehicle. The refuse vehicle comprises a chassis, a body assembly, a power source, and a refuse interaction mechanism. The chassis is coupled to a plurality of wheels. The body assembly is coupled to the chassis and defines a refuse compartment configured to store refuse material. The refuse interaction mechanism comprises a refuse interaction element and an electric motor. The refuse interaction element is configured to selectively apply a packing force onto the refuse material within the refuse compartment. The refuse interaction element is moveable between a receiving position, in which the refuse compartment is configured to receive refuse material, and a packing position, in which the refuse interaction element is configured to exert the packing force on the refuse material stored within the refuse compartment. The electric motor is powered by the power source and is configured to selectively move the refuse interaction element between the receiving position and the packing position.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, front and side packer systems may incorporate various electrically-powered actuators and the like to effectively pack waste within a hopper volume of a refuse vehicle. That is, the electrically-actuated front and side packer systems may function without the inclusion of high-pressure, leak-prone hydraulic tanks, hydraulic lines, and hydraulic fluid generally. Thus, the electrically-actuated front and side packer systems may allow for reduced maintenance and upkeep as compared to traditional hydraulically-actuated front or side packer systems.

Overall Vehicle

Figure 1:
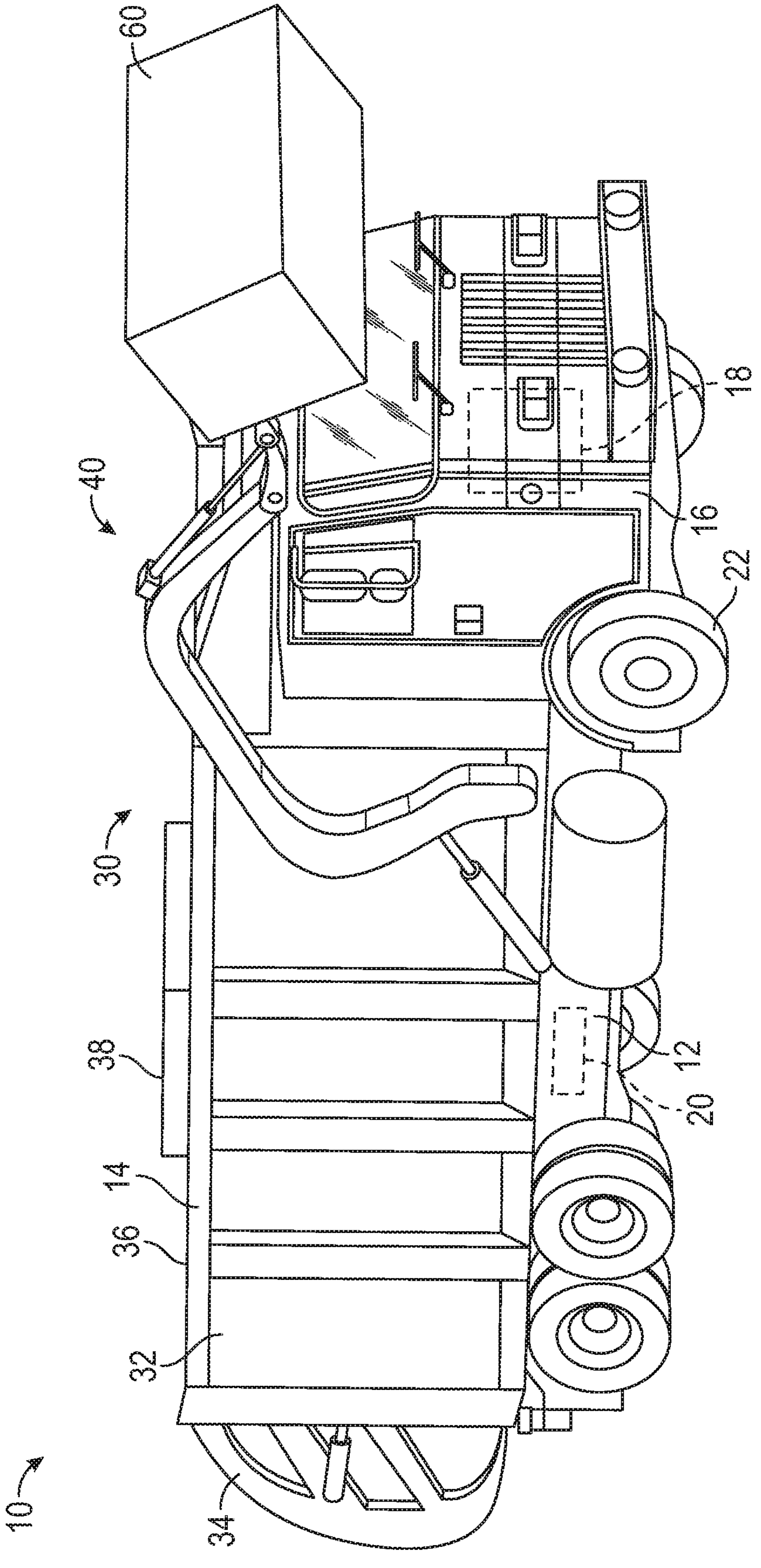
FIG. 1 is a perspective view of a refuse vehicle, according to an exemplary embodiment.

As shown in FIG. 1, a vehicle, shown as refuse vehicle 10 (e.g., a garbage truck, a waste collection truck, a sanitation truck, a recycling truck, etc.), is configured as a front-loading refuse truck. In other embodiments, the refuse vehicle 10 is configured as a side-loading refuse truck or a rear-loading refuse truck. In still other embodiments, the vehicle is another type of vehicle (e.g., a skid-loader, a telehandler, a plow truck, a boom lift, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, actuator controls, a user interface, switches, buttons, dials, etc.).

As shown in FIG. 1, the refuse vehicle 10 includes a prime mover, shown as electric motor 18, and a power source, shown as battery system 20. In other embodiments, the prime mover is or includes an internal combustion engine. According to the exemplary embodiment shown in FIG. 1, the electric motor 18 is coupled to the frame 12 at a position beneath the cab 16. In some exemplary embodiments, the electric motor 18 may be coupled to the frame at a position within or behind the cab 16.

The electric motor 18 is configured to provide power to a plurality of tractive elements, shown as wheels 22 (e.g., via a drive shaft, axles, etc.). In other embodiments, the electric motor 18 is otherwise positioned and/or the refuse vehicle 10 includes a plurality of electric motors to facilitate independent driving of one or more of the wheels 22. In still other embodiments, the electric motor 18 or a secondary electric motor is coupled to and configured to drive a hydraulic system that powers hydraulic actuators, as will be described herein. According to the exemplary embodiment shown in FIG. 1, the battery system 20 is coupled to the frame 12 beneath the body 14. In other embodiments, the battery system 20 is otherwise positioned (e.g., within a tailgate of the refuse vehicle 10, beneath the cab 16, along the top of the body 14, within the body 14).

According to an exemplary embodiment, the battery system 20 is configured to provide electric power to (i) the electric motor 18 to drive the wheels 22, (ii) electric actuators and/or pumps of the refuse vehicle 10 to facilitate operation thereof (e.g., lift actuators, tailgate actuators, packer actuators, grabber actuators, etc.), and/or (iii) other electrically operated accessories of the refuse vehicle 10 (e.g., displays, lights, etc.). In one embodiment, the refuse vehicle 10 is a completely electric refuse vehicle. In other embodiments, the refuse vehicle 10 includes an internal combustion generator that utilizes one or more fuels (e.g., gasoline, diesel, propane, natural gas, hydrogen, etc.) to generate electricity to charge the battery system 20, power the electric motor 18, power the electric actuators, and/or power the other electrically operated accessories (e.g., a hybrid refuse vehicle, etc.). For example, the refuse vehicle 10 may have an internal combustion engine augmented by the electric motor 18 to cooperatively provide power to the wheels 22. The battery system 20 may thereby be charged via an on-board electrical energy generator (e.g., an internal combustion generator, a solar panel system, etc.), from an external power source (e.g., overhead power lines, mains power source through a charging input, etc.), and/or via a power regenerative braking system, and provide power to the electrically operated systems of the refuse vehicle 10.

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted (e.g., by a packer system, etc.). The refuse compartment 30 may provide temporary storage for refuse during transport to a waste disposal site and/or a recycling facility.

According to the embodiment shown in FIG. 1, the body 14 and the refuse compartment 30 are positioned behind the cab 16. In some other embodiments, at least a portion of the body 14 and the refuse compartment 30 extend above or in front of the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (e.g., refuse is loaded into a position of the refuse compartment 30 behind the cab 16 and stored in a position further toward the rear of the refuse compartment 30). For example, in these instances, the refuse vehicle 10 may be a front-loading refuse vehicle or a side-loading refuse vehicle. In other embodiments, the storage volume is positioned between the hopper volume and the cab 16. For example, in these instances, the refuse vehicle 10 may be a rear-loading refuse vehicle.

As shown in FIG. 1, the refuse vehicle 10 includes a lift mechanism/system (e.g., a front-loading lift assembly, etc.), shown as lift assembly 40, coupled to the front end of the body 14. In other embodiments, the lift assembly 40 extends rearward of the body 14 (e.g., a rear-loading refuse vehicle, etc.). In still other embodiments, the lift assembly 40 extends from a side of the body 14 (e.g., a side-loading refuse vehicle, etc.). As shown in FIG. 1, the lift assembly 40 is configured to engage a container (e.g., a residential trash receptacle, a commercial trash receptacle), shown as refuse container 60. The lift assembly 40 may include various actuators (e.g., electric actuators, hydraulic actuators, pneumatic actuators, etc.) to facilitate engaging the refuse container 60, lifting the refuse container 60, and tipping refuse out of the refuse container 60 into the hopper volume of the refuse compartment 30 through an opening (e.g., a top door 38) in the cover 36 or through the tailgate 34. The lift assembly 40 may thereafter return the empty refuse container 60 to the ground. According to an exemplary embodiment, a door, shown as the top door 38, is movably coupled along the cover 36 to seal the opening thereby preventing refuse from escaping the refuse compartment 30 (e.g., due to wind or bumps in the road).

Front Loading or Side Loading Packer

Figure 2:
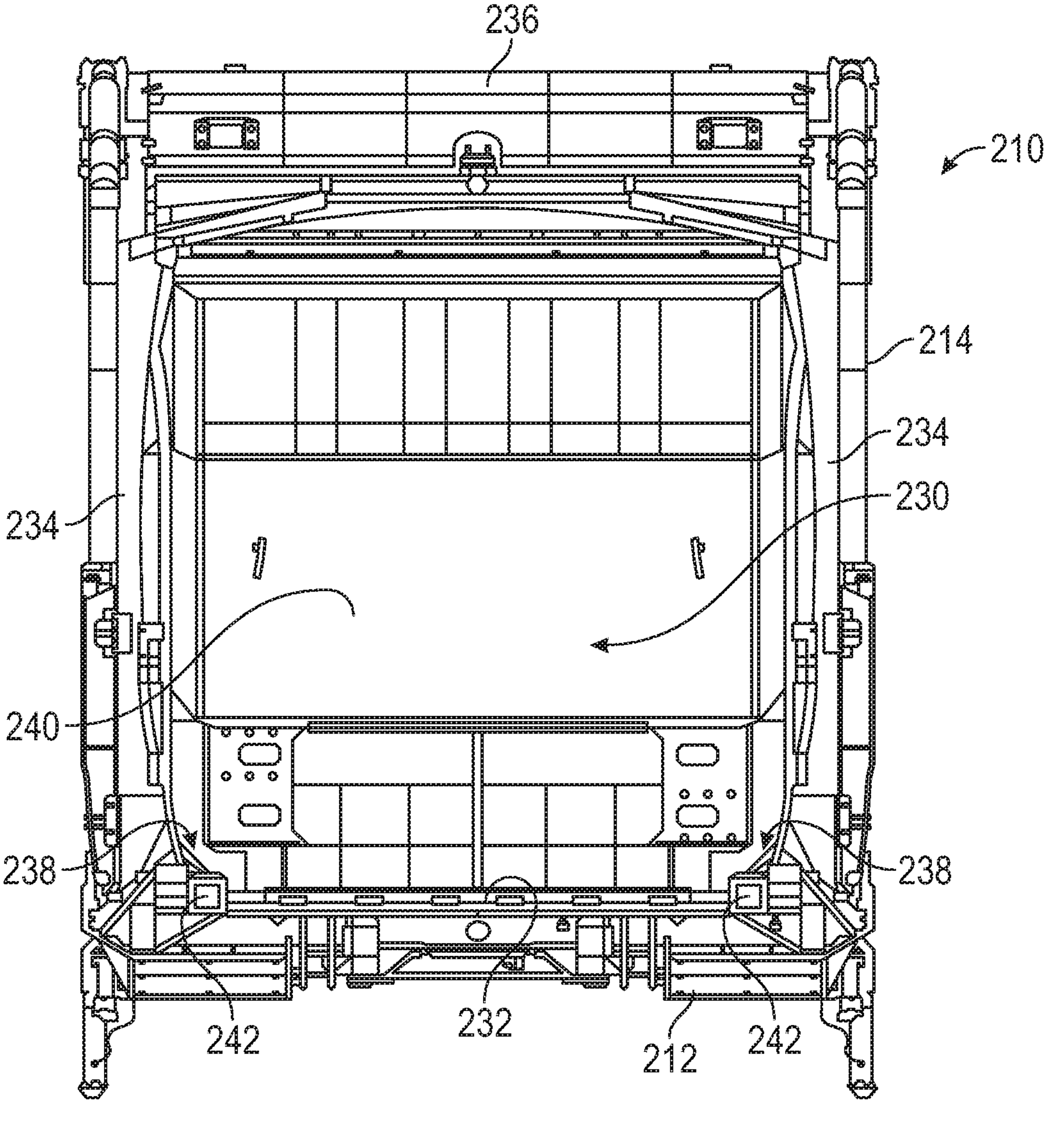
FIG. 2 is a cross-sectional view of a refuse compartment of another refuse vehicle, according to an exemplary embodiment.

As shown in FIG. 2, a vehicle, shown as refuse vehicle 210, is configured as a front-loading refuse vehicle. In some embodiments, the refuse vehicle 210 is substantially similar to the refuse vehicle 10. Thus, in these embodiments, the description above, with regard to the refuse vehicle 10, also applies to the refuse vehicle 210. For example, the refuse vehicle 210 similarly includes a frame 212, a body assembly 214, coupled to the frame 212; and a cab, similar to the cab 16. The refuse vehicle 210 also similarly includes an electric motor similar to the electric motor 18 and a power source or battery system similar to the battery system 20. Further, as with the refuse vehicle 10, the refuse vehicle 210 may alternatively be configured as a side-loading refuse vehicle.

As shown in FIG. 2, the body assembly 214 includes a collection chamber (e.g., hopper, etc.), shown as a refuse compartment 230, defined by a floor 232, sidewalls 234, and a cover 236. The refuse compartment 230 further includes a refuse interaction mechanism 238. When a tailgate of the refuse vehicle 210 (e.g., similar to the tailgate 34 of the refuse vehicle 10) is closed, the refuse interaction mechanism 238 is configured to compact refuse into a rear portion (out of the page with respect to the illustrative example provided in FIG. 2) of the refuse compartment 230. When the tailgate is opened, the refuse interaction mechanism 238 is configured to effectively eject refuse out of the refuse compartment 230. Thus, the refuse interaction mechanism 238 may be used to 1) compact stored refuse to provide additional room or space within the refuse compartment 230 for additional refuse and 2) eject stored refuse from within the refuse compartment 230.

Figure 3:
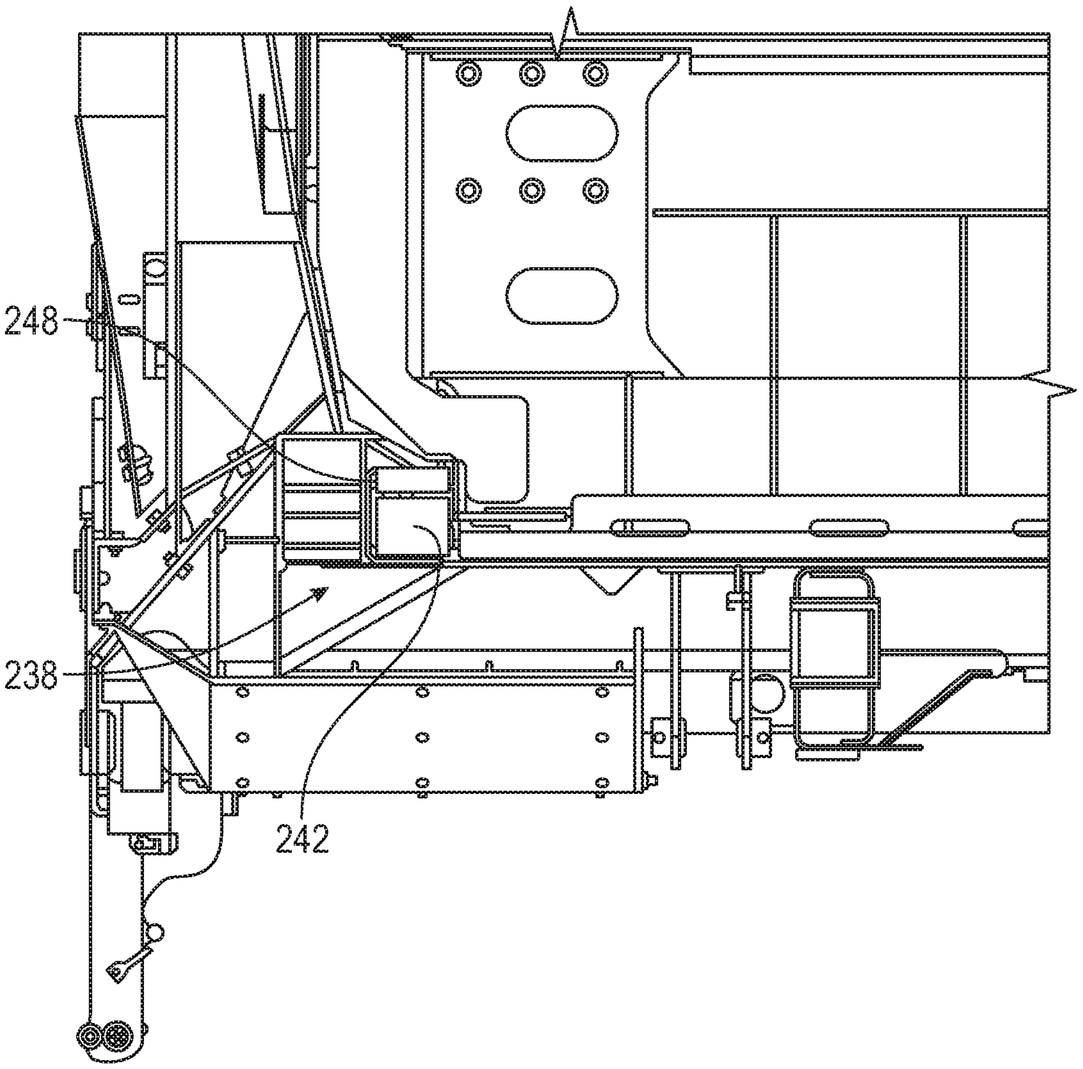
FIG. 3 is a cross-sectional detail view of the refuse compartment of FIG. 2, according to an exemplary embodiment.
Figure 4:
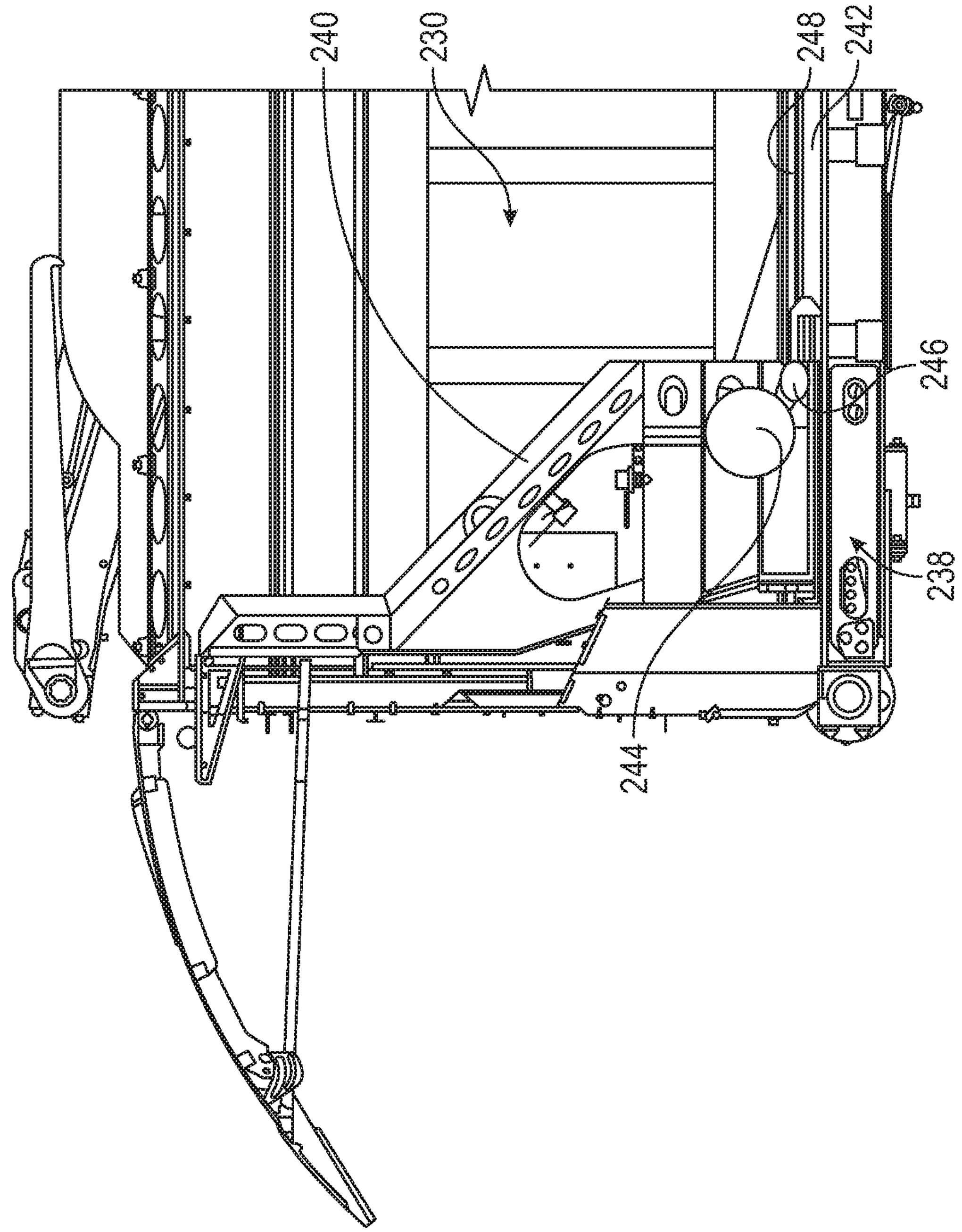
FIG. 4 is a cross-sectional view of a refuse interaction mechanism of the refuse vehicle of FIG. 2, according to an exemplary embodiment.

Referring to FIGS. 2-4 generally, in some embodiments, the refuse interaction mechanism 238 includes a refuse interaction element or actuatable packer 240 that is slidably engaged with a track 242. The actuatable packer 240 is further slidably movable along the track 242 between a receiving position (shown in FIG. 4), in which the refuse compartment 230 may receive refuse, and a force-exerting position (e.g., packing or ejecting position; similar to the position of an actuatable packer 740 shown in FIG. 12), in which the actuatable packer 240 is configured to exert a packing or an ejecting force on the refuse material contained within the refuse compartment 230.

As best shown in FIG. 4, the refuse interaction mechanism 238 further includes an electric motor 244 configured to provide rotational actuation to a drive gear 246. Both the electric motor 244 and the drive gear 246 are coupled to the actuatable packer 240, such that translational motion of the electric motor 244 and/or the drive gear 246 results in translational motion of the actuatable packer 240, and vice versa. A rack 248 extends along and is rigidly fixed with respect to the track 242. The drive gear 246 is engaged with the rack 248, such that rotational motion of the drive gear 246 forces the drive gear 246, and thereby the electric motor 244 and the actuatable packer 240, rearward along the rack 248. Thus, the electric motor 244 can selectively move the actuatable packer 240 between the receiving position and the force-exerting position. In some instances, the drive gear 246 may alternatively be a drive gearbox configured to provide a torque-speed power conversion between the electric motor 244 and the rack 248, as necessary for a given application.

In some embodiments, the electric motor 244 is in communication with a controller that is selectively operable by an operator during use. Thus, during use, the operator can selectively actuate the actuatable packer 240 between the receiving position and the force-exerting position (e.g., packing or ejecting position) by selectively activating the electric motor 244.

In some scenarios, it may be desirable to apply a large, sudden force (i.e., a high impulse) to the actuatable packer 240, and thereby onto the refuse within the refuse compartment 230 (e.g., to break up the refuse, to successfully eject the refuse from the refuse compartment 230, etc.). Specifically, in some scenarios, it may be desirable to provide a higher impulse to the actuatable packer 240 than possible with a standard electric motor.

Figure 5:
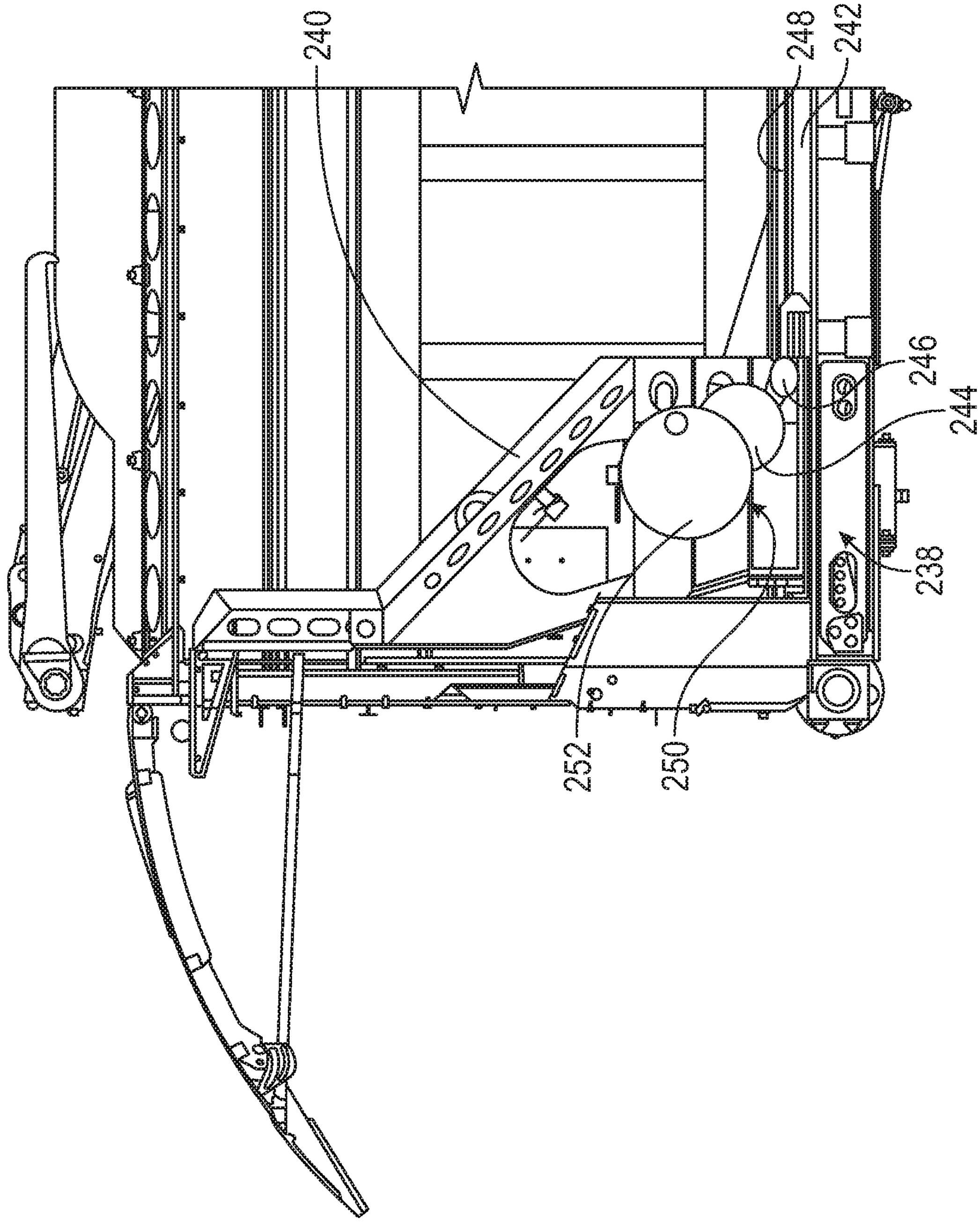
FIG. 5 is a cross-sectional view of the refuse interaction mechanism of FIG. 4, shown with an impulse generating mechanism, according to an exemplary embodiment.
Figure 6:
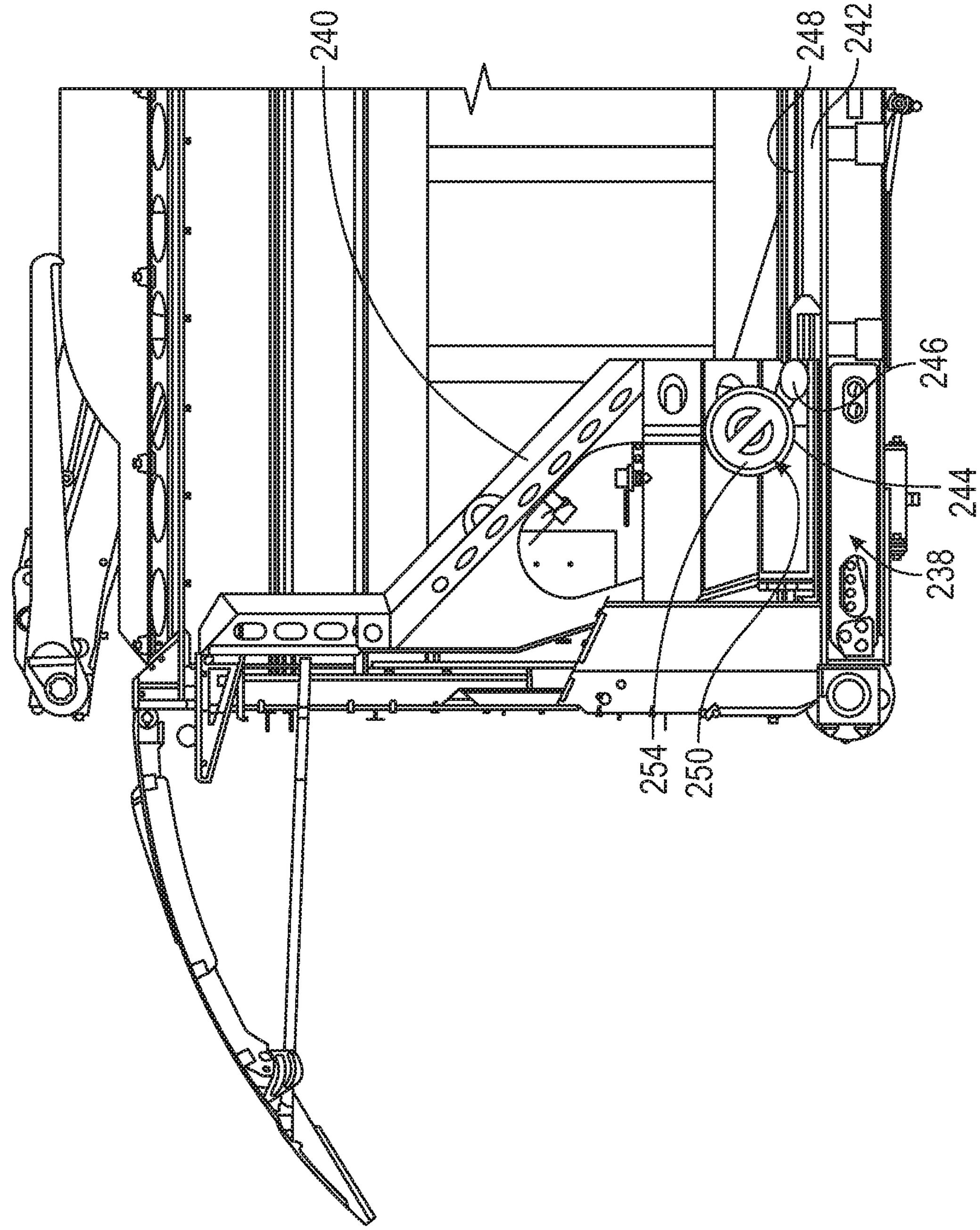
FIG. 6 is a cross-sectional view of the refuse interaction mechanism of FIG. 4, shown with another impulse generating mechanism, according to an exemplary embodiment.

Accordingly, as shown in FIGS. 5 and 6, in some embodiments, the refuse interaction mechanism 238 additionally includes an impulse generating mechanism 250. In the exemplary embodiment illustrated in FIG. 5, the impulse generating mechanism 250 is an inertial flywheel 252. The flywheel 252 is engaged with the electric motor 244 such that the electric motor 244 can selectively "charge" (apply gradual inertial energy to) the flywheel 252. Then, when a high impulse is desired, the flywheel 252 is configured to selectively and suddenly provide a high amount of rotational energy to the drive gear 246, thereby providing a high linear impulse to the actuatable packer 240. Accordingly, in some instances, the flywheel 252 is rotationally coupled to the drive gear 246 (e.g., via a direct geared connection or through a gear box), such that rotation of the flywheel 252 may be selectively used to rotate the drive gear 246.

As shown in FIG. 6, in some embodiments, the impulse generating mechanism 250 is alternatively a coil spring 254. Similar to the flywheel 252, the coil spring 254 is engaged with the electric motor such that the electric motor 244 can "charge" (apply spring potential energy to) the coil spring 254. Then, when a high impulse is desired, the coil spring 254 is configured to selectively and suddenly provide a high amount of rotational energy to the drive gear 246, thereby providing a high linear impulse to the actuatable packer 240. Accordingly, in some instances, the coil spring 254 is rotationally coupled to the drive gear 246 (e.g., via a direct geared connection or through a gear box), such that rotational motion provided by the coil spring 254 may be selectively used to rotate the drive gear 246.

Figure 7:
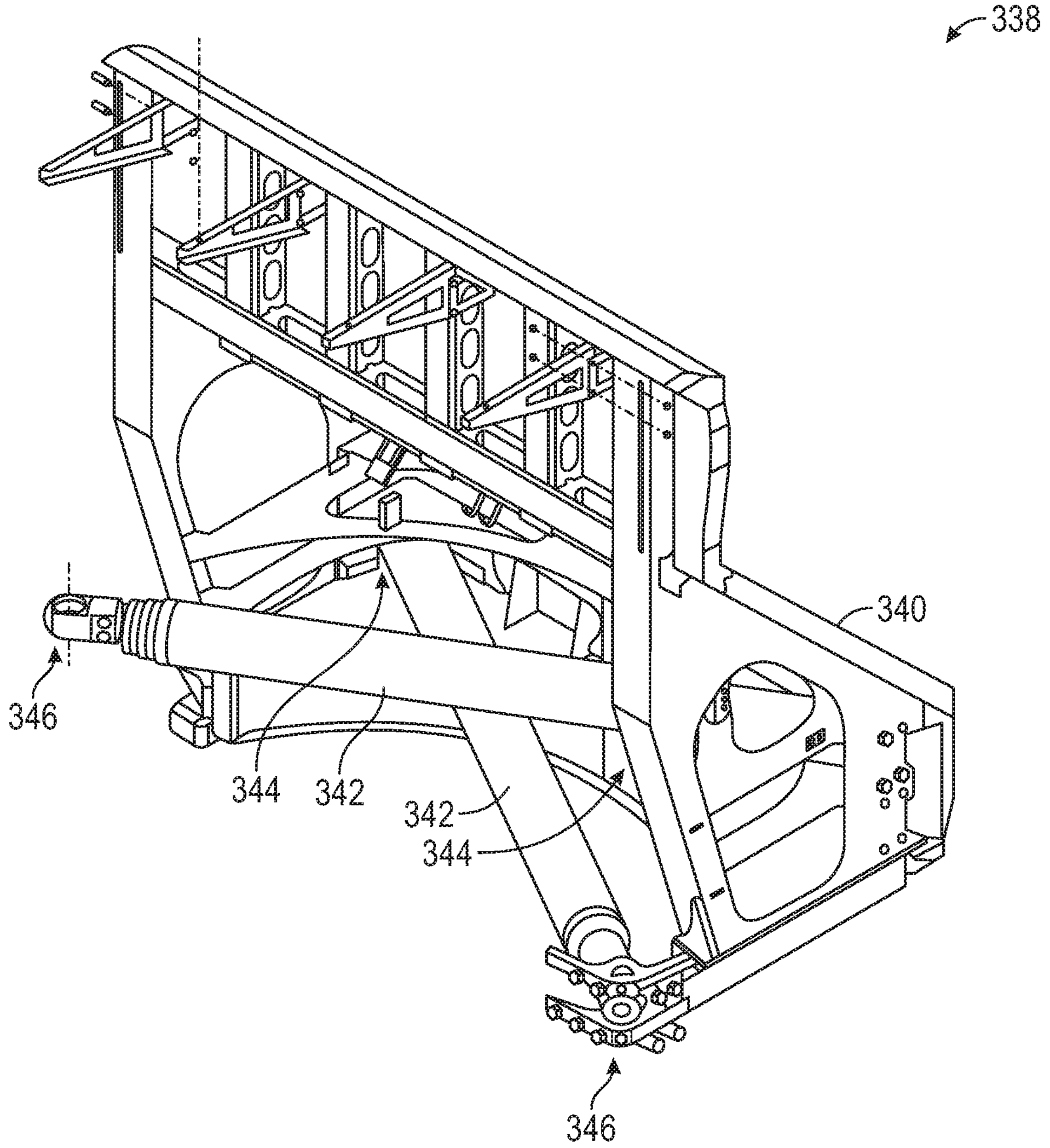
FIG. 7 is a perspective view of another refuse interaction mechanism, according to an exemplary embodiment.

Referring now to FIG. 7, a refuse interaction mechanism 338 is shown, according to an exemplary embodiment. The refuse interaction mechanism 338 comprises an actuatable packer 340 (substantially similar to the actuatable packer 240) and a pair of linear actuators 342. The actuatable packer 340 may similarly be configured to move within a refuse compartment along a track (e.g. the refuse compartment 230 and the track 242 of the refuse vehicle 210) between a receiving position and a force-exerting position (e.g., a packing or ejecting position). The pair of linear actuators 342 are selectively actuatable between an extended position and a retracted position to actuate the actuatable packer 340 between the receiving position and the force-exerting position. Each linear actuator 342 of the pair of linear actuators 342 is pivotally coupled at a first end 344 to the actuatable packer 340. Each linear actuator 342 may further be pivotally coupled at a second end 346 to an interior wall of the refuse compartment (e.g., the refuse compartment 230) of the refuse vehicle (e.g., the refuse vehicle 210) that the refuse interaction mechanism 338 is installed in.

In some instances, each of the linear actuators 342 may be a hydraulic actuator. Each of the hydraulic actuators may be driven using an electric pump, which may be powered by an on-board power source (e.g., battery system 20). In some other instances, each of the linear actuators 342 may be an electrically-driven linear actuator, which may similarly be powered by the on-board power source.

Figure 8:
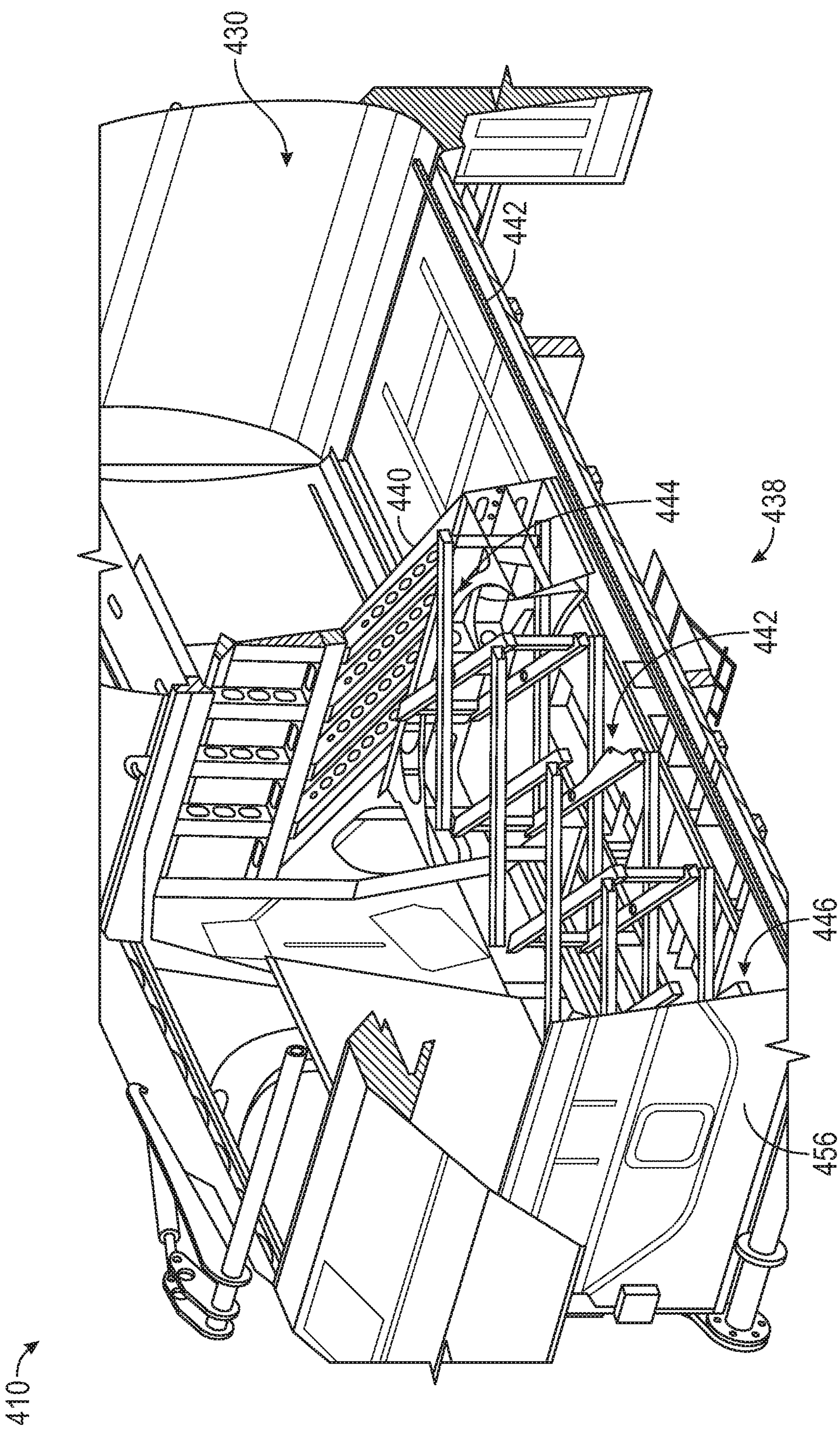
FIG. 8 is a cross-sectional perspective view of another refuse vehicle, according to an exemplary embodiment.

Referring now to FIG. 8, a refuse interaction mechanism 438 is shown installed within a refuse compartment 430 of a refuse vehicle 410, according to an exemplary embodiment. The refuse interaction mechanism 438 comprises a refuse interaction element or actuatable packer 440 (substantially similar to the actuatable packer 240) and a scissor stack mechanism 442. The actuatable packer 440 is similarly configured to move within the refuse compartment 430 between a receiving position and a force-exerting position (e.g., a packing or ejecting position). The scissor stack mechanism 442 is selectively actuatable between an extended position and a retracted position to actuate the actuatable packer 440 between the receiving position and the force-exerting position.

For example, a first end 444 of the scissor stack mechanism 442 is coupled to the actuatable packer 440 and a second end 446 of the scissor stack mechanism 442 is coupled to a front wall 456 of the refuse compartment 430. Accordingly, as the scissor stack mechanism 442 is selectively extended, the actuatable packer 440 is forced rearward within the refuse compartment 430, thus effectively compacting or packing any refuse stored within the refuse compartment 430. In some instances, the scissor stack mechanism 442 is selectively actuated using a ball screw actuator. In some other instances, the scissor stack mechanism 442 is selectively actuated using a rack and pinion mechanism. In yet some other instances, the scissor stack mechanism 442 is selectively actuated using a cable winch. In any case, the ball screw actuator, the rack and pinion mechanism, the cable winch, or any other mechanism for selectively actuating the scissor stack mechanism between the extended position and the retracted position may be powered using an electric motor (e.g., the electric motor 18, the electric motor 244), which may be powered by the on-board power source.

Figure 9:
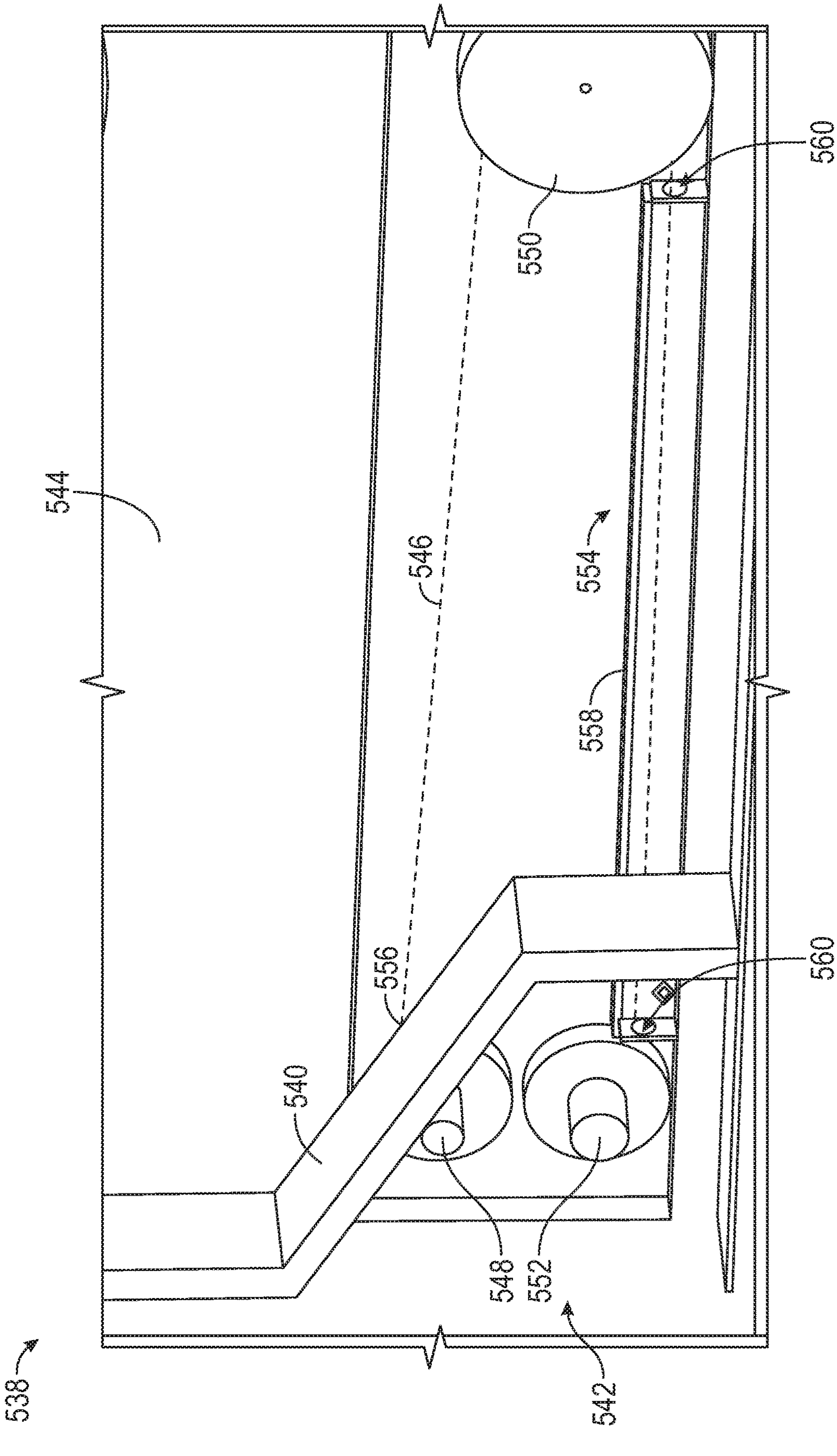
FIG. 9 is a detail view of another refuse interaction mechanism, according to an exemplary embodiment.

Referring now to FIG. 9, a refuse interaction mechanism 538 is shown, according to an exemplary embodiment. The refuse interaction mechanism 538 comprises a refuse interaction element or actuatable packer 540 (substantially similar to the actuatable packer 240) and a two-way winch mechanism 542. The actuatable packer 540 is similarly configured to move within a refuse compartment along a track (e.g., the refuse compartment 230 and the track 242 of the refuse vehicle 210) between a receiving position and a force-exerting position (e.g., a packing or ejecting position). The two-way winch mechanism 542 is configured to selectively pull the actuatable packer 540 rearward or forward, within the refuse compartment, to actuate the actuatable packer 540 between the receiving position and the force-exerting position.

For example, the two-way winch mechanism 542 is coupled to a sidewall 544 (e.g., one of the sidewalls 234 of the refuse compartment 230) and includes a winch cable 546, an upper winch spool 548, a cable return pulley 550, a lower winch spool 552, and a cable scraper 554. In some instances, the winch cable 546 is a coated steel cable. The winch cable 546 extends from the upper winch spool 548, around the cable return pulley 550, to the lower winch spool 552. The winch cable 546 is further wound around the upper winch spool 548 at a first end and around the lower winch spool 552 at a second end. The winch cable 546 is further rigidly fixed to the actuatable packer 540 at a connection point 556. Accordingly, the winch cable 546 is configured to pull the actuatable packer 540 between the receiving position and the force-exerting position via rotation of the upper winch spool 548 and the lower winch spool 552. In some instance, each of the upper winch spool 548 and the lower winch spool 552 may be rotatably coupled to an electric motor (similar to the electric motor 18, the electric motor 244, etc.), which may be powered by the on-board power source, to allow for selective actuation of the actuatable packer 540.

Further, the cable scraper 554 is configured to clean off the winch cable 546 as the actuatable packer 540 is actuated. For example, the cable scraper 554 comprises a housing 558 having openings 560 at opposing ends of the housing 558. The openings 560 are configured to receive the winch cable 546 with minimal clearance, such that any refuse material stuck to the winch cable 546 is scraped off as the winch cable 546 is pulled through the housing 558 of the cable scraper 554.

Figure 10:
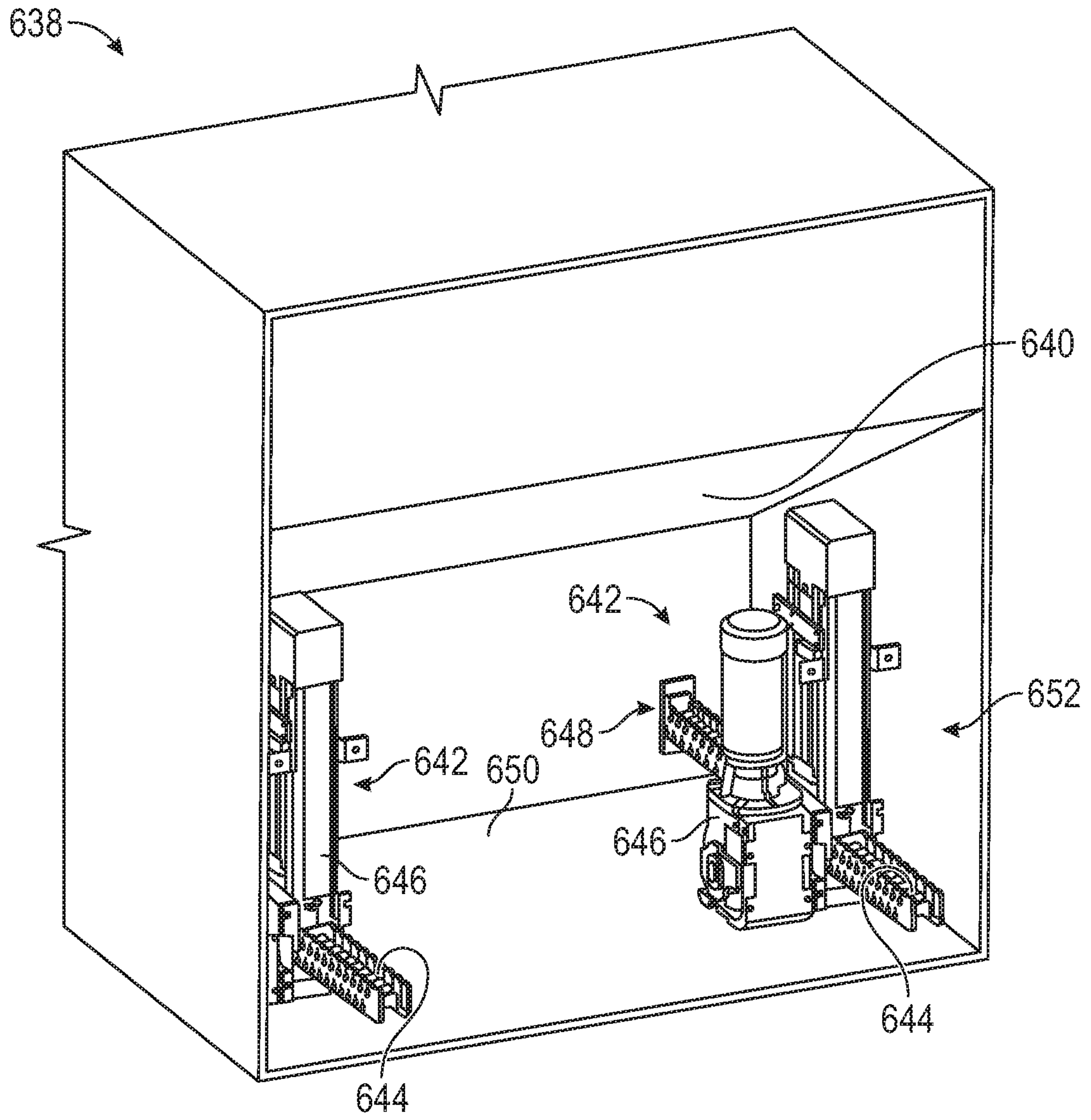
FIG. 10 is a perspective cross-sectional view of another refuse interaction mechanism, according to an exemplary embodiment.

Referring now to FIG. 10, a refuse interaction mechanism 638 is shown, according to an exemplary embodiment. The refuse interaction mechanism 638 comprises a refuse interaction element or actuatable packer 640 (substantially similar to the actuatable packer 240) and a pair of rigid chain actuator mechanisms 642. The actuatable packer 640 is similarly configured to move within a refuse compartment along a track (e.g., the refuse compartment 230 and the track 242 of the refuse vehicle 210) between a receiving position and a force-exerting position (e.g., a packing or ejecting position). The rigid chain actuator mechanisms 642 are configured to selectively push the actuatable packer 640 rearward or pull the actuatable packer 640 forward, within the refuse compartment, to actuate the actuatable packer 640 between the receiving position and the force-exerting position.

Each of the rigid chain actuator mechanisms 642 includes a limited-articulation chain 644 and a rigid chain actuator 646. The limited-articulation chain 644 is rigidly coupled to the actuatable packer 640 at a packer end 648 of the limited-articulation chain 644. The limited-articulation chain 644 further comprises a plurality of linkages that are configured to interconnect as they are deployed out of the rigid chain actuator 646 (i.e., as the rigid chain actuator 646 pushes the limited-articulation chain 644 rearward, toward the actuatable packer 640), thereby forming a continuously-extending rigid column. Conversely, as the plurality of linkages are retracted through the rigid chain actuator 646 (i.e., as the rigid chain actuator 646 pulls the limited-articulation chain 644 forward, away from the actuatable packer 640), the plurality of linkages are configured to disconnect or otherwise become rotatable with respect to one another, allowing for the limited-articulation chain 644 to coil up on itself in front of the rigid chain actuator 646 (e.g., between the rigid chain actuator 646 and the front wall of the refuse compartment).

Accordingly, the rigid chain actuator 646 is configured to engage the limited-articulation chain 644 to selectively push the limited-articulation chain 644 rearward or pull the limited-articulation chain 644 forward to selectively move the actuatable packer 640 between the receiving position and the force-exerting position (e.g., a packing or ejecting position). Each rigid chain actuator 646 may be rigidly coupled or fixed to a floor 650 of a refuse compartment 652 (e.g., the floor 232 of the refuse compartment 230). Each of the rigid chain actuators 646 may be electrically driven and may be powered by the on-board power source.

Figure 11:
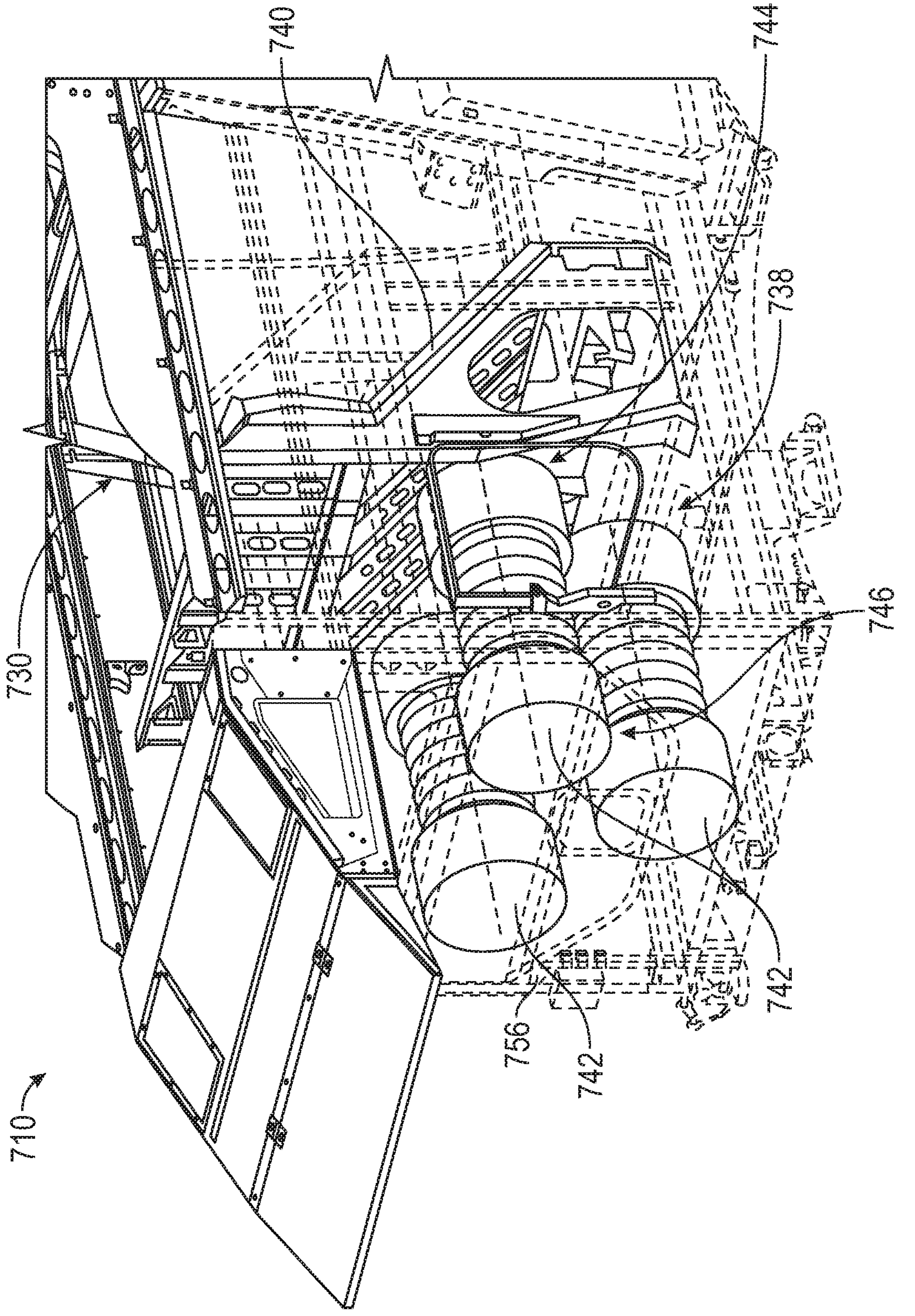
FIG. 11 is a detail view of a portion of another refuse vehicle, shown with a helical band actuator in a retracted position, according to an exemplary embodiment.
Figure 12:
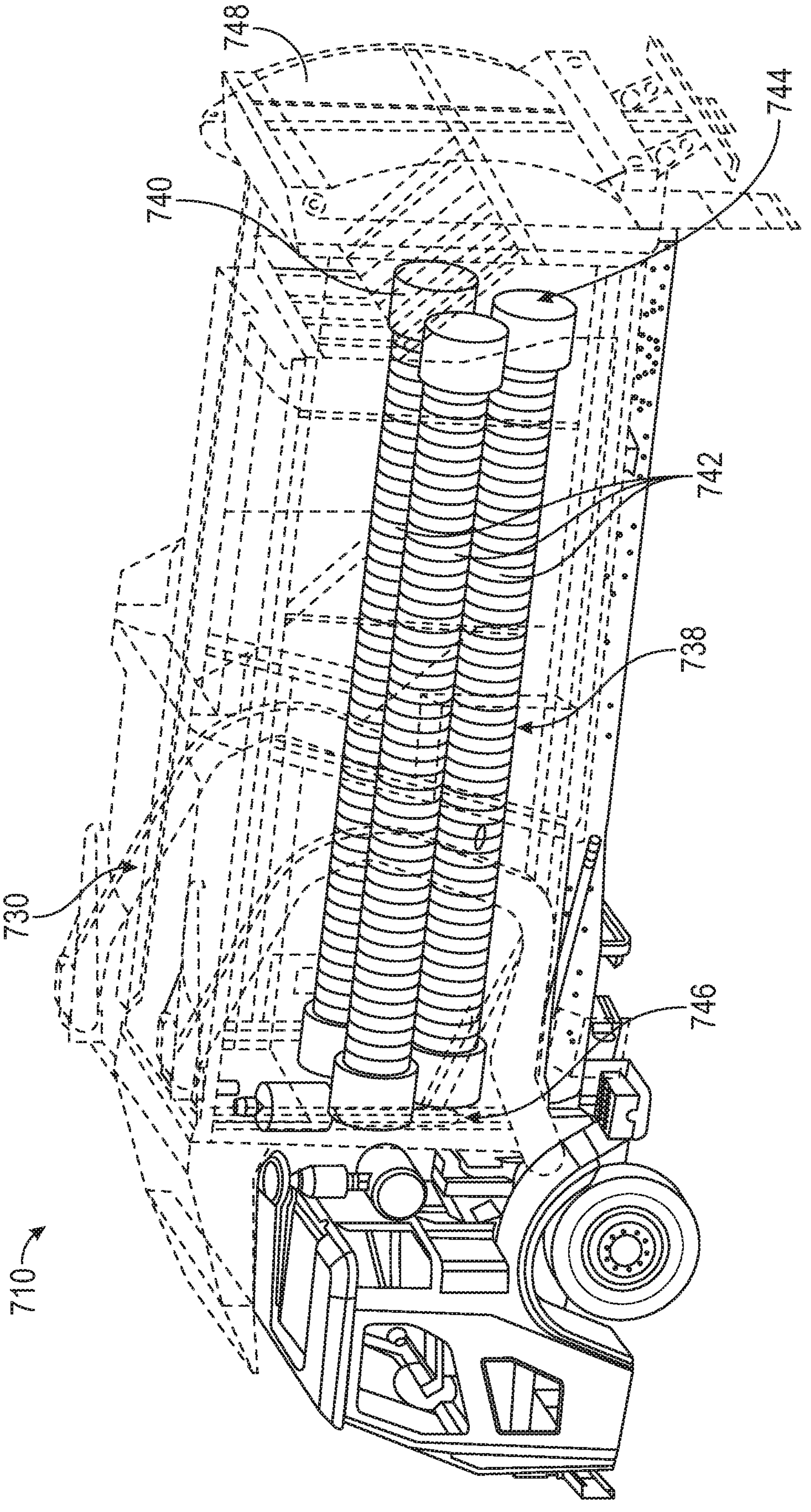
FIG. 12 is a perspective view of the refuse vehicle of FIG. 11, shown with the helical band actuator in an extended position, according to an exemplary embodiment.

Referring now to FIGS. 11 and 12, a refuse interaction mechanism 738 is shown installed within a refuse compartment 730 of a refuse vehicle 710, according to an exemplary embodiment. The refuse interaction mechanism 738 comprises a refuse interaction element or actuatable packer 740 (substantially similar to the actuatable packer 240) and a plurality of helical band actuators 742. The actuatable packer 740 is similarly configured to move within the refuse compartment 730 along a track (similar to track 242) between a receiving position (shown in FIG. 11) and a force-exerting position (e.g., a packing or ejecting position; shown in FIG. 12). The plurality of helical band actuators 742 are selectively extendable and retractable to actuate the actuatable packer 740 between the receiving position and the force-exerting position. Specifically, each helical band actuator 742 is a telescoping column and may be formed by a pair of interlocking stainless steel bands. For example, one band may have a vertical rectangular profile and the other band may have a horizontal rectangular profile. As the helical band actuators 742 are deployed or extended, the vertical band spirals up on itself into a stacked helix, forming the wall of the column, the horizontal band interlocks the continuous spiral seam of the vertical band. As the helical band actuators 742 are retracted, the two bands separate and retract into two compact coils.

For example, a first end 744 of each helical band actuator 742 is coupled to the actuatable packer 740 and a second end 746 of each helical band actuator 742 is coupled to a front wall 756 of the refuse compartment 730. Accordingly, as the helical band actuators 742 are selectively extended, the actuatable packer 740 is forced rearward within the refuse compartment 730, thus effectively compacting or packing any refuse stored within the refuse compartment 730 if a tailgate 748 (shown in FIG. 12) is closed or effectively ejecting any refuse stored within the refuse compartment 730 if the tailgate 748 is opened. In some instances, each of the helical band actuators 742 may be actuated using an electric motor (e.g., the electric motor 18, the electric motor 244), which may be powered by the on-board power source.

Figure 13:
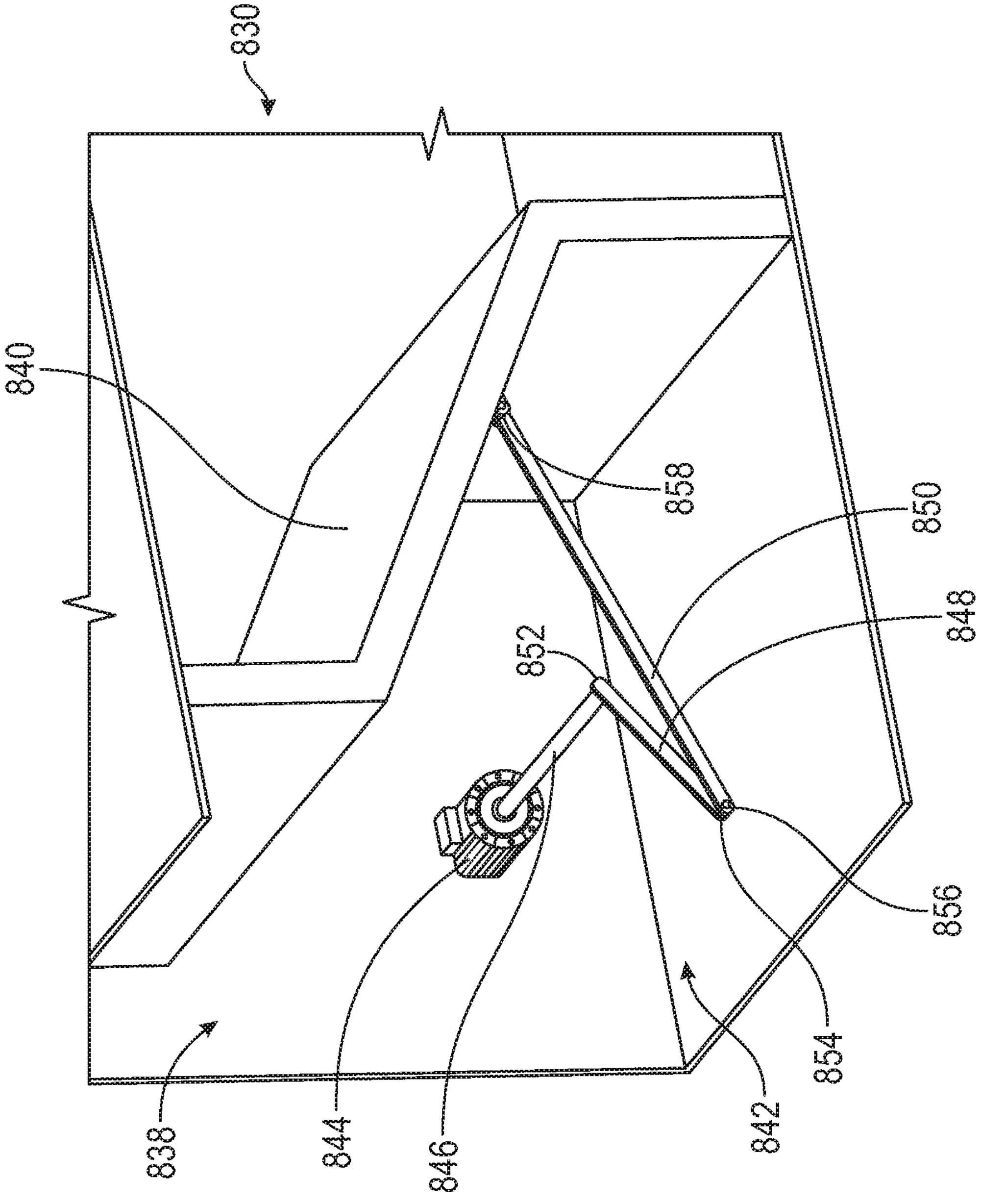
FIG. 13 is a detail view of another refuse interaction mechanism, shown with an actuatable packer in a retracted position, according to an exemplary embodiment.
Figure 14:
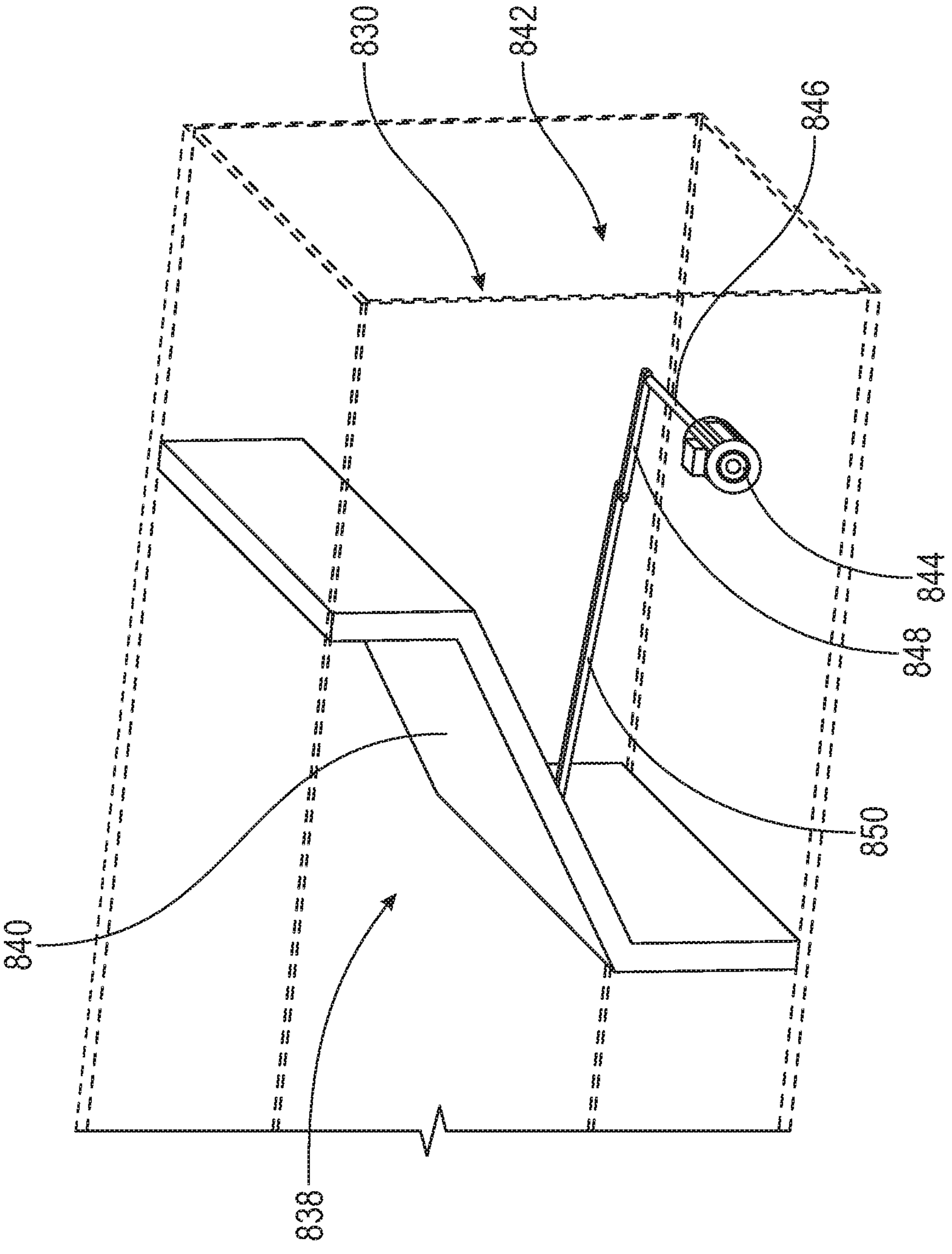
FIG. 14 is a detail view of the refuse interaction mechanism of FIG. 13, shown with the actuatable packer in a force-exerting position, according to an exemplary embodiment.

Referring now to FIGS. 13 and 14, a refuse interaction mechanism 838 is shown installed within a refuse compartment 830 of a refuse vehicle (similar to refuse vehicle 210), according to an exemplary embodiment. The refuse interaction mechanism 838 comprises a refuse interaction element or actuatable packer 840 (substantially similar to the actuatable packer 240) and a crank slider mechanism 842. The actuatable packer 840 is similarly configured to move within the refuse compartment 830 along a track (similar to the track 242) between a receiving position (shown in FIG. 13) and a force-exerting position (e.g., a packing or ejecting position; shown in FIG. 14). The crank slider mechanism 842 is configured to selectively actuate the actuatable packer 840 between the receiving position and the force-exerting position.

The crank slider mechanism 842 includes an electric motor 844, a crank shaft 846, a first slider linkage 848, and a second slider linkage 850. The electric motor 844 is configured to selectively rotate the crank shaft 846 about a central axis of the crank shaft 846. The electric motor 844 may be similar to the electric motor 18 and/or the electric motor 244. For example, the electric motor 844 is similarly powered by the on-board power source.

The first slider linkage 848 is rigidly coupled or fixed at a first end 852 to the crank shaft 846. Accordingly, as the crank shaft 846 is rotated, the first slider linkage 848 is configured to rotate about the first end 852 of the first slider linkage 848. A second end 854 of the first slider linkage 848 is pivotally coupled to a first end 856 of the second slider linkage 850. Accordingly, as the crank shaft 846 is rotated, the second end 854 of the first slider linkage 848, and thus the first end 856 of the second slider linkage 850, is configured to travel in a circular path around the crank shaft 846. A second end 858 of the second slider linkage 850 is pivotally coupled to the actuatable packer 840.

Accordingly, as the crank shaft 846 is rotated by the electric motor 844 the first slider linkage 848 is rotated about the first end 852 of the first slider linkage 848, the first end 856 of the second slider linkage 850 is moved in a circular path around the crank shaft 846, and the second end 858 of the second slider linkage 850 is configured to either pull the actuatable packer 840 forward, into the receiving position (shown in FIG. 13), or push the actuatable packer 840 rearward, into the force-exerting position (shown in FIG. 14). Thus, the electric motor 844 may be used to selectively actuate the actuatable packer 840 between the receiving position and the ejecting position. The electric motor 844 may be powered by an on-board power source (similar to the battery system 20).

In some instances, the crank slider mechanism 842 may further include an impulse generating mechanism configured to selectively provide additional rotational torque on the crank shaft 846. For example, the crank slider mechanism 842 may further include a flywheel (similar to the flywheel 252) or a coil spring (similar to the coil spring 254), which may be continuously or periodically “charged” by the electric motor 844 and selectively used to apply a sudden high amount of rotational energy to the crank shaft 846 to effectively compact or pack refuse.

In some instances, the length of the first slider linkage, the length of the second slider linkage, and a gear ratio between the electric motor 844 and the crank shaft 846 may be selected based on a desired compaction force to be applied by actuatable packer 840 onto refuse contained within the refuse compartment (e.g., the refuse compartment 230).

Figure 15:
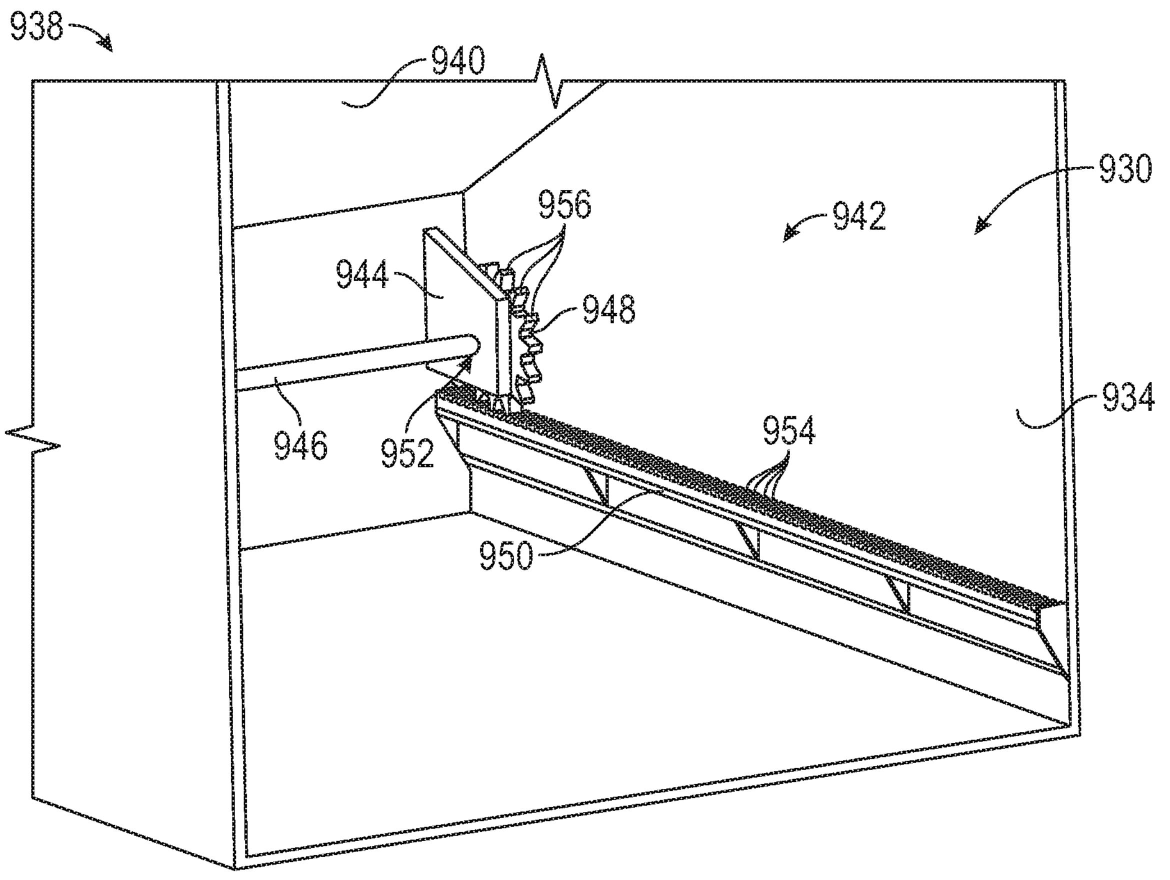
FIG. 15 is a detail view of another refuse interaction mechanism, shown with an actuatable packer in a retracted position, according to an exemplary embodiment.

Referring now to FIG. 15, a refuse interaction mechanism 938 is shown installed within a refuse compartment 930 of a refuse vehicle (similar to refuse vehicle 210), according to an exemplary embodiment. The refuse interaction mechanism 938 comprises a refuse interaction element or actuatable packer 940 (substantially similar to the actuatable packer 240) and a rack and pinion mechanism 942. The actuatable packer 940 is similarly configured to move within the refuse compartment 930 between a receiving position and a force-exerting position (e.g., a packing or ejecting position). The rack and pinion mechanism 942 is configured to selectively actuate the actuatable packer 940 between the receiving position and the force-exerting position.

The rack and pinion mechanism 942 includes a pair of packer engagement flanges 944 (one of which being depicted in FIG. 15), a crank shaft 946, a pair of pinion gears 948 (one of which being depicted in FIG. 15), and a pair of lantern racks 950 (one of which being depicted in FIG. 15). The pair of packer engagement flanges 944 are rigidly coupled to the actuatable packer 940. Each packer engagement flange 944 further includes an aperture 952 configured to rotatably receive the crank shaft 946. The crank shaft 946 is received within the apertures 952 of the packer engagement flanges 944 and is configured to be selectively rotated about a central axis of the crank shaft 946 by an electric motor (similar to the electric motor 18, the electric motor 244, the electric motor 844, etc.). The electric motor may be powered by an on-board power source (similar to the battery system 20). In some instances, the electric motor is coupled to the actuatable packer 940 between the pair of packer engagement flanges 944.

Each pinion gear 948 is concentric with the crank shaft 946. Each pinion gear 948 is further rotatably coupled or fixed with respect to the crank shaft 946, such that rotation of the crank shaft 946 results in rotation of each of the pinion gears 948, and vice versa. Each pinion gear 948 is further configured to meshably engage a corresponding one of the lantern racks 950. The lantern racks 950 are each rigidly fixed to a corresponding sidewall 934 of the refuse compartment 930.

Accordingly, as the electric motor rotates the crank shaft 946, the pinion gears 948 rotate, and, due to their engagement with the lantern racks 950, create a pulling or pushing force on the actuatable packer 940 via the packer engagement flanges 944. Thus, the electric motor may be used to selectively actuate the actuatable packer 940 between the receiving position and the force-exerting position.

Furthermore, the lantern racks 950 include open slots 954, allowing for refuse that may build up or otherwise be caught between teeth 956 of the pinion gears 948 and the open slots 954 of the lantern racks 950 to be pushed through the open slots 954, thus allowing for the teeth 956 of the pinion gears 948 to fully engage the open slots 954 of the lantern racks 950.

Figure 16:
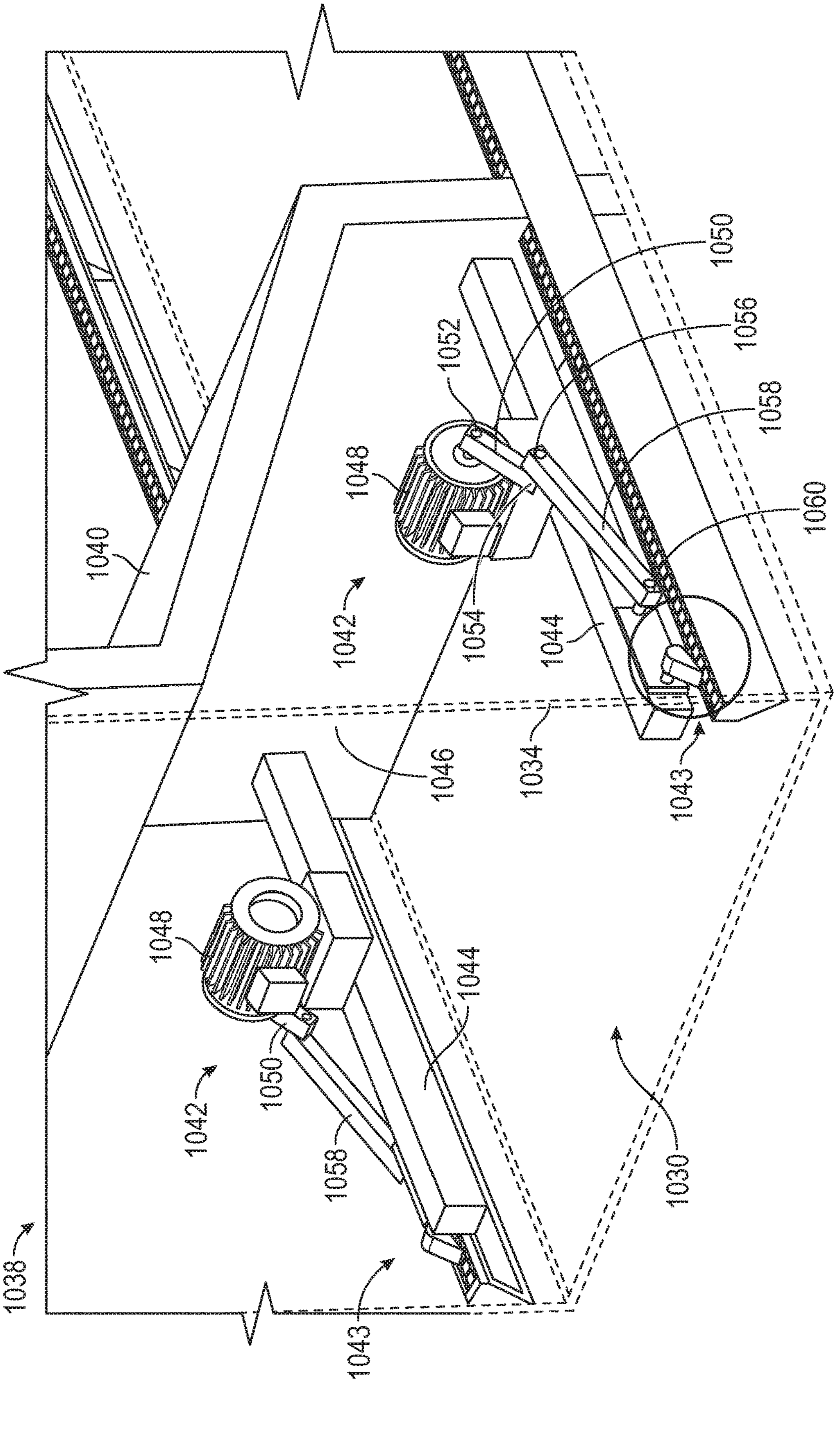
FIG. 16 is a detail view of another refuse interaction mechanism, shown with an actuatable packer in a retracted position, according to an exemplary embodiment.

Referring now to FIG. 16, a refuse interaction mechanism 1038 is shown installed within a refuse compartment 1030 of a (similar to the refuse vehicle 210), according to an exemplary embodiment. The refuse interaction mechanism 1038 comprises a refuse interaction element or actuatable packer 1040 (similar to the actuatable packer 240), a pair of crank slider mechanisms 1042, and a pair of incremental movement mechanisms 1043. The actuatable packer 1040 is similarly configured to move within the refuse compartment 1030 between a receiving position and a force-exerting position (e.g., a packing or ejecting position). The actuatable packer 1040 further includes a pair of slider mechanism engaging arms 1044 extending in a forward direction from a front surface 1046 of the actuatable packer 1040. The pair of crank slider mechanisms 1042 are configured to selectively actuate the actuatable packer 1040 between the receiving position and the force-exerting position.

Each crank slider mechanism 1042 functions in a similar manner to the crank slider mechanism 842 discussed above. For example, each crank slider mechanism 1042 similarly includes an electric motor 1048 configured to rotate a first slider linkage 1050 about a first end 1052 of the first slider linkage 1050. A second end 1054 of the first slider linkage 1050 is similarly pivotally coupled to a first end 1056 of a second slider linkage 1058. However, the electric motor 1048 of each crank slider mechanism 1042 is coupled to a corresponding slider mechanism engaging arm 1044 and a second end 1060 of the second slider linkage 1058 is configured to engage a corresponding incremental movement mechanism 1043.

Figure 17:
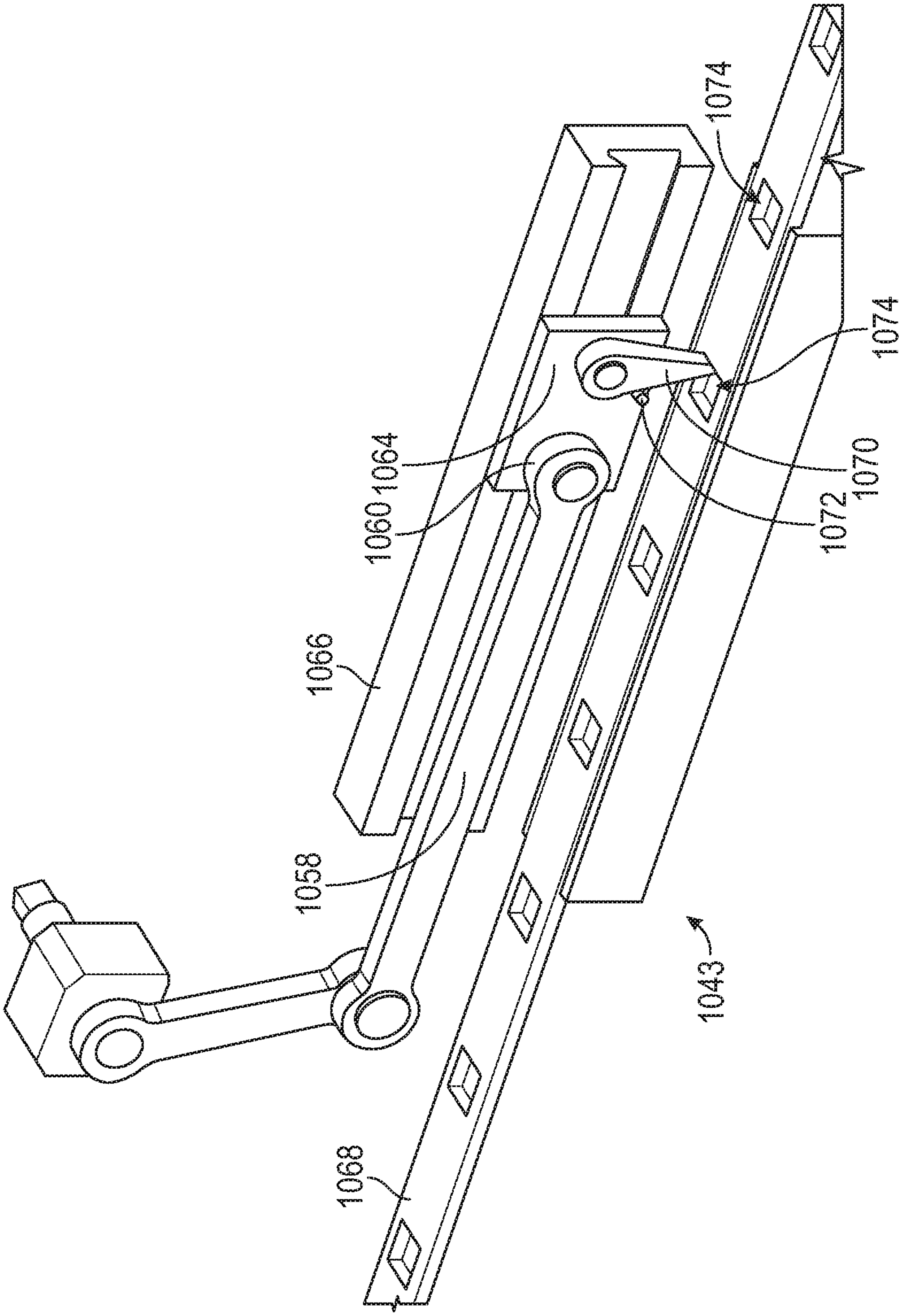
FIG. 17 is a detail view of an incremental movement mechanism of the refuse interaction mechanism of FIG. 16, according to an exemplary embodiment.

As shown in FIG. 17, the incremental movement mechanism 1043 includes a sliding member 1064, a slide channel

1066, and a locking rack 1068. The sliding member 1064 is pivotally coupled to the second end 1060 of the second slider linkage 1058. The sliding member 1064 is further slidably received within the slide channel 1066. The sliding member 1064 further includes a locking pawl 1070 and a directional locking pin 1072. The locking pawl 1070 and the directional locking pin 1072 are collectively configured such that the locking pawl 1070 engages a slot 1074 of the locking rack 1068 during operation, and the directional locking pin 1072 only permits translational motion of the sliding member 1064 in one direction, with respect to the refuse compartment 1030 (e.g., in a first direction or a second direction, opposite the first direction), based on an orientation of the directional locking pin 1072. That is, the directional locking pin 1072 is configured to allow the locking pawl 1070 to pivot in one rotational direction, thus allowing the locking pawl 1070 to ratchet along the locking rack 1068 in one translational direction (e.g., rearward with respect to the refuse compartment 1030), and to prevent the locking pawl 1070 from pivoting in the opposite rotational direction, thus preventing the locking pawl 1070 from ratcheting along the locking rack 1068 in the other translational direction (forward with respect to the refuse compartment 1030). The slide channel 1066 and the locking rack 1068 are both rigidly fixed to a sidewall 1034 (shown in FIG. 16) of the refuse compartment 1030.

Accordingly, during operation, the pair of crank slider mechanisms 1042 may be used to selectively move the actuatable packer 1040 between the receiving position and the force-exerting position. That is, as the electric motor 1048 rotates the first slider linkage 1050 and the second slider linkage 1058, the pair of crank slider mechanisms 1042 gradually move the actuatable packer 1040 along the locking rack 1068 because the locking pawl 1070 only allows relative motion between the sliding member 1064 and the locking rack 1068 in one translational direction due to the orientation of the directional locking pin 1072 with respect to the locking pawl 1070. Once the actuatable packer 1040 is moved completely in one direction (e.g., from the receiving position to the force-exerting position), the directional locking pin 1072 is configured to be selectively movable to an opposite side of the locking pawl 1070 to allow for the actuatable packer 1040 to be moved in the opposite direction (e.g., from the force-exerting position to the receiving position).

Figure 18:
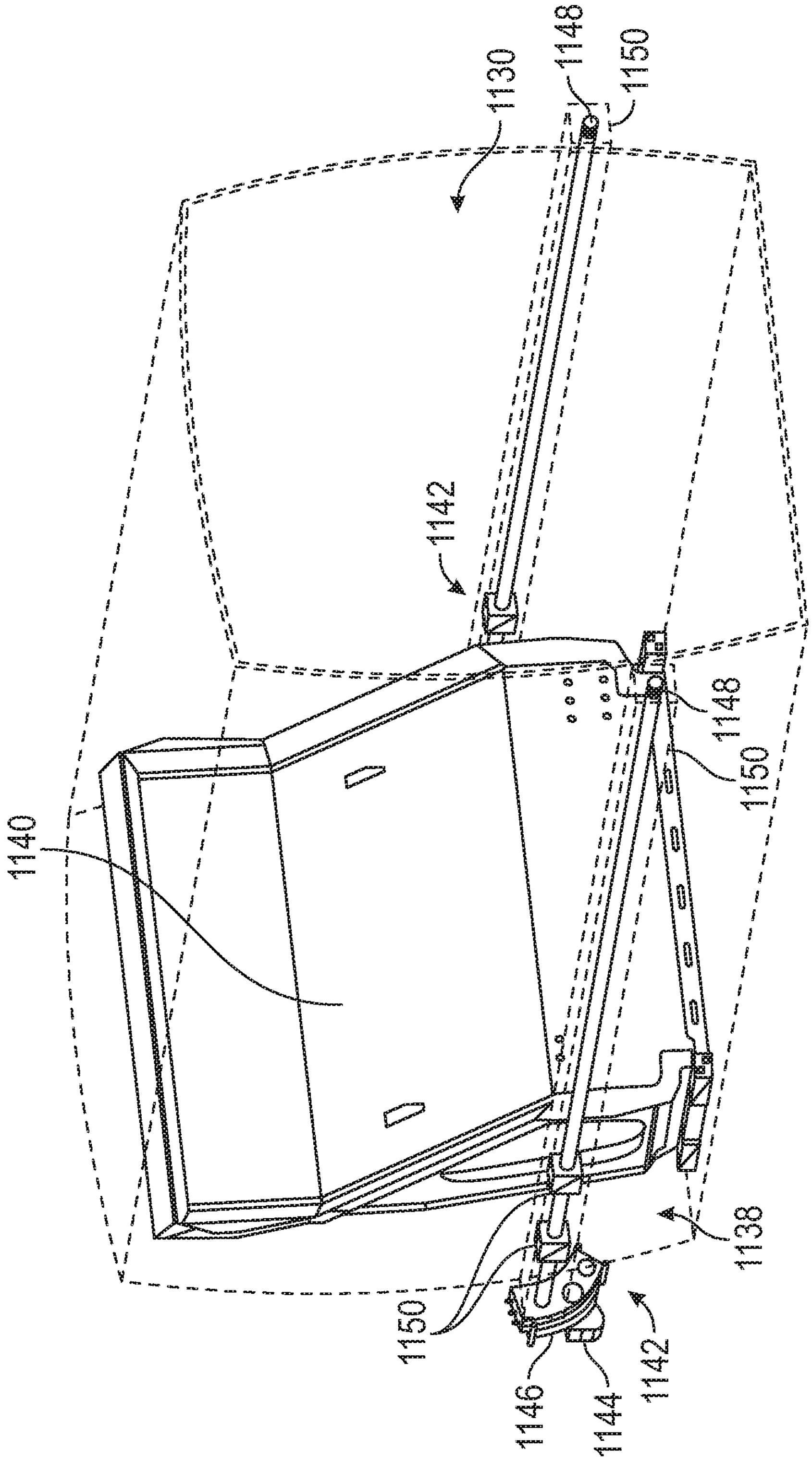
FIG. 18 is a perspective view of another refuse compartment including another refuse interaction mechanism, according to an exemplary embodiment.
Figure 19:
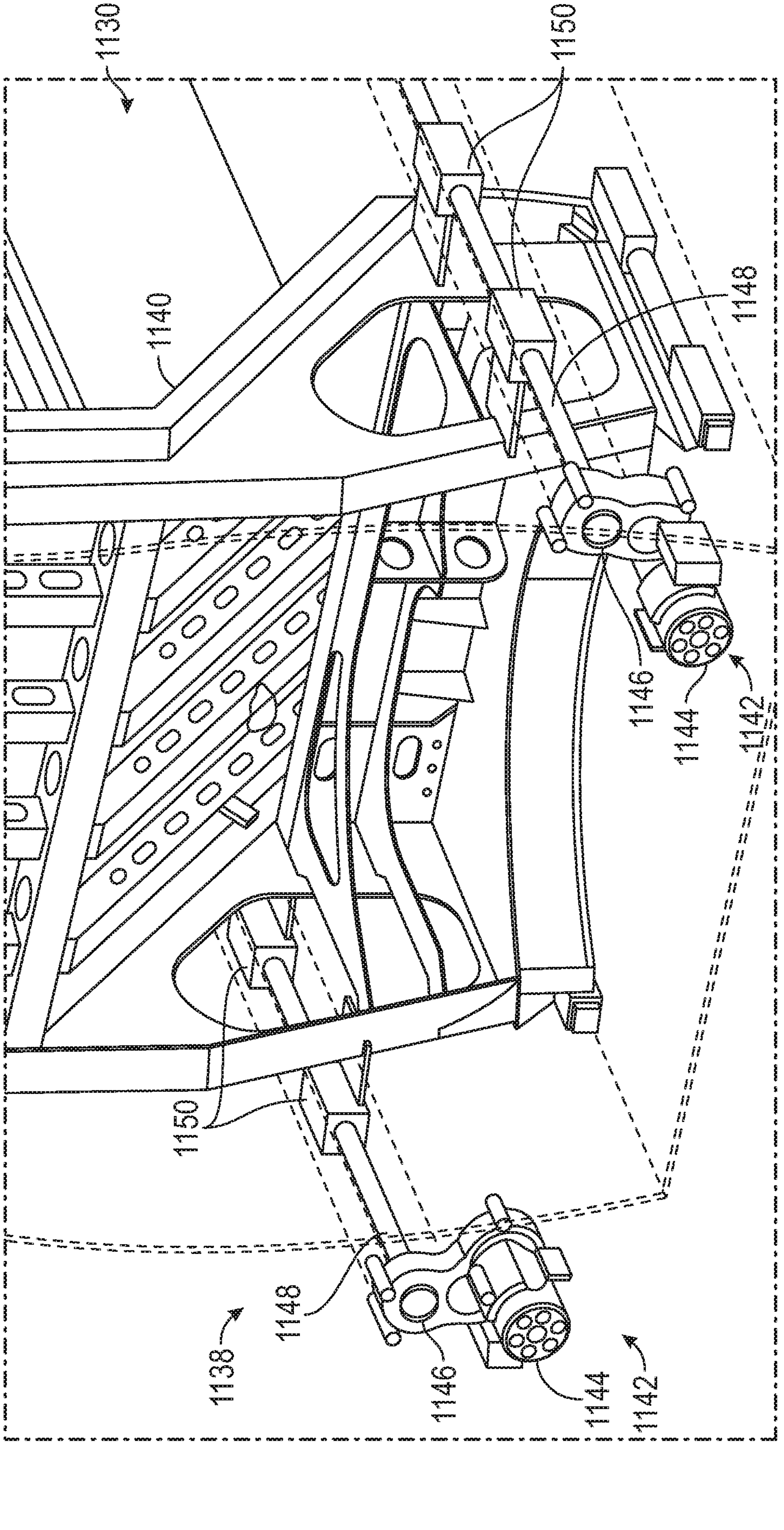
FIG. 19 is a detail view of the refuse interaction mechanism FIG. 18, according to an exemplary embodiment.

Referring now to FIGS. 18 and 19, a refuse interaction mechanism 1138 is shown installed within a refuse compartment 1130 of a refuse vehicle (similar to the refuse vehicle 210), according to an exemplary embodiment. The refuse interaction mechanism 1138 comprises a refuse interaction element or actuatable packer 1140 (similar to the actuatable packer 240) and a pair of electrically-driven ball screw mechanisms 1142. The actuatable packer 1140 is similarly configured to move within the refuse compartment 1130 a receiving position and a force-exerting position (e.g., a packing or ejecting position). The pair of electrically-driven ball screw mechanisms 1142 are configured to selectively actuate the actuatable packer 1140 between the receiving position and the force-exerting position.

Each electrically-driven ball screw mechanism 1142 includes an electric motor 1144, a gearbox 1146, a central screw rod 1148, and a pair of ball screws 1150. The electric motor 1144 is configured to provide rotational actuation to the central screw rod 1148 via the gearbox 1146. The gearbox 1146 is configured to provide at least two gear ratios between the rotational speed of the electric motor 1144 and the rotational speed of the central screw rod 1148. The central screw rod 1148 extends along a length of the refuse compartment 1130, and is disposed within an inset housing channel 1152 (shown in FIG. 18) of the refuse compartment 1130. The pair of ball screws 1150 are rigidly coupled to the actuatable packer 1140. The pair of ball screws 1150 are further configured to engage the central screw rod 1148, and to translate the rotational motion of the central screw rod 1148 into translational motion of the actuatable packer 1140.

Accordingly, the electric motors 1144 are configured to selectively actuate the actuatable packer 1140 between the receiving position and the force-exerting position. The gearboxes 1146 may be configured to selectively provide low speed/high torque gear ratios between the electric motors 1144 and the central screw rods 1148 when the actuatable packer 1140 is packing or compacting refuse within the refuse compartment 1130. The gearboxes 1146 may further be configured to selectively provide high speed/low torque gear ratios between the electric motors 1144 and the central screw rods 1148 when the actuatable packer 1140 is ejecting refuse from the refuse compartment 1130.

Figure 20:
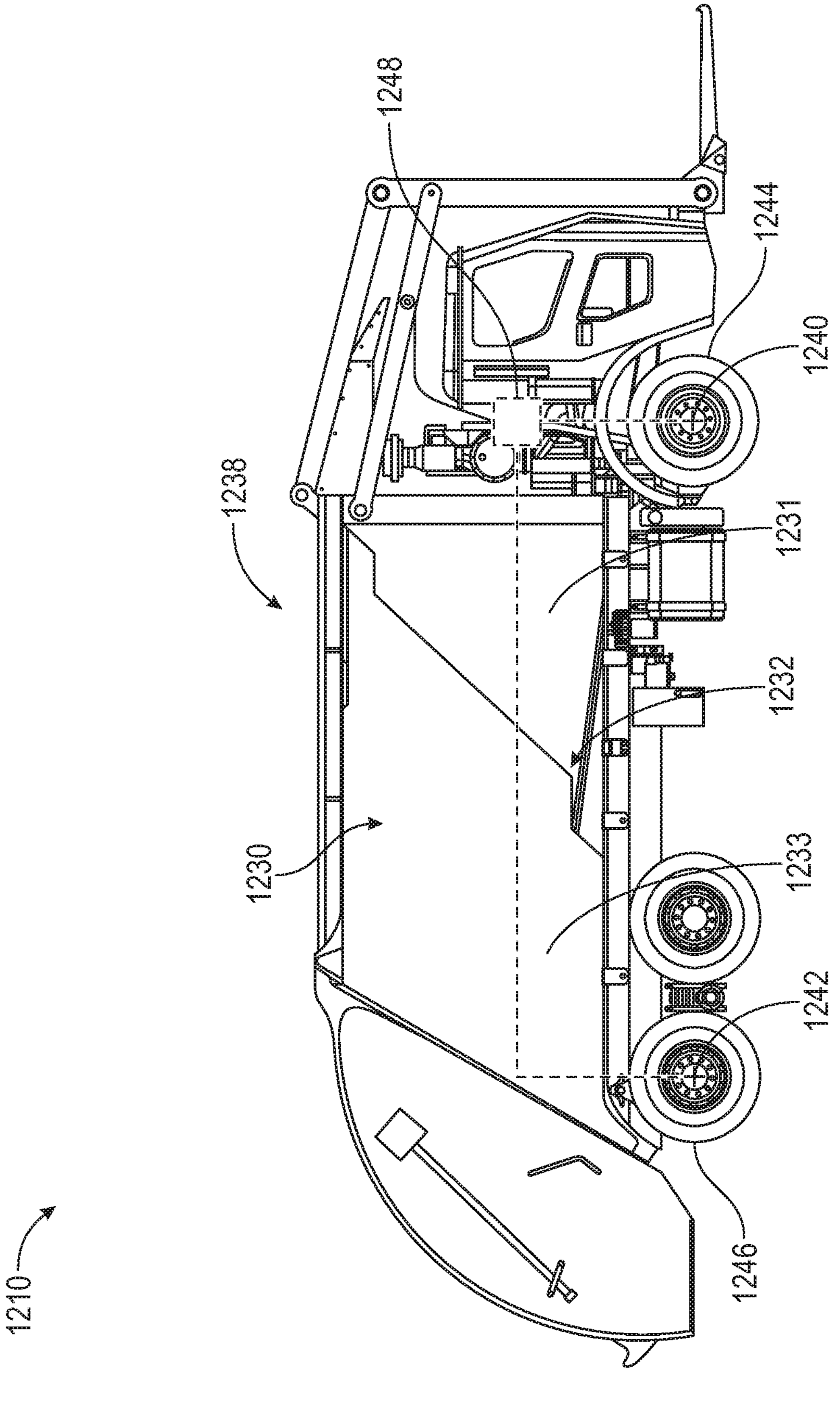
FIG. 20 is a schematic view of another refuse vehicle, shown in a compacted position, according to an exemplary embodiment.
Figure 21:
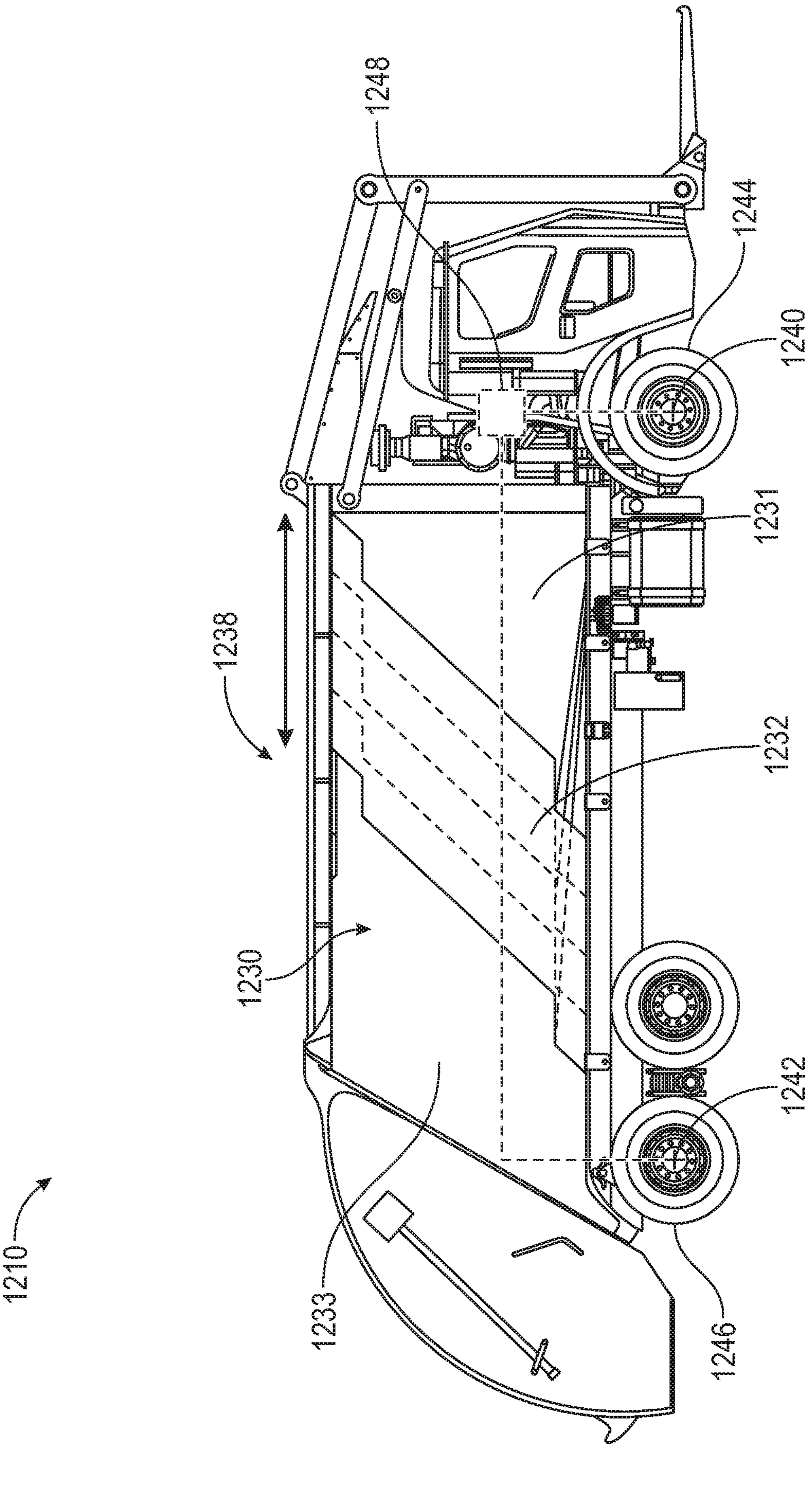
FIG. 21 is a schematic view of the refuse vehicle of FIG. 20, shown in an extended position, according to an exemplary embodiment.
Figure 22:
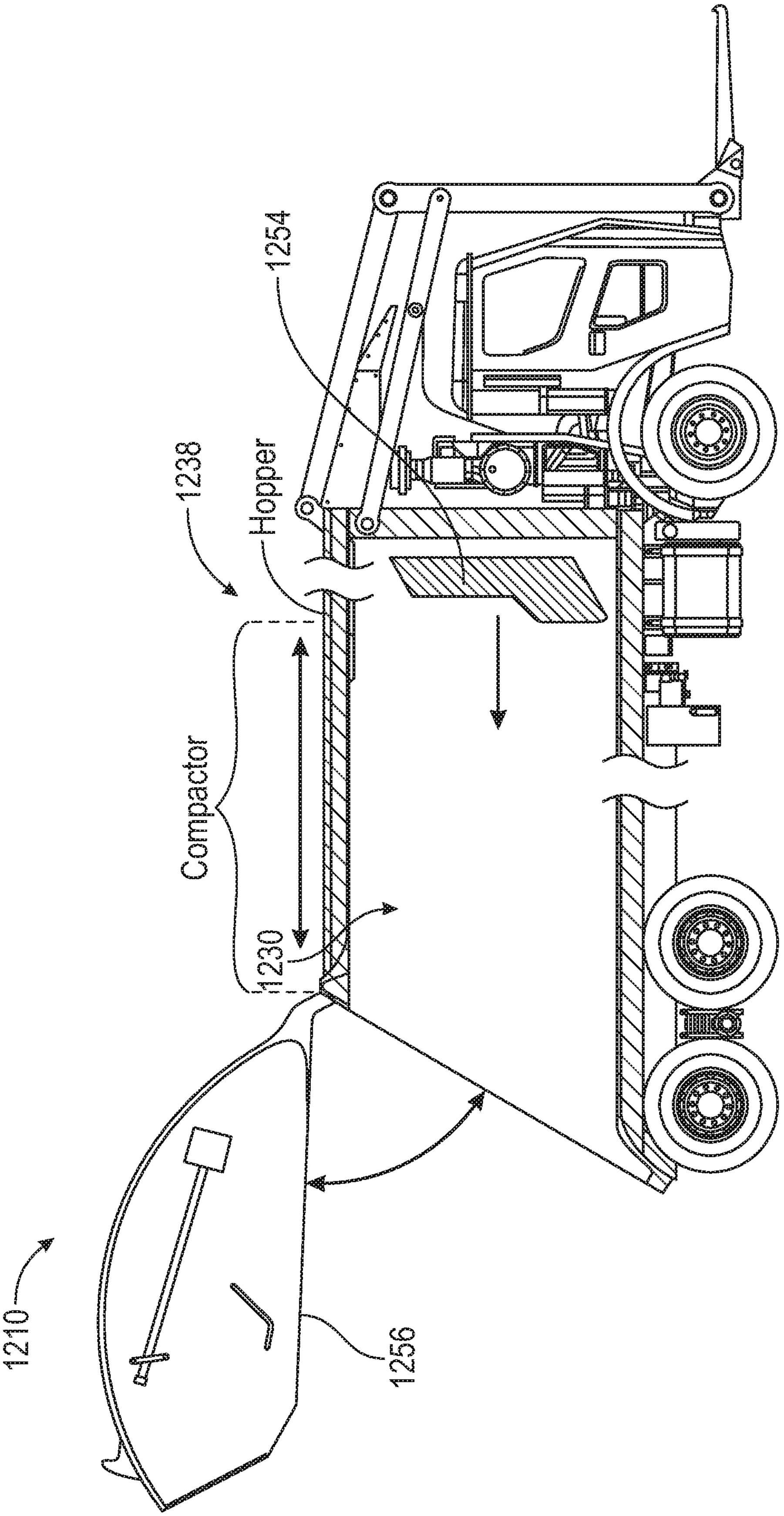
FIG. 22 is a schematic view of the refuse vehicle of FIG. 20, shown with a tailgate in an opened position, according to an exemplary embodiment.

Referring now to FIGS. 20-22, a refuse vehicle 1210 is shown, according to an exemplary embodiment. The refuse vehicle 1210 may be substantially similar to the refuse vehicle 10 and/or the refuse vehicle 210, described above. Accordingly, the following description will focus on the differences between the refuse vehicle 1210 and the previously-described refuse vehicles 10, 210.

The refuse vehicle 1210 includes a refuse interaction mechanism 1238 in the form of a selectively expandable and compactable refuse compartment 1230. For example, the refuse compartment 1230 includes a front portion 1231, a selectively expandable portion 1232 (shown in FIG. 21), and a rear portion 1233. The selectively expandable portion 1232 is configured to expand and collapse to allow for a change in internal volume of the refuse compartment 1230. Accordingly, the retractable refuse compartment 1230 is moveable between a compacted position (shown in FIG. 20) and an expanded position (shown in FIG. 21).

The refuse vehicle 1210 further includes a front electric motor 1240 and a rear electric motor 1242. The front electric motor 1240 is configured to provide rotational motion to front wheels 1244 of the refuse vehicle 1210. The rear electric motor 1242 is configured to provide rotational motion to rear wheels 1246. The front electric motor 1240 and the rear electric motor 1242 are both in communication with a compaction controller 1248 via a wired or wireless connection (signified by dashed lines). The compaction controller 1248 is configured to control compaction and expansion of the refuse compartment 1230.

In some instances, the compaction and expansion of the refuse compartment 1230 may be controlled by controlling a temporary speed differential between the front wheels 1244 and the rear wheels 1246. In some instances, the compaction controller 1248 is further in communication with a braking system configured to selectively apply braking to the front wheels 1244 and the rear wheels 1246. In these instances, when the refuse vehicle 1210 is braking, the compaction controller 1248 may be configured to apply significantly more braking (or in some cases only apply braking) to the front wheels 1244, such that the momentum of the rear portion 1233 may be used to aid in the compaction of the refuse within the refuse compartment 1230.

As shown in FIG. 22, the refuse vehicle 1210 may further include an ejector 1254 configured to selectively eject refuse out of the refuse compartment 1230 when a tailgate 1256 of the refuse vehicle 1210 is opened. The ejector 1254 may be any suitable type of ejector mechanism described herein.

Figure 23:
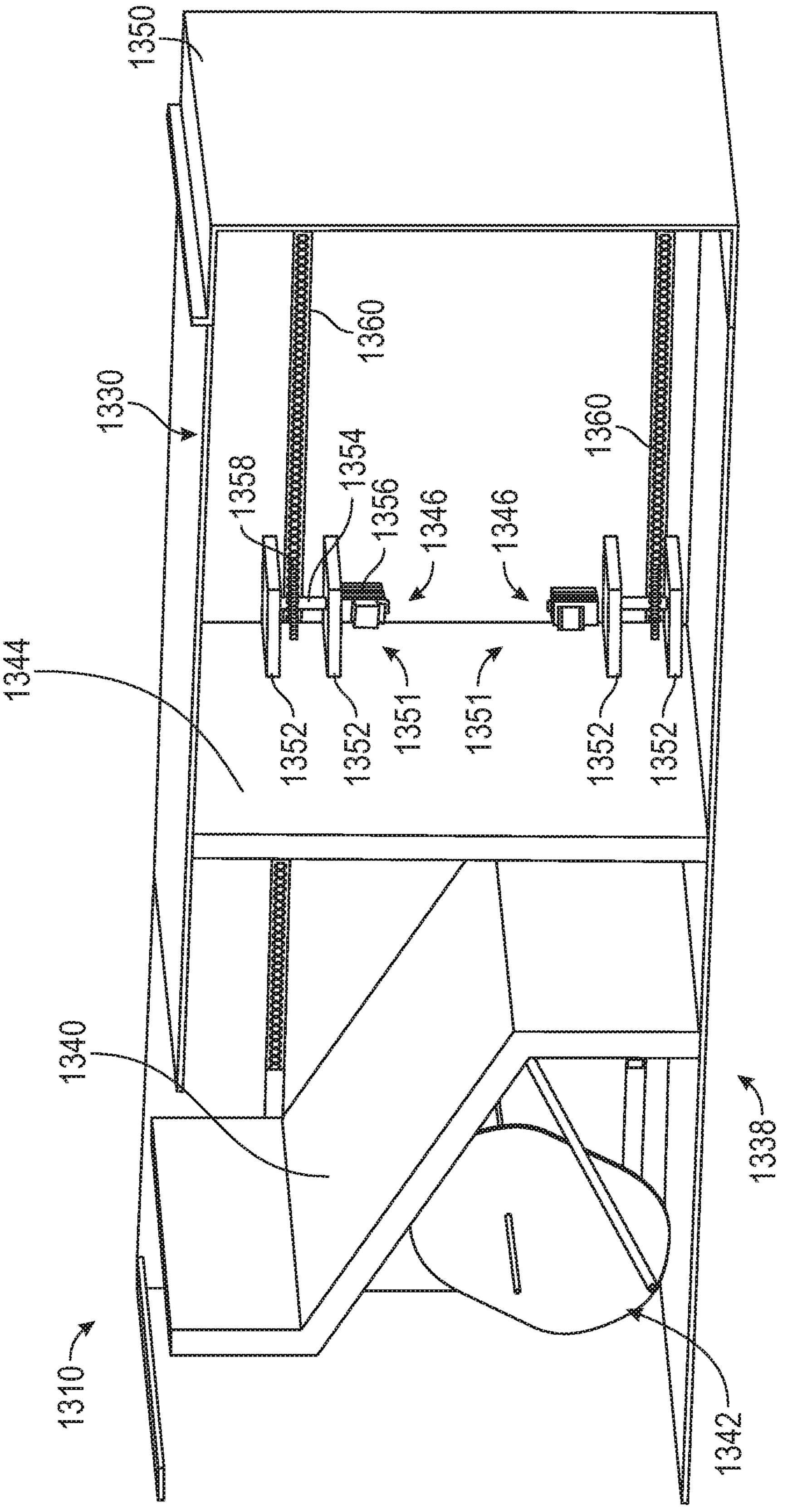
FIG. 23 is a cross-sectional perspective view of a refuse compartment of another refuse vehicle, according to an exemplary embodiment.
Figure 24:
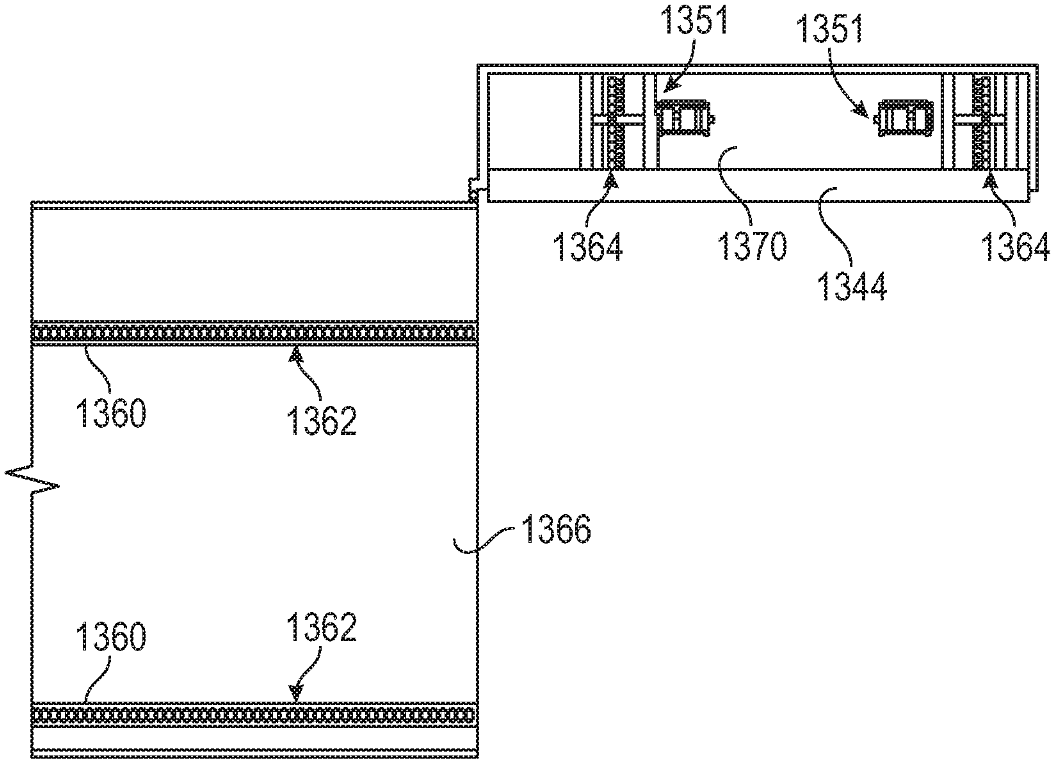
FIG. 24 is a cross-sectional view of the refuse compartment of FIG. 24, shown with a tailgate in an opened position, according to an exemplary embodiment.

Referring now to FIGS. 23 and 24, a portion of a refuse vehicle 1310 is shown, according to an exemplary embodiment. The refuse vehicle 1310 may be substantially similar to any of the refuse vehicles described herein. The refuse vehicle 1310 includes a refuse interaction mechanism 1338 comprising a first refuse interaction element or actuator packer 1340, a packer actuation device 1342, a second refuse interaction element or moveable rear wall 1344, and a rear wall actuation mechanism 1346. The actuator packer 1340 may similarly be actuated between a receiving position and a force-exerting position (e.g., a packing or ejecting position). The packer actuation device 1342 may be any suitable actuation device (e.g., similar to any of the linear actuators 342, the scissor stack mechanism 442, the two-way winch mechanism 542, the rigid chain actuator mechanisms 642, the helical band actuators 742, the crank slider mechanism 842, the rack and pinion mechanism 942, the pair of crank slider mechanisms 1042 and the pair of incremental movement mechanism 1043, the electrically-driven ball screw mechanisms 1142) for moving the actuator packer 1340 between the receiving position and the force-exerting position.

The moveable rear wall 1344 is configured to be selectively moved along the rear wall track 1348, between a packing position (shown in FIG. 23), where the moveable rear wall 1344 is disposed within a refuse compartment 1330 of the refuse vehicle 1310, and an ejecting position (shown in FIG. 24), where the moveable rear wall 1344 is disposed within a tailgate 1350 of the refuse vehicle 1310. The rear wall actuation mechanism 1346 comprises a pair of rack and pinion mechanisms 1351, which function similarly to the rack and pinion mechanisms 942, discussed above. For example, each of the rack and pinion mechanisms 1351 include a pair of rear wall engagement flanges 1352, a crank shaft 1354, an electric motor 1356, a pinion gear 1358, and a rack 1360.

Each rear wall engagement flange 1352 is rigidly coupled to the moveable rear wall 1344 and includes an aperture (similar to the apertures 952) configured to receive the crank shaft 1354. The crank shaft 1354 is received within the apertures of the rear wall engagement flanges 1352. The electric motor 1356 is rotatably coupled to the crank shaft 1354, such that the electric motor 1356 may selectively rotate the crank shaft 1354 about a central axis of the crank shaft 1354. The pinion gear 1358 is rotatably fixed to the crank shaft 1354, such that rotation of the crank shaft 1354 results in rotation of the pinion gear 1358, and vice versa. The pinion gear 1358 further includes a plurality of gear teeth configured to engage slots of the rack 1360 to translate rotational motion of the pinion gear 1358 into translational motion of the moveable rear wall 1344.

The rack 1360 of each rack and pinion mechanism 1351 includes a refuse compartment portion 1362 and a tailgate portion 1364 (as best shown in FIG. 24). The refuse compartment portion 1362 extends along a sidewall 1366 of the refuse compartment 1330 of the refuse vehicle 1310. The tailgate portion 1364 extends along a sidewall 1370 of the tailgate 1350 of the refuse vehicle 1310. Accordingly, the electric motors 1356 are configured to selectively actuate the moveable rear wall 1344 between the packing position and the ejecting position. In the packing position, the moveable rear wall 1344 is moved forward within the refuse compartment 1330 to pack or compact refuse within the refuse compartment 1330. In the ejecting position, the moveable rear wall 1344 is moved rearward into the tailgate 1350 of the refuse vehicle 1310. With the moveable rear wall 1344 disposed in the ejecting position, the tailgate 1350 may be opened (as shown in FIG. 24), and the moveable rear wall 1344 may move with the tailgate 1350, out of the way of any refuse that is to be ejected out of the refuse compartment 1330.

Figure 25:
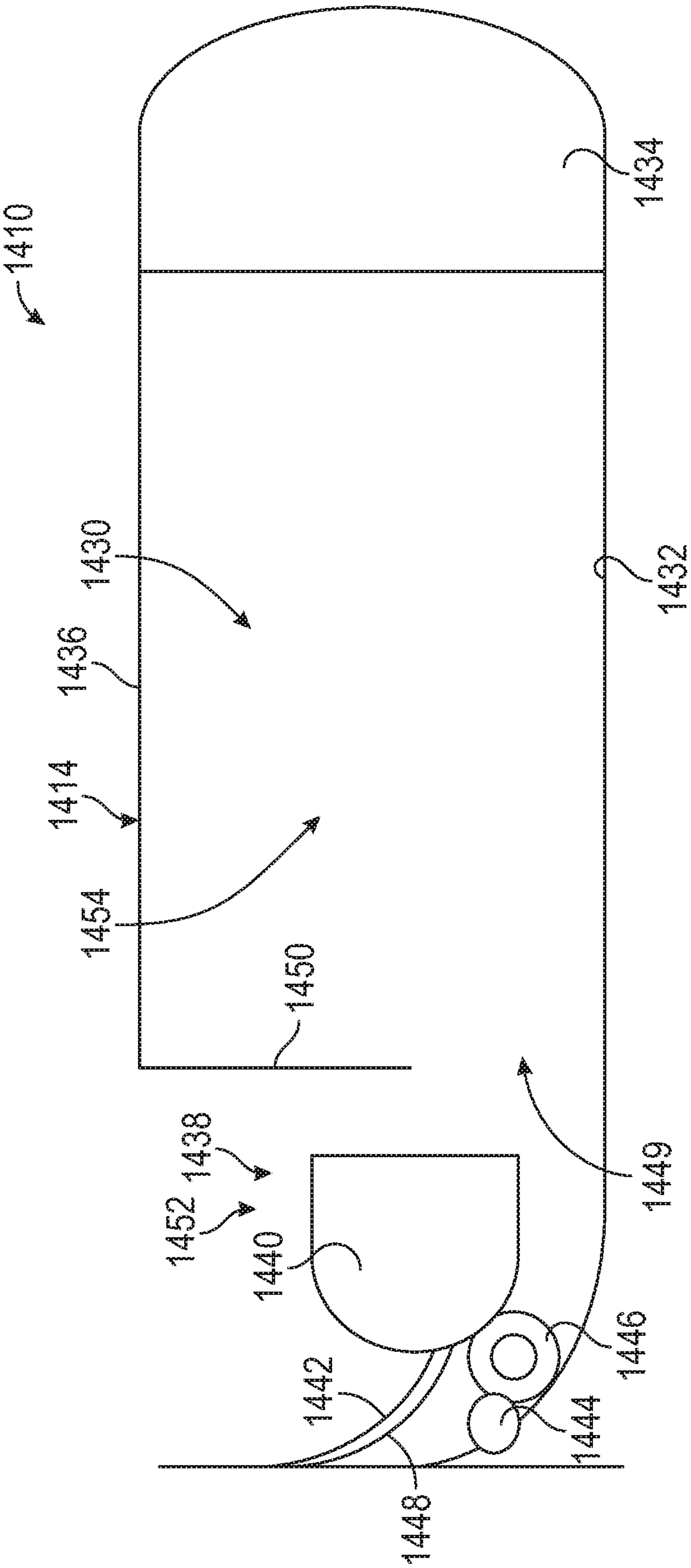
FIG. 25 is a schematic view of a refuse compartment of another refuse vehicle, according to an exemplary embodiment.

As shown in FIG. 25, a vehicle, shown as refuse vehicle 1410, is similarly configured as a front-loading refuse vehicle. In some embodiments, the refuse vehicle 1410 is substantially similar to the refuse vehicles 10, 210, 1210, 1310 described above. The refuse vehicle 1410 similarly includes a body assembly 1414 having a collection chamber shown as a refuse compartment 1430. The refuse compartment 1430 includes a floor 1432, a tailgate 1434, a cover 1436, and sidewalls (e.g., similar to sidewalls 234). The refuse vehicle 1410 further includes a refuse interaction mechanism 1438, similar to the refuse interaction mechanism 238 described above.

The refuse interaction mechanism 1438 includes a refuse interaction element or actuatable packer 1440 that is slidably engaged with a track 1442. As illustrated, the track 1442 defines an arcuate or curved path or trajectory. As such, when actuated, the actuatable packer 1440 takes a pendulum-like path along the track 1442. An electric motor 1444 is configured to provide rotational actuation to a drive gear 1446, which is configured to interface with a rack 1448. The rack 1448 is both slidably coupled to the track 1442 and rigidly coupled to the actuatable packer 1440. The rack 1448 is further configured to follow the arcuate or curved path of the track 1442. Accordingly, movement of the rack 1448 along the track 1442 correspondingly results in movement of the actuatable packer 1440 along the track 1442.

Further, because of the curved or arcuate shape of the track 1442, if a high impulse is desired, the actuatable packer 1440 can be retracted or raised up the curved track 1442, thereby "charging" the actuatable packer 1440 with gravitational potential energy. Then, the electric motor 1444 may release the raised actuatable packer 1440, allowing gravity to quickly pull the actuatable packer down, such that the actuatable packer 1440 is moved along the curved track 1442 toward the tailgate 1434 to hammer refuse through an opening 1449 in a mid-wall 1450 of the refuse vehicle 1410, from a hopper volume 1452 of the refuse vehicle 1410 into a storage volume 1454 of the refuse vehicle 1410. In some embodiments, the electric motor 1444 may further compliment the gravitational force by applying additional forward force on the rack 1448, and thereby the actuatable packer 1440, while the actuatable packer 1440 is moving forward to hammer the refuse through the opening 1449.

Thus, the combined force provided by gravity and the electric motor 1444 allows for the refuse interaction mechanism 1438 to provide a higher instantaneous hammering force than would otherwise be possible using the electric motor 1444 alone. Further, in some embodiments, the hammering force provided by gravity alone may be higher than would be possible using the electric motor 1444 alone.

Figure 26:
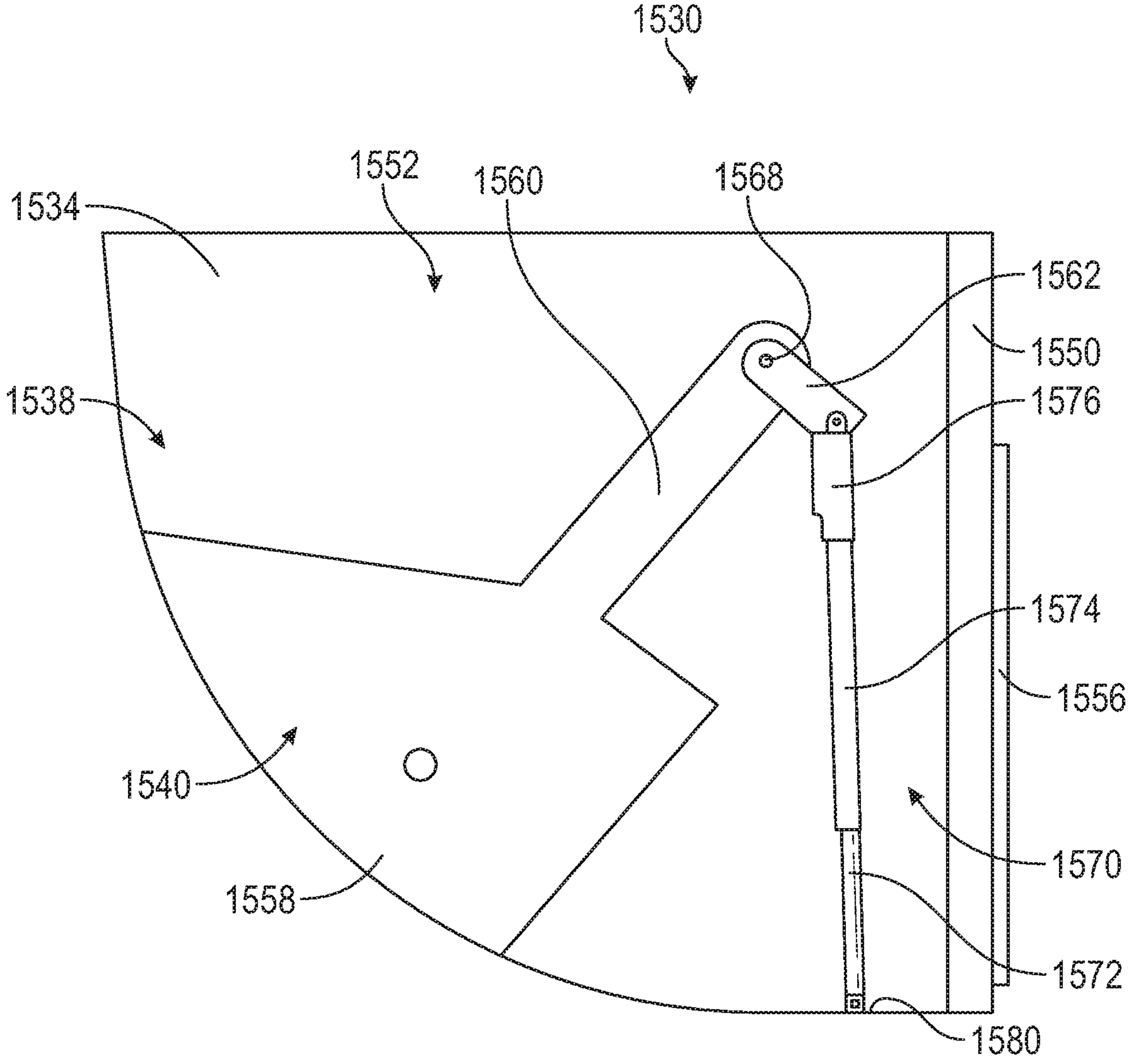
FIG. 26 is a cross-sectional view of a refuse compartment of another refuse vehicle, shown with a packing pendulum in a receiving position, according to an exemplary embodiment.
Figure 27:
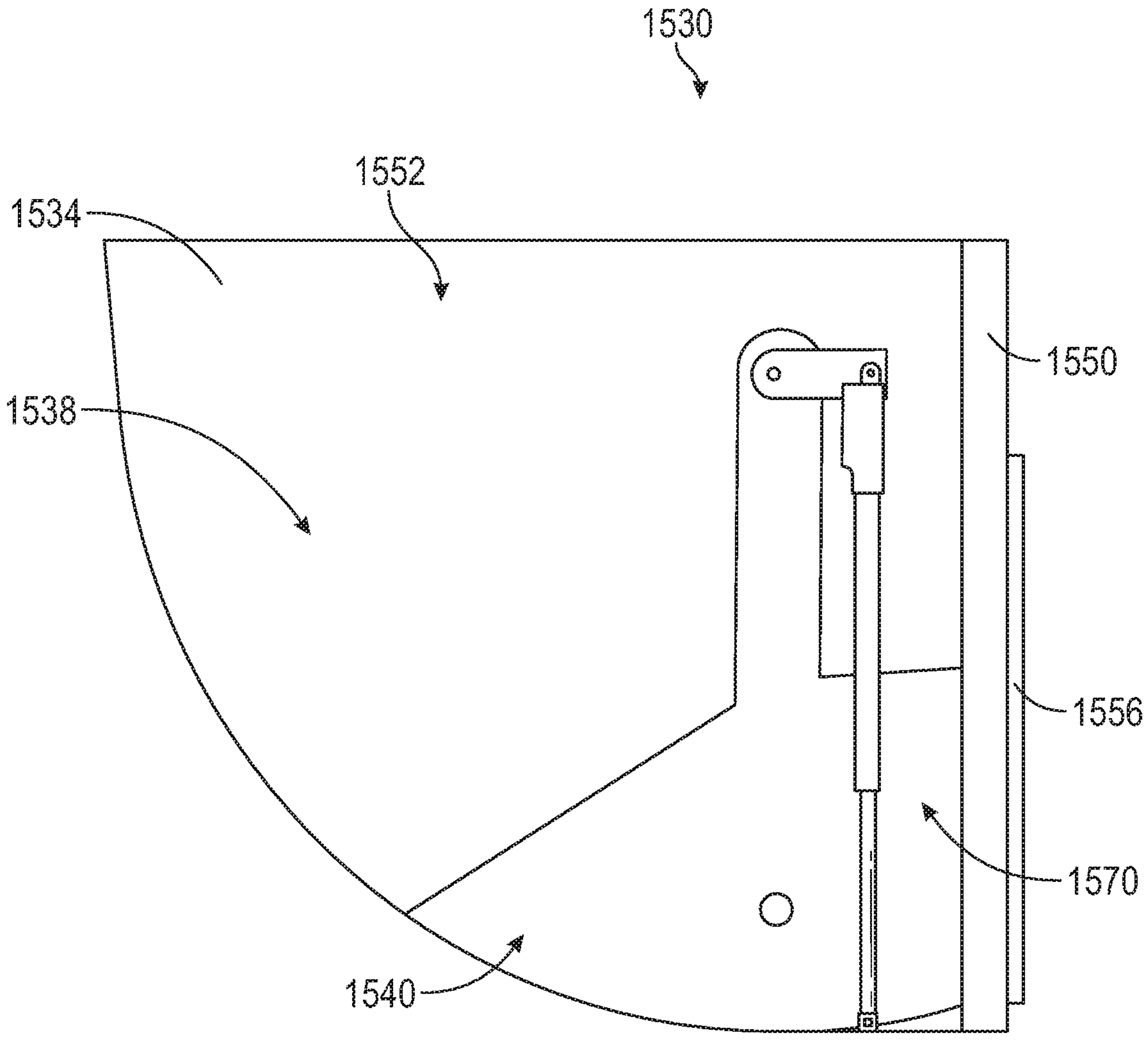
FIG. 27 is a cross-sectional view of the refuse compartment of FIG. 26, shown with the packing pendulum in a packing position, according to an exemplary embodiment.

Referring now to FIGS. 26 and 27, a portion of a refuse compartment 1530 (similar to refuse compartment 230) of a refuse vehicle (similar to refuse vehicles 210) is shown, according to an exemplary embodiment. The refuse compartment 1530 similarly includes a refuse interaction mechanism 1538 comprising a refuse interaction element, shown as a packing pendulum 1540, disposed within a hopper volume 1552 of the refuse compartment 1530. The packing pendulum 1540 is similarly configured to selectively provide a hammering force to hammer or pack refuse through an opening in a mid-wall 1550 of the refuse compartment 1530. As illustrated, in some instances, the mid-wall 1550 may include a slidable door 1556 configured to be selectively opened while the packing pendulum 1540 is packing refuse into the storage volume (similar to the storage volume 354 of the refuse compartment 330) of the refuse compartment 1530 and to be selectively closed when the packing pendulum 1540 is not actively packing refuse into the storage volume of the refuse compartment 1530.

As shown in FIGS. 26 and 27, the packing pendulum 1540 is actuatable between a receiving position (shown in FIG. 26) and a packing position (shown in FIG. 27). The packing pendulum 1540 comprises a pendulum head 1558, a pendulum arm 1560, and an actuation arm 1562. The pendulum head 1558 is rigidly connected to the pendulum arm 1560, such that movement of the pendulum head 1558 results in movement of the pendulum arm 1560, and vice versa. A first end of the pendulum arm 1560 is connected to the pendulum head 1558. A second end of the pendulum arm 1560 is pivotally coupled to sidewalls 1534 of the refuse compartment 1530 at a pivot point 1568. For example, the pivot point 1568 may include a pair of rod and bearing connections configured to allow for the pendulum arm 1560, and thus the pendulum head 1558, to pivot between the receiving position and the packing position. The pendulum arm 1560 is rigidly connected to the actuation arm 1562, such that movement of the pendulum arm 1560 results in movement of the actuation arm 1562, and vice versa.

The packing pendulum 1540 may be selectively actuated between the receiving position and the packing position by a pendulum actuator, shown in FIGS. 26 and 27 as a linear actuator 1570. The linear actuator 1570 includes a rod 1572, an outer cylinder 1574, and an electrically-driven ball screw 1576. The rod 1572 is slidably received within the outer cylinder 1574. The rod 1572 is configured to be selectively actuated between a retracted position (as shown in FIG. 26) and an extended position (shown in FIG. 27). The electrically-driven ball screw 1576 is coupled to both the rod 1572 and the outer cylinder 1574. The electrically-driven ball screw 1576 is configured to selectively actuate the rod 1572 between the retracted position and the extended position.

The rod 1572 is pivotally connected at a distal end to a floor 1580 of the refuse compartment 1530. The electrically-driven ball screw 1576 is pivotally connected to the actuation arm 1562 of the packing pendulum 1540. Accordingly, the electrically-driven ball screw 1576 is configured to selectively actuate the rod 1572 between the extend position and the retracted position and, in doing so, selectively actuate the packing pendulum between the receiving position and the packing position.

It should be appreciated that other arrangements of the linear actuator 1570 may be utilized without departing from the scope of the present disclosure. For example, the distal end of the rod 1572 may alternatively be coupled to the actuation arm 1562 and the electrically-driven ball screw 1576 may be pivotally connected to the floor 1580 of the refuse compartment 1530.

Figure 28:
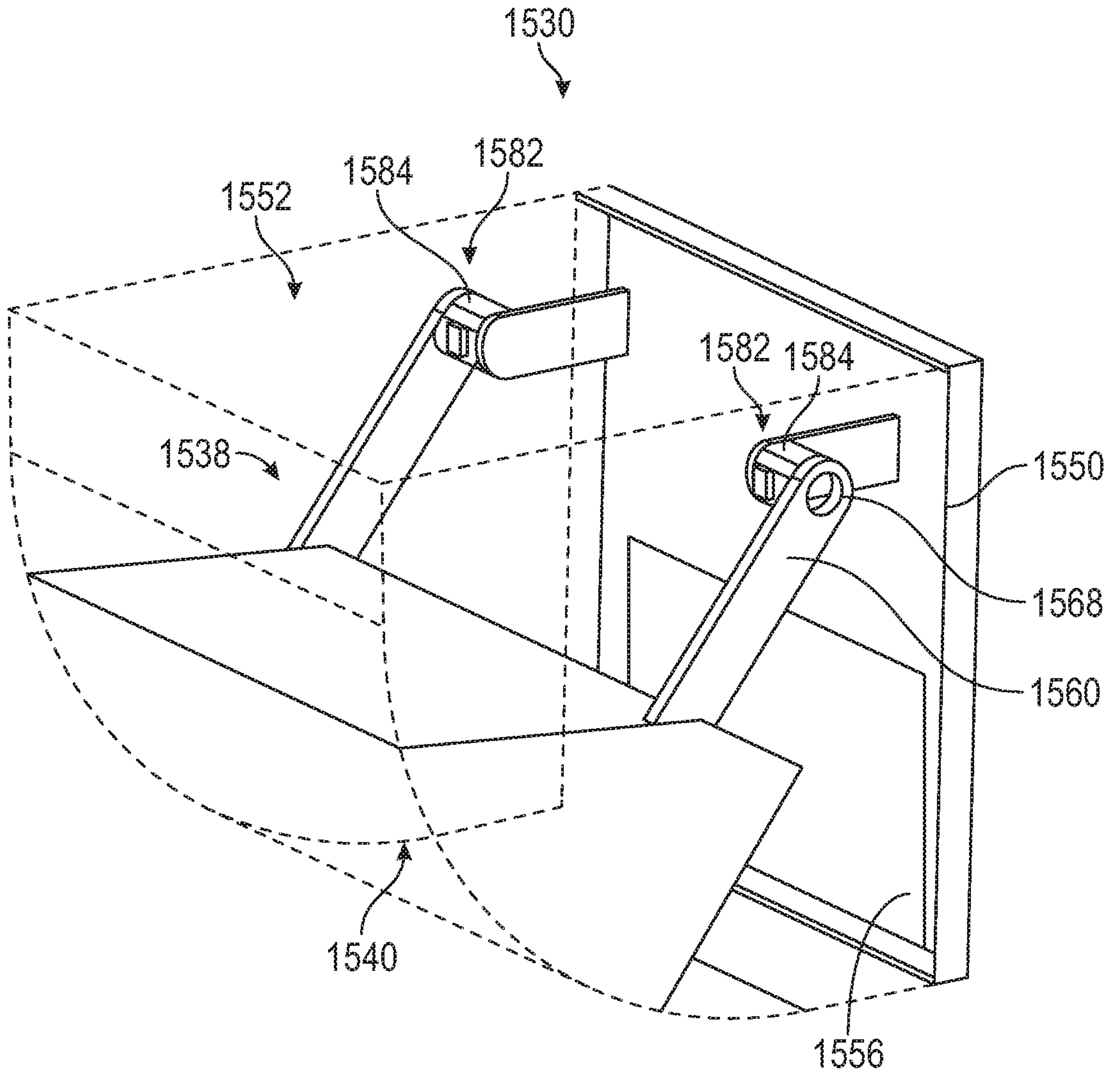
FIG. 28 is a perspective view of the refuse compartment of FIG. 26, shown including rotational actuators, according to an exemplary embodiment.

As shown in FIG. 28, in some instances, the packing pendulum 1540 may be selectively actuated between the receiving position and the packing position by a pendulum actuator mechanism, shown as rotational actuators 1582. As illustrated, the rotational actuators 1582 may be a pair of electric motors 1584 configured to selectively actuate the packing pendulum 1540 between the receiving position and the packing position. In some instances, the electric motors 1584 may be rotationally coupled to the pendulum arm 1560 at the pivot point 1568 via a direct connection, such that the electric motors 1584 directly drive the packing pendulum 1540 between the receiving position and the packing position. In some other instances, the electric motors 1584 may be rotationally coupled to the pendulum arm 1560 at the pivot point 1568 via a gear box configured to provide an improved or ideal gear ratio between the electric motor 1584 and the packing pendulum 1540, as desired for a given application.

Figure 29:
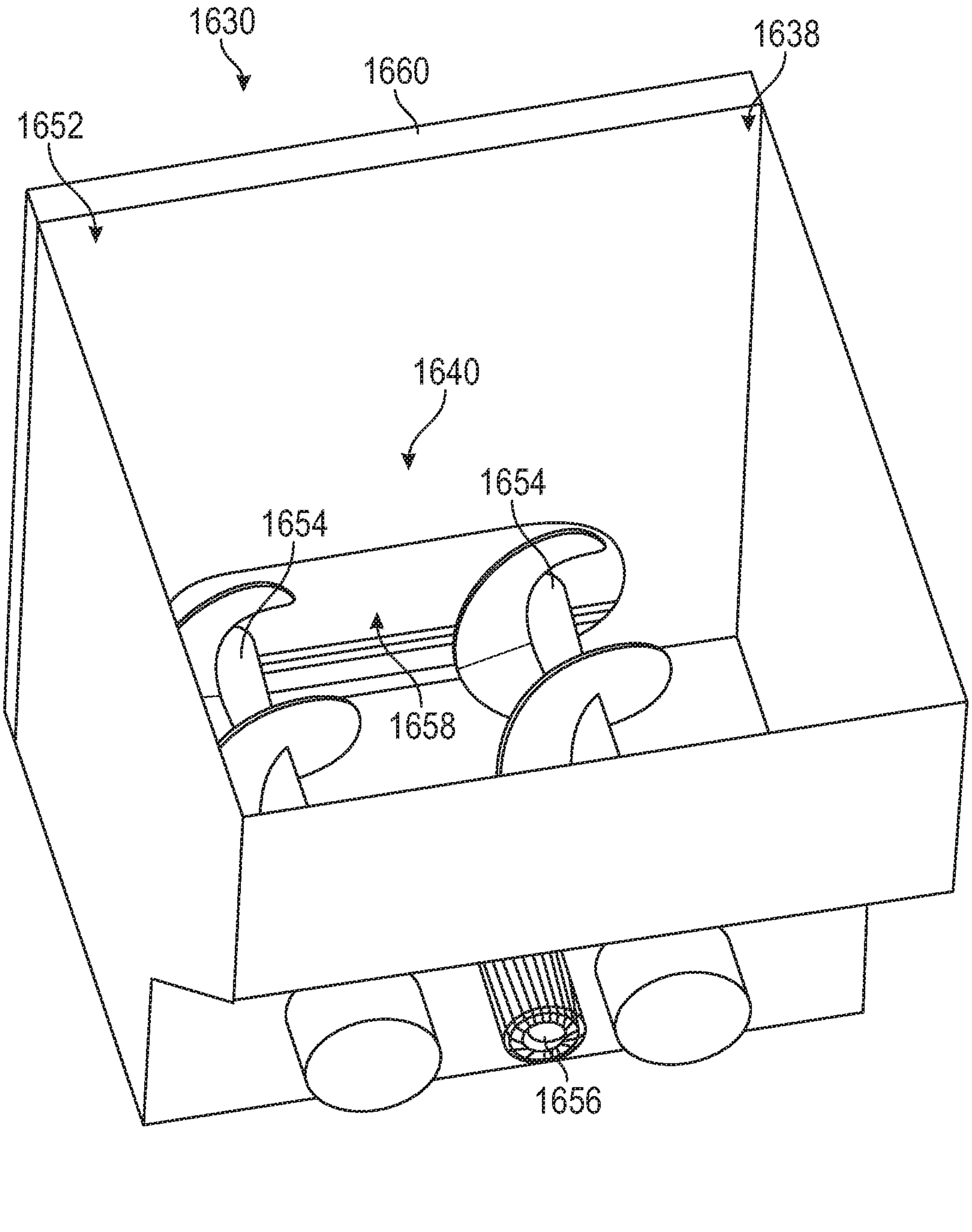
FIG. 29 is a perspective view of a refuse compartment of another refuse vehicle, according to an exemplary embodiment.

Referring now to FIG. 29, a portion of a refuse compartment 1630 (similar to refuse compartment 230) of a refuse vehicle (similar to refuse vehicles 210) is shown, according to an exemplary embodiment. The refuse compartment 1630 includes a refuse interaction mechanism 1638 comprising a refuse interaction element, shown as a dual-auger packer mechanism 1640, disposed within a hopper volume 1652 of the refuse compartment 1630. The dual-auger packer mechanism 1640 comprises a pair of auger mechanisms 1654 configured to be selectively rotated by an electric motor 1656. Each auger mechanism 1654 is configured to selectively provide an axially-directed displacement force on any refuse contained within the hopper volume 1652 to force the refuse through an opening 1658 in a mid-wall 1660 of the refuse compartment 1630 and into a storage volume of the refuse compartment 1630. Accordingly, the electric motor 1656 may be used to selectively rotate the pair of auger mechanisms 1654 to effectively pack the refuse within the storage compartment of the refuse compartment 1630. The electric motor 1656 may be powered by an on-board power source (similar to the battery system 20).

Figure 30:
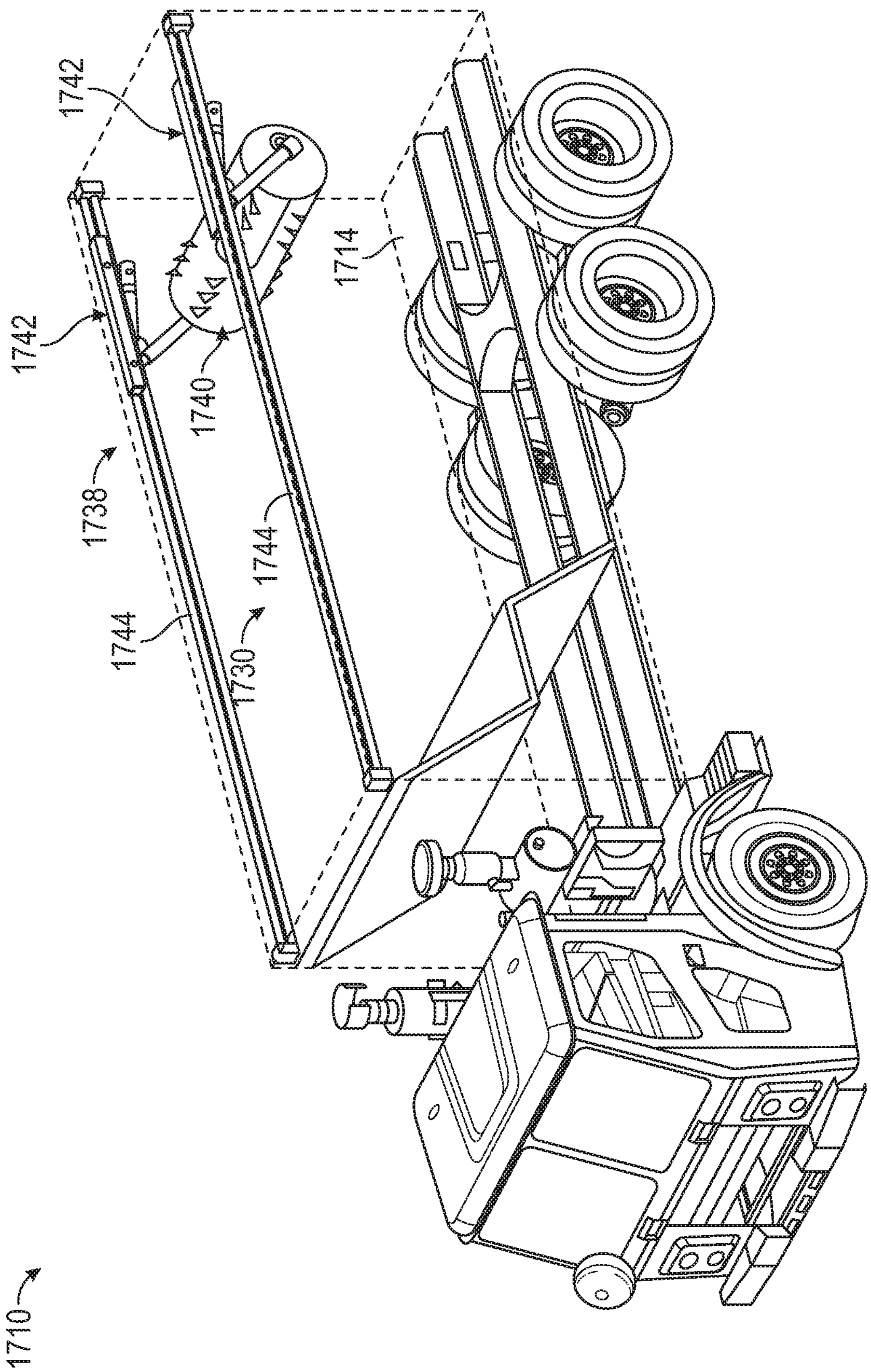
FIG. 30 is a perspective view of another refuse vehicle, according to an exemplary embodiment.
Figure 31:
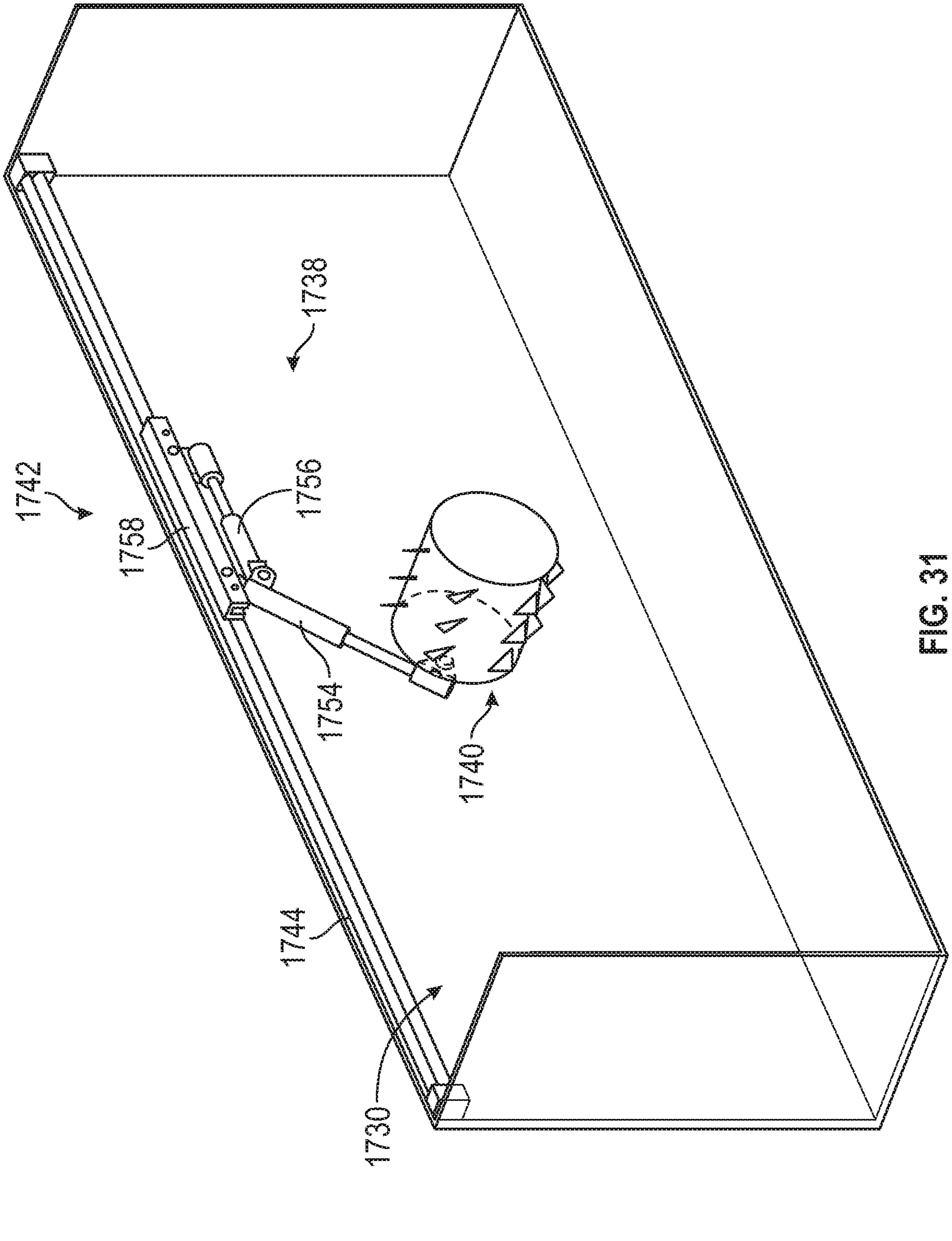
FIG. 31 is a cross-sectional perspective view of a refuse compartment the refuse vehicle of FIG. 30, according to an exemplary embodiment.
Figure 32:
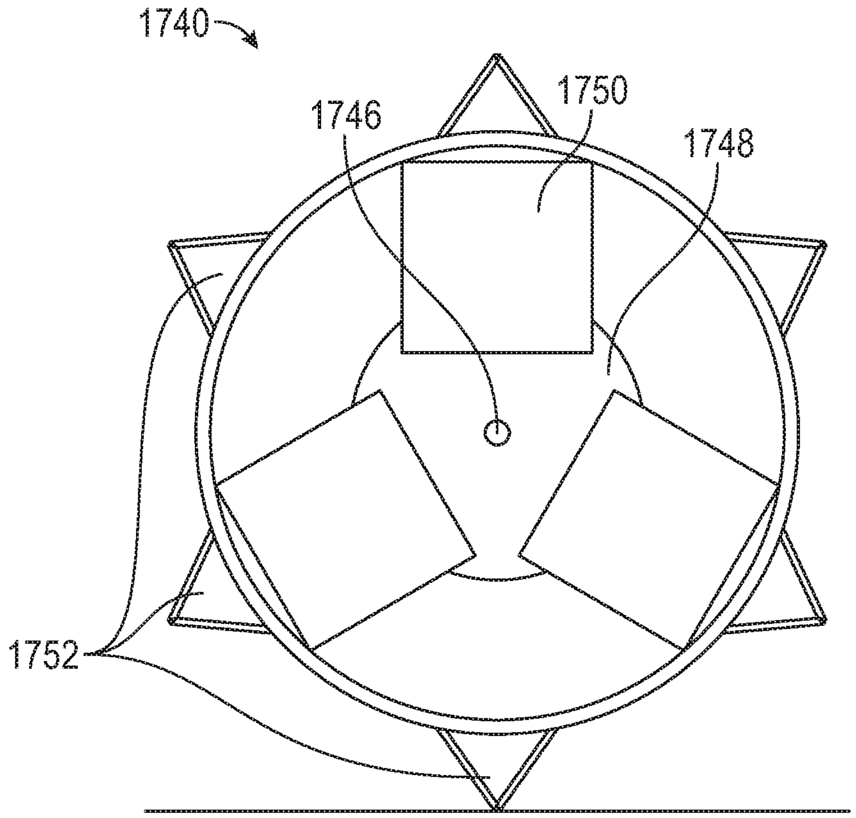
FIG. 32 is a cross-sectional view of a packing roller of the refuse vehicle of FIG. 31, according to an exemplary embodiment.

Referring now to FIGS. 30 and 31, a vehicle, shown as refuse vehicle 1710, is shown, according to an exemplary embodiment. In some embodiments, the refuse vehicle 1710 is substantially similar to any of the refuse vehicles described above. The refuse vehicle 1710 similarly includes a body assembly 1714 having a collection chamber shown as a refuse compartment 1730. The refuse vehicle 1710 further includes a refuse interaction mechanism comprising a packing wheel assembly 1738 configured to roll back and forth over refuse contained within the refuse compartment 1730 to pack and/or compact the refuse within the refuse compartment 1730.

Figure 33:
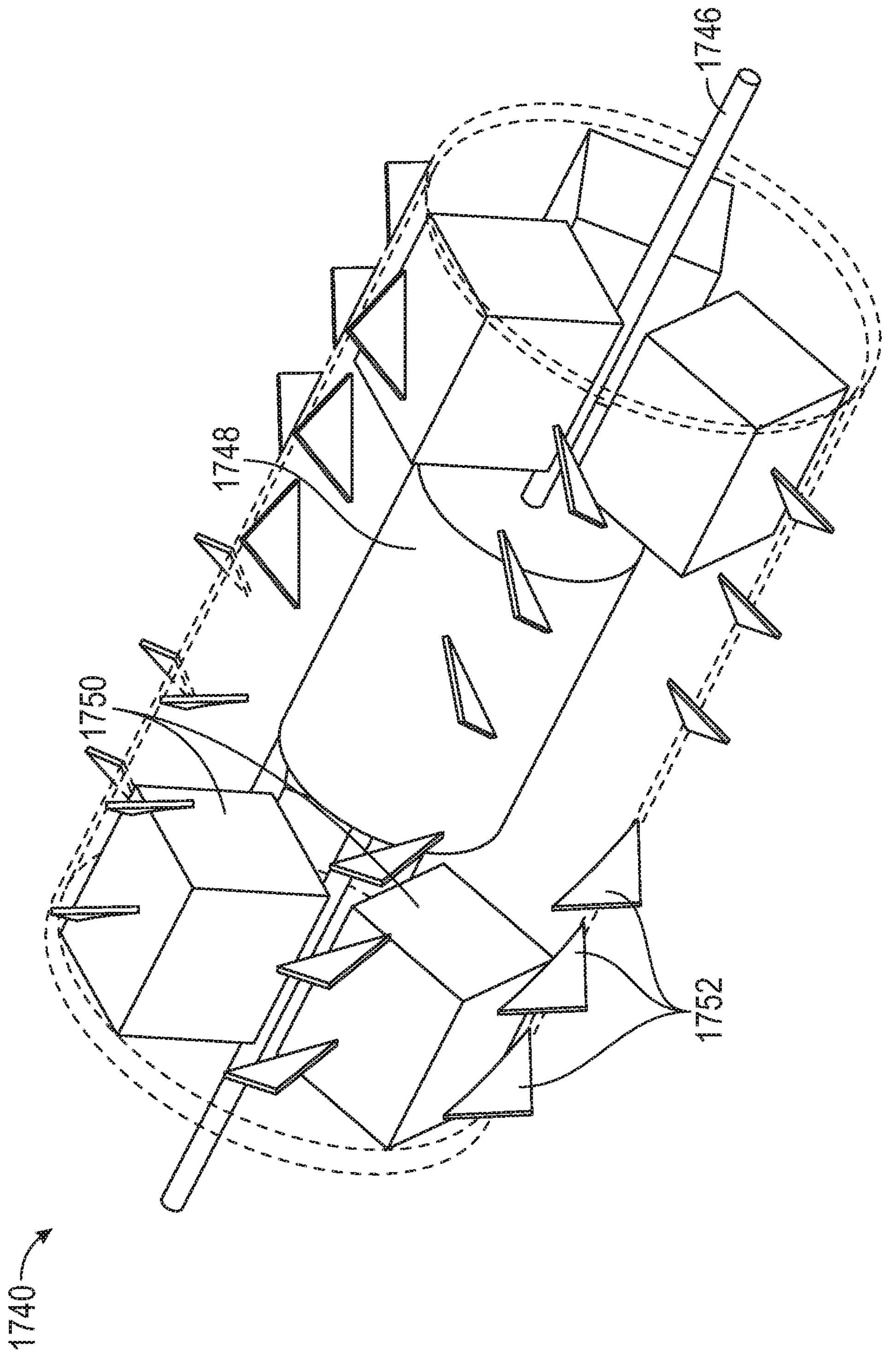
FIG. 33 is a perspective view of the packing roller of FIG. 32, according to an exemplary embodiment.
Figure 34:
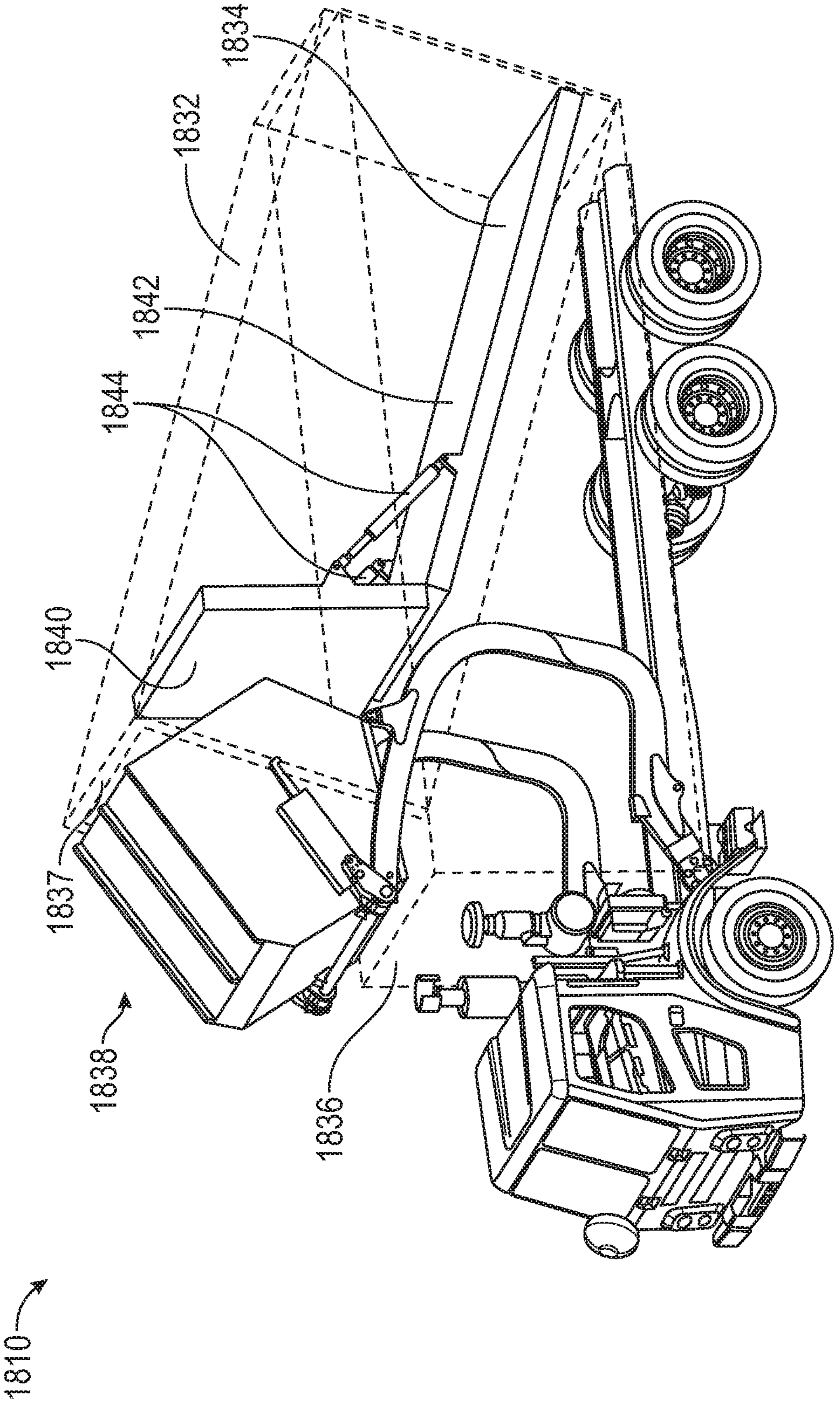
FIG. 34 is a perspective view of another refuse vehicle, shown in a raised position, according to an exemplary embodiment.

The packing wheel assembly 1738 includes a packing wheel 1740, a pair of sliding packing arm mechanisms 1742, and a pair of sliding tracks 1744. As shown in FIGS. 33 and 34, the packing wheel 1740 includes a central support rod 1746, a packing wheel motor 1748, a plurality of packing wheel batteries 1750, and a plurality of traction tines 1752. The central support rod 1746 is coupled at each end to a corresponding one of the pair of sliding packing arm mechanisms 1742. The central support rod 1746 is further configured to support and allow for relative rotation (e.g., about a central axis of the central support rod 1746) between the central support rod 1746 and the remainder of the packing wheel 1740. The packing wheel motor 1748 is disposed within the packing wheel 1740 and is configured to selectively rotate the packing wheel 1740 with respect to the central support rod 1746. The plurality of packing wheel batteries 1750 are disposed within the packing wheel 1740 and are configured to provide power to packing wheel motor 1748. The plurality of traction tines 1752 are configured to dig into refuse as the packing wheel 1740 rolls over the refuse to provide traction between the packing wheel 1740 and the refuse.

As best shown in FIG. 31, each sliding packing arm mechanism 1742 includes a first extendable packing arm 1754, a second extendable packing arm 1756, and a sliding member 1758. The first extendable packing arm 1754 is coupled at a first end to the central support rod 1746 of the packing wheel 1740. The first extendable packing arm 1754 is pivotally coupled at a second end to the sliding member 1758. The first extendable packing arm 1754 is further configured to be selectively extended and retracted. In some instances, the first extendable packing arm 1754 may be hydraulically or electrically actuated. Accordingly, the first extendable packing arm 1754 is configured to selectively raise and lower the packing wheel 1740, as desired for a give application.

A first end of the second extendable packing arm 1756 is pivotally coupled to the first extendable packing arm 1754, proximate the second end of the first extendable packing arm 1754. A second end of the second extendable packing arm 1756 is coupled to the sliding member 1758. The second extendable packing arm 1756 is similarly configured to be selectively extended and retracted. In some instances, the second extendable packing arm 1756 may similarly be hydraulically or electrically actuated. Accordingly, the second extendable packing arm 1756 is configured to selectively rotate the first extendable packing arm 1754 about the second end of the first extendable packing arm 1754.

The sliding member 1758 is configured to slidably engage a corresponding sliding track 1744 of the packing wheel assembly 1738. The sliding track 1744 extends along a sidewall 1760 of the refuse compartment 1730, proximate an upper end of the sidewall 1760. Accordingly, the sliding member 1758 is configured to slide along sliding track 1744 to allow for translational movement of the packing wheel 1740 during operation.

Accordingly, during use, the packing wheel assembly 1738 is configured to allow for the packing wheel 1740 to be rolled over refuse within the refuse compartment 1730 to pack and/or compact the refuse within the refuse compartment 1730. The refuse may be packed or compacted both by the weight of the packing wheel 1740, along with a downward force provided by the extendable packing arms 1754, 1756 of the sliding packing arm mechanisms 1742.

Figure 35:
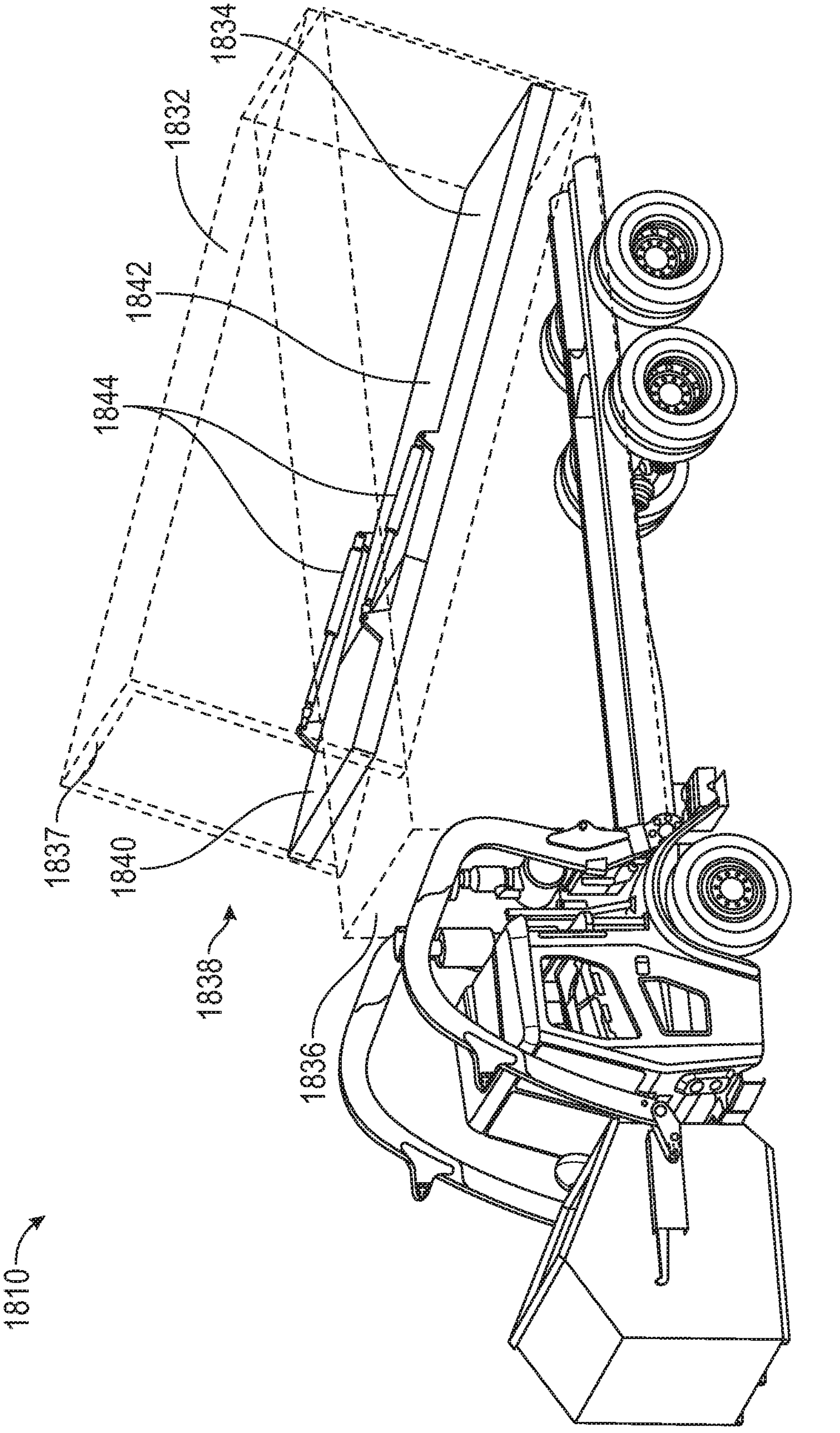
FIG. 35 is a perspective view of the refuse vehicle of FIG. 34, shown in the raised position with an intermediate compaction wall in a flush position, according to an exemplary embodiment.
Figure 36:
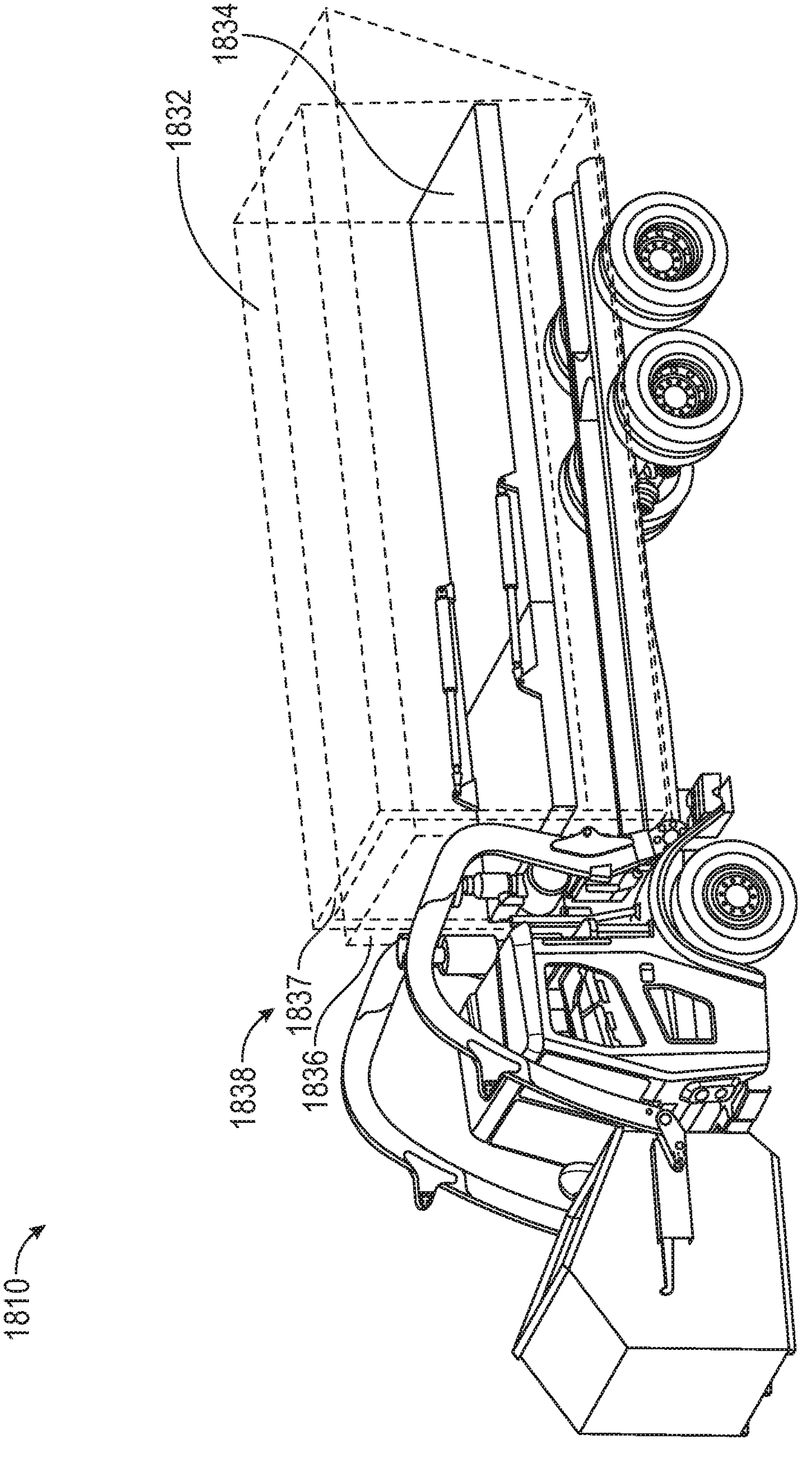
FIG. 36 is a perspective view of refuse vehicle of FIG. 34, shown in a lowered position, according to an exemplary embodiment.

Referring now to FIGS. 34-36, a refuse vehicle 1810 is shown, according to an exemplary embodiment. The refuse vehicle 1810 may be substantially similar to the refuse vehicle 10 or any of the other refuse vehicles described above. Accordingly, the following description will focus on the differences between the refuse vehicle 1810 and the previously-described refuse vehicles.

The refuse vehicle 1810 includes a refuse interaction mechanism in the form of a selectively expandable and compactable refuse compartment 1838. For example, the refuse compartment 1838 includes an upper portion 1832, an intermediate compaction wall 1834, and a lower portion 1836. The upper portion 1832 is configured to be selectively tilted, such that a front end 1837 of the upper portion 1832 is selectively moveable between a raised position (as shown in FIGS. 35 and 36) and a lowered position (as shown in FIG. 36). For example, the upper portion 1832 may be tilted using hydraulic and/or electric actuators configured to lift the front end 1837 of the upper portion 1832. When the front end 1837 of the upper portion 1832 is in the raised position, an opening is created between the upper portion 1832 and the lower portion 1836, and refuse may be dumped into the refuse compartment 1838, through the opening.

The intermediate compaction wall 1834 may be configured to tilt with the upper portion 1832 between the raised position and the lowered position. The intermediate compaction wall 1834 further includes a front portion 1840, a rear portion 1842, and pair of linear actuators 1844. The pair of linear actuators 1844 are configured to selectively rotate the front portion 1840 with respect to the rear portion 1842 between a flush position (shown in FIGS. 36 and 37) and an angled position (shown in FIG. 34).

For example, as best shown in FIG. 34, when the upper portion 1832 of the refuse compartment 1838 is in the raised position, the front portion 1840 may be moved into the angled position to provide additional clearance for the refuse to be dumped into the refuse compartment 1838, and also to prevent refuse from getting on top of the intermediate compaction wall 1834. Once the refuse has been dumped into the refuse compartment 1838, the front portion 1840 may be moved into the flush position (as shown in FIG. 35) and the upper portion 1832 and the intermediate compaction wall 1834 may be moved into the lowered position (as shown in FIG. 36). As illustrated in FIG. 36, the intermediate compaction wall 1834 is configured to raise vertically with respect to the upper portion 1832 as the refuse compartment 1838 is gradually filled with refuse. The refuse within the refuse compartment 1838 may be packed or compacted downward under the weight of the intermediate compaction wall 1834.

Figure 37:
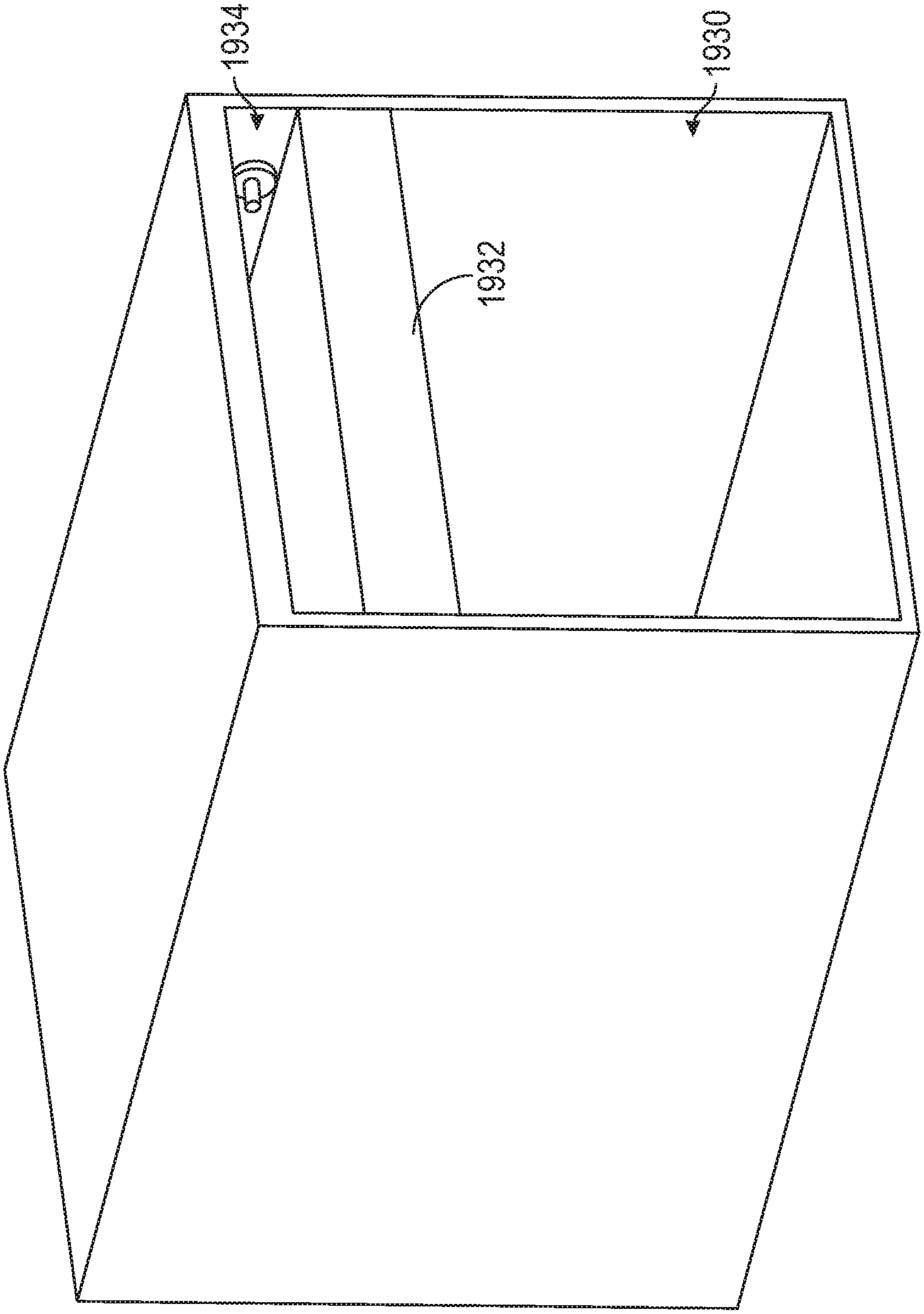
FIG. 37 is perspective view of a refuse compartment of another refuse vehicle, according to an exemplary embodiment.

Referring now to FIG. 37, a refuse compartment 1930 of a refuse vehicle (similar to the refuse vehicles described above) is shown, according to an exemplary embodiment. The refuse compartment 1930 includes a refuse interaction mechanism in the form of a moveable compaction roof 1932 configured to be slowly lifted and suddenly dropped on refuse contained within the refuse compartment 1930 to pack and/or compact the refuse. For example, in some instances, the moveable compaction roof 1932 may be lifted by a cable winch system 1934. The cable winch system 1934 may then be configured to selectively suddenly release the moveable compaction roof 1932.

Figure 38:
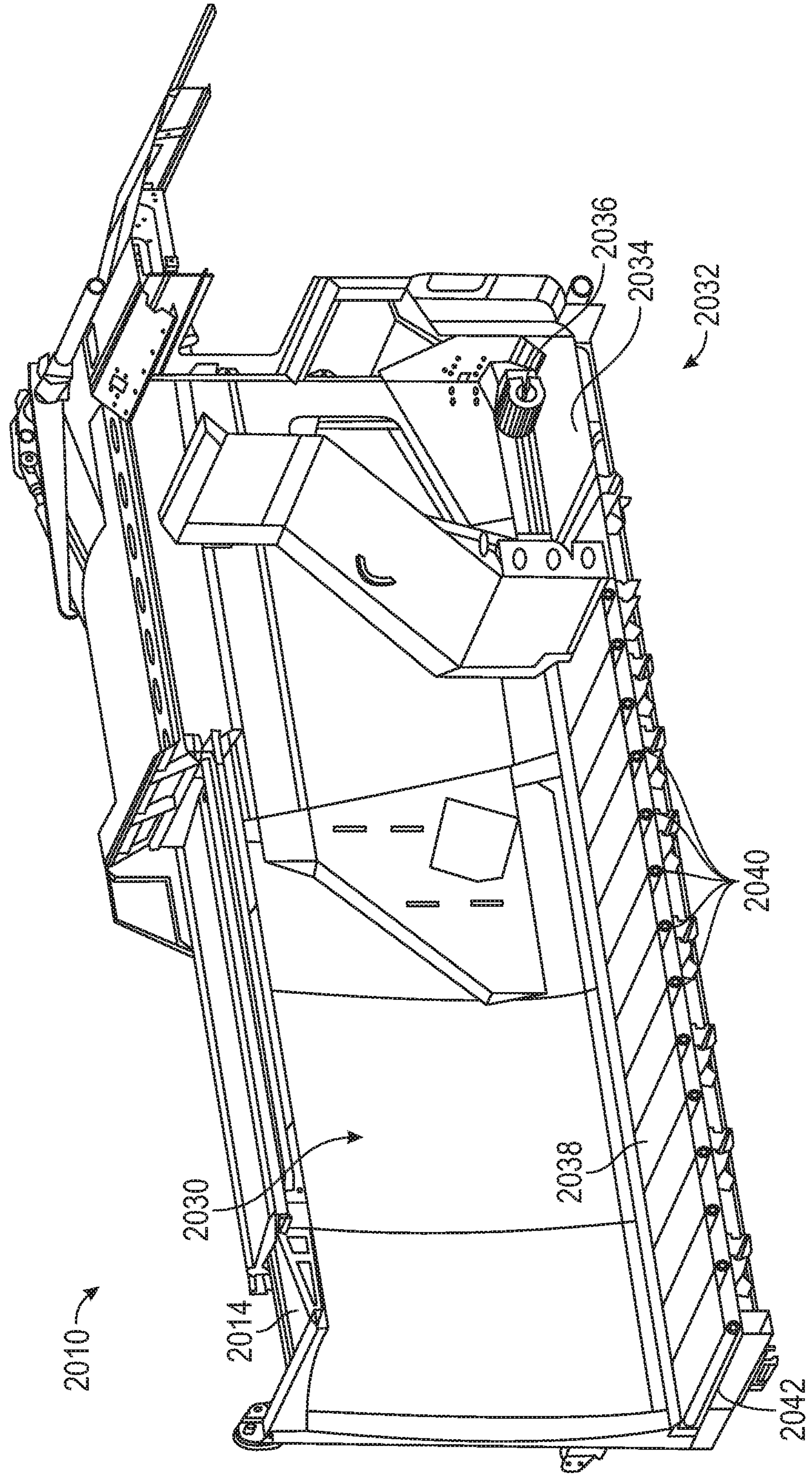
FIG. 38 is a cross-sectional perspective view of another refuse vehicle, according to an exemplary embodiment.

Referring now to FIG. 38, a vehicle, shown as refuse vehicle 2010, is shown, according to an exemplary embodiment. In some embodiments, the refuse vehicle 2010 is substantially similar to the refuse vehicles described above. The refuse vehicle 2010 similarly includes a body assembly 2014 having a collection chamber shown as a refuse compartment 2030. The refuse vehicle 2010 further includes a refuse interaction mechanism, shown as a conveyor belt ejector mechanism 2032, embedded into a floor 2034 of the refuse compartment 2030. The conveyor belt ejector mechanism 2032 includes an electric motor 2036, a conveyor belt 2038, and a plurality of rollers 2040. The electric motor 2036 is configured to selectively actuate the conveyor belt 2038 by selectively rotating one or more rollers 2040 of the plurality of rollers 2040. Accordingly, when a tailgate (similar to the tailgates discussed above) is opened, the conveyor belt ejector mechanism 2032 may be used to eject refuse contained within the refuse compartment 2030.

Furthermore, in some instances, the conveyor belt ejector mechanism 2032 further includes a conveyor belt scraper 2042 disposed at rear end of the refuse vehicle 2010. The conveyor belt scraper 2042 is arranged adjacent to the conveyor belt 2038 and is configured to continuously scrape refuse and other materials off of the conveyor belt 2038 as the conveyor belt 2038 is actuated, thereby keeping the conveyor belt 2038 clean.

It should be appreciated that each of the electronic components described herein (e.g. any of the refuse vehicles, refuse interaction mechanisms, and/or any other electrical components) may be powered by an on-board power source (similar to the battery system 20 described above, with reference to FIG. 1). Furthermore, each of the electronic components may be in communication with one or more controllers configured to selectively control operation of the electronic components to perform the various capabilities of the various components described herein, as necessary for a given application.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle 10 and the systems and components thereof as shown in the various exemplary embodiments is illustrative only. Additionally, any element disclosed in one embodiment may be incorporated or utilized with any other embodiment disclosed herein. For example, in some instances, the refuse interaction mechanism 1538 including the packing pendulum 1540 may be incorporated into the refuse vehicle 2010 having the conveyor belt ejector mechanism 2032, thereby allowing refuse to be packed into the storage volume of the refuse compartment 2030 of the refuse vehicle 2010 by the packing pendulum 1540, and subsequently ejected out of the refuse compartment 2030 using the conveyor belt ejector mechanism 2032. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A refuse vehicle comprising:
- a chassis;
- a body assembly coupled to the chassis and defining a refuse compartment configured to store refuse material, the refuse compartment including a track extending adjacent a floor of the refuse compartment from a front of the refuse compartment toward a rear of the refuse compartment;
- a battery system;
- a tailgate moveable between an opened position and a closed position;
- a conveyor belt ejector mechanism embedded within the floor of the refuse compartment and configured to eject the refuse material from the refuse compartment when the tailgate is in the opened position, the conveyor belt ejector mechanism including a conveyor belt and a conveyor belt scraper, the conveyor belt scraper disposed at a rear end of the refuse vehicle, arranged adjacent to the conveyor belt, and configured to scrape refuse material off of the conveyor belt as the conveyor belt is actuated; and
- a refuse interaction mechanism comprising:
  - a refuse interaction element configured to selectively apply a force onto the refuse material within the refuse compartment, the refuse interaction element being moveable along the track within the refuse compartment between a receiving position, in which the refuse compartment is configured to receive refuse material, and a force-exerting position, in which the refuse interaction element is configured to exert the force on the refuse material stored within the refuse compartment;
  - an electrically driven actuator configured to selectively move the refuse interaction element between the receiving position and the force-exerting position, the electrically driven actuator powered by the battery system; and
  - an impulse generating mechanism configured to selectively apply linear impulse to the refuse interaction element.

2. The refuse vehicle of claim 1, wherein, when the tailgate is in the opened position and the refuse interaction element is in the force-exerting position, the force exerted by the refuse interaction element is configured to eject the refuse material from the refuse compartment and,
- when the tailgate is in the closed position and the refuse interaction element is in the force-exerting position, the force exerted by the refuse interaction element is configured to compact the refuse material within the refuse compartment.

3. The refuse vehicle of claim 2, wherein the refuse interaction element is an actuatable packer.

4. The refuse vehicle of claim 3, wherein the refuse interaction mechanism further includes a scissor stack mechanism coupled to the actuatable packer and selectively actuatable between an extended position and a retracted position, and the electrically driven actuator is configured to selectively move the actuatable packer between the receiving position and the force-exerting position by selectively actuating the scissor stack mechanism between the extended position and the retracted position.

5. The refuse vehicle of claim 4, wherein the electrically driven actuator is configured to selectively actuate the scissor stack mechanism via one of a ball screw actuator, a rack and pinion mechanism, and a cable winch.

6. The refuse vehicle of claim 3, wherein the refuse interaction mechanism further includes a two-way winch mechanism operably coupled to the actuatable packer and the electrically driven actuator is configured to selectively move the actuatable packer between the receiving position and the force-exerting position using the two-way winch mechanism.

7. The refuse vehicle of claim 3, further comprising a moveable rear wall configured to be selectively moved within the refuse compartment, when the tailgate is in the closed position, to provide an additional compaction force onto the refuse material within the refuse compartment, the moveable rear wall further configured to be selectively moved into and move with the tailgate when the tailgate is moved from the closed position into the opened position.

8. The refuse vehicle of claim 1, wherein the impulse generating mechanism comprises one of a flywheel or a coil spring.

9. A refuse vehicle comprising:
- a chassis;
- a body assembly coupled to the chassis and defining a refuse compartment configured to store refuse material, the refuse compartment including a track extending adjacent a floor of the refuse compartment from a front of the refuse compartment toward a rear of the refuse compartment;
- a battery system;
- a tailgate moveable between an opened position and a closed position;
- a conveyor belt ejector mechanism embedded within the floor of the refuse compartment and configured to eject the refuse material from the refuse compartment when the tailgate is in the opened position, the conveyor belt ejector mechanism including a conveyor belt and a conveyor belt scraper, the conveyor belt scraper disposed at a rear end of the refuse vehicle, arranged adjacent to the conveyor belt, and configured to scrape refuse material off of the conveyor belt as the conveyor belt is actuated; and
- a refuse interaction mechanism comprising:
  - a refuse interaction element configured to selectively apply a force onto the refuse material within the refuse compartment, the refuse interaction element being moveable along the track within the refuse compartment between a receiving position, in which the refuse compartment is configured to receive refuse material, and a force-exerting position, in which the refuse interaction element is configured to exert the force on the refuse material stored within the refuse compartment;
- an electrically driven actuator configured to selectively move the refuse interaction element between the receiving position and the force-exerting position, the electrically driven actuator powered by the battery system; and
- an impulse generating mechanism configured to selectively apply linear impulse to the refuse interaction element,
- wherein, when the tailgate is in the opened position and the refuse interaction element is in the force-exerting position, the force exerted by the refuse interaction element is configured to eject the refuse material from the refuse compartment and, when the tailgate is in the closed position and the refuse interaction element is in the force-exerting position, the force exerted by the refuse interaction element is configured to compact the refuse material within the refuse compartment.

10. The refuse vehicle of claim 9, wherein the refuse interaction mechanism further includes a rigid chain actuator mechanism operably coupled to the refuse interaction element and the electrically driven actuator is configured to selectively move the refuse interaction element between the receiving position and the force-exerting position using the rigid chain actuator mechanism.

11. The refuse vehicle of claim 10, wherein the rigid chain actuator mechanism includes a rigid chain actuator and a limited-articulation chain, the rigid chain actuator configured to selectively deploy and retract the limited-articulation chain, the limited-articulation chain configured to form a continuously-extending rigid column as it is deployed by the rigid chain actuator and to form a non-rigid chain coil as it is retracted through the rigid chain actuator.

12. The refuse vehicle of claim 9, wherein the refuse interaction mechanism further includes a helical band actuator operably coupled to the refuse interaction element and the electrically driven actuator is configured to selectively move the refuse interaction element between the receiving position and the force-exerting position using the helical band actuator.

13. The refuse vehicle of claim 9, wherein the refuse interaction mechanism further includes a crank slider mechanism operably coupled to the refuse interaction element and the electrically driven actuator is configured to selectively move the refuse interaction element between the receiving position and the force-exerting position using the crank slider mechanism.

14. The refuse vehicle of claim 13, wherein the crank slider mechanism is operably coupled to an incremental movement mechanism comprising a locking pawl and a directional locking pin, the locking pawl and the directional locking pin being collectively configured to permit the crank slider mechanism to move in one of a first direction, with respect to the refuse compartment, and a second direction, opposite the first direction, and to prevent the crank slider mechanism from moving in a different one of the first direction and the second direction, based on an orientation of the directional locking pin.

15. The refuse vehicle of claim 9, wherein the impulse generating mechanism comprises one of a flywheel or a coil spring.

16. A refuse vehicle comprising:

a chassis;

a body assembly coupled to the chassis and defining a refuse compartment configured to store refuse material, the refuse compartment including a track extending adjacent a floor of the refuse compartment from a front of the refuse compartment toward a rear of the refuse compartment;

a battery system;

a conveyor belt ejector mechanism embedded within the floor of the refuse compartment and configured to eject the refuse material from the refuse compartment, the conveyor belt ejector mechanism including a conveyor belt and a conveyor belt scraper, the conveyor belt scraper disposed at a rear end of the refuse vehicle and configured to clean the conveyor belt as the conveyor belt is actuated; and a refuse interaction mechanism comprising:

a refuse interaction element configured to selectively apply a packing force onto the refuse material within the refuse compartment, the refuse interaction element being moveable along the track within the refuse compartment between a receiving position, in which the refuse compartment is configured to receive refuse material, and a packing position, in which the refuse interaction element is configured to exert the packing force on the refuse material stored within the refuse compartment;

an electrically driven actuator configured to selectively move the refuse interaction element between the receiving position and the packing position, the electrically driven actuator powered by the battery system; and an impulse generating mechanism configured to selectively apply linear impulse to the refuse interaction element.

17. The refuse vehicle of claim 16, wherein the refuse interaction mechanism includes an electrically-driven ball screw mechanism including a central screw rod and at least one ball screw rigidly coupled to the refuse interaction element and configured to translate rotational motion of the central screw rod into translational motion of the refuse interaction element, and the electrically driven actuator is configured to move the refuse interaction element between the receiving position and the packing position by applying rotational motion to the central screw rod.

18. The refuse vehicle of claim 16, wherein the refuse interaction element is a packing pendulum.

19. The refuse vehicle of claim 18, wherein the refuse interaction mechanism further comprises a linear actuator operably coupled to the packing pendulum and actuatable between an extended position and a retracted position and the electrically driven actuator is configured to move the packing pendulum between the receiving position and the packing position by selectively actuating the linear actuator between the extended position and the retracted position.

20. The refuse vehicle of claim 19, further comprising a conveyor belt ejector mechanism and a tailgate moveable between an opened position and a closed position, the conveyor belt ejector mechanism embedded within a floor of the refuse compartment and being configured to eject the refuse material from the refuse compartment when the tailgate is in the opened position.

21. The refuse vehicle of claim 16, wherein the impulse generating mechanism comprises one of a flywheel or a coil spring.

* * * * *